United States Patent
Nair et al.

(10) Patent No.: US 9,797,552 B2
(45) Date of Patent: Oct. 24, 2017

(54) DIAGNOSTICS AND ENHANCED FUNCTIONALITY FOR SINGLE-WIRE SAFETY COMMUNICATION

(71) Applicant: Rockwell Automation Technologies, Inc., Mayfield Heights, OH (US)

(72) Inventors: Suresh R. Nair, Amherst, NH (US); Wayne R. Foster, Tyngsborough, MA (US); Christopher Burke, Boxford, MA (US); Alex Harris, Salem, MA (US); Rudolf Laurenz Papenbreer, Wuppertal (DE); Dirk Lorenz, Wetter (DE); Norbert Machuletz, Wetter (DE); Oliver Heckel, Frechen (DE)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 350 days.

(21) Appl. No.: 14/580,178

(22) Filed: Dec. 22, 2014

(65) Prior Publication Data
US 2016/0178125 A1 Jun. 23, 2016

(51) Int. Cl.
H02H 11/00 (2006.01)
F16P 3/00 (2006.01)
G05B 19/042 (2006.01)

(52) U.S. Cl.
CPC ............ *F16P 3/00* (2013.01); *G05B 19/0425* (2013.01)

(58) Field of Classification Search
USPC ................................................. 307/326, 328
See application file for complete search history.

(56) References Cited

U.S. PATENT DOCUMENTS

| 6,662,124 B2 | 12/2003 | Schweitzer et al. |
| 7,496,099 B2 | 2/2009 | Franchuk et al. |

(Continued)

FOREIGN PATENT DOCUMENTS

| EP | 1521145 | 4/2005 |
| EP | 2383762 | 11/2011 |

OTHER PUBLICATIONS

European Office Action for EP Application Serial No. 15195659.6, dated May 31, 2016, 2 pages.
European Office Action for EP Application Serial No. 15201993.1, dated Jul. 4, 2016, 2 pages.
Extended European Search Report for European Application Serial No. 15201993.1, dated May 23, 2016, 8 pages.

(Continued)

*Primary Examiner* — Adam Houston
(74) *Attorney, Agent, or Firm* — Amin, Turocy & Watson, LLP

(57) ABSTRACT

A single-wire safety system architecture is provided that yields reliable safety device monitoring without the need for dual redundant signal channels. The safety system comprises a safety relay acting as a communications master device and one or more compatible safety input devices connected in series with the safety relay via a single-wire communication circuit. The safety input device farthest from the safety relay on the safety circuit modulates a safety signal with a recognizable pulse pattern that traverses the single-wire safety circuit to the safety relay via the intermediate safety devices. The safety relay maintains safety mode as long as the pulse pattern is received and recognized. In addition to conveying the safety signal, the architecture allows bi-directional communication of initialization, configuration, and diagnostic messages over the single-wire safety channel. The architecture also facilitates rapid initialization of the safety channel using asynchronous sub-link detection and device enumeration.

23 Claims, 41 Drawing Sheets

(56) References Cited

U.S. PATENT DOCUMENTS

| | | | |
|---|---|---|---|
| 9,461,459 B2* | 10/2016 | Henneberger | H02H 3/10 |
| 2005/0057868 A1* | 3/2005 | Pullmann | H01H 47/004 |
| | | | 361/62 |
| 2007/0263595 A1 | 11/2007 | Charrat | |
| 2009/0252068 A1 | 10/2009 | Charles et al. | |
| 2011/0241447 A1* | 10/2011 | Ando | G05B 19/4063 |
| | | | 307/326 |
| 2014/0075235 A1 | 3/2014 | Chandhoke et al. | |
| 2014/0100675 A1* | 4/2014 | Dold | G05B 19/0428 |
| | | | 700/79 |
| 2016/0178125 A1* | 6/2016 | Nair | G05B 19/0425 |
| | | | 307/328 |
| 2016/0290559 A1* | 10/2016 | Nair | G05B 9/02 |
| 2016/0299484 A1* | 10/2016 | Nair | G05B 19/0425 |

OTHER PUBLICATIONS

Extended European Search Report for European Application Serial No. 15195659.6, dated Mar. 24, 2016, 8 pages.
Non-Final Office Action for U.S. Appl. No. 15/187,850, dated Apr. 6, 2017, 23 pages.
Non-Final Office Action for U.S. Appl. No. 15/187,859, dated Apr. 10, 2017, 20 pages.
Non-Final Office Action for U.S. Appl. No. 14/550,833, dated Apr. 6, 2017, 39 pages.
Notice of Allowance for U.S. Appl. No. 15/187,850 dated Aug. 7, 2017, 15 pages.
Notice of Allowance for U.S. Appl. No. 15/187,859 dated Aug. 16, 2017, 19 pages.
Final Office Action for U.S. Appl. No. 14/550,833 dated Aug. 10, 2017, 27 pages.

* cited by examiner

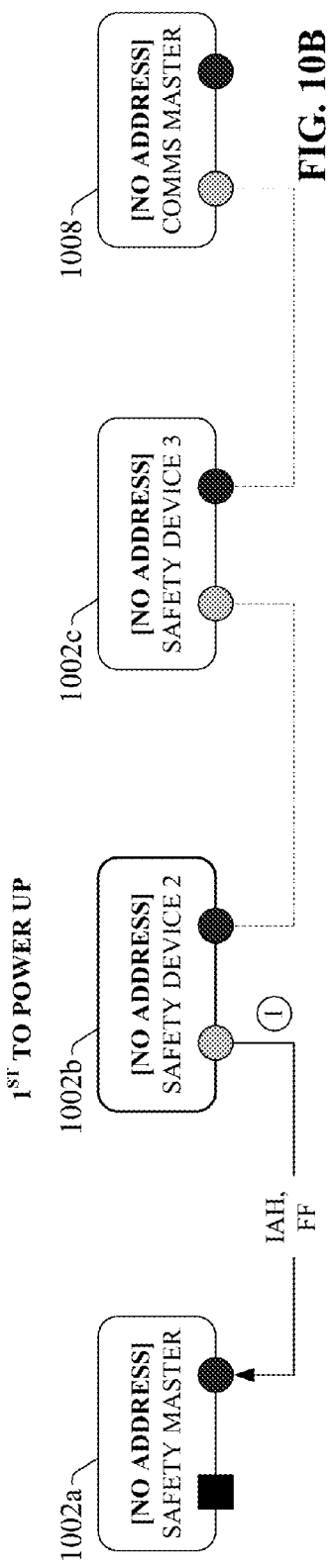
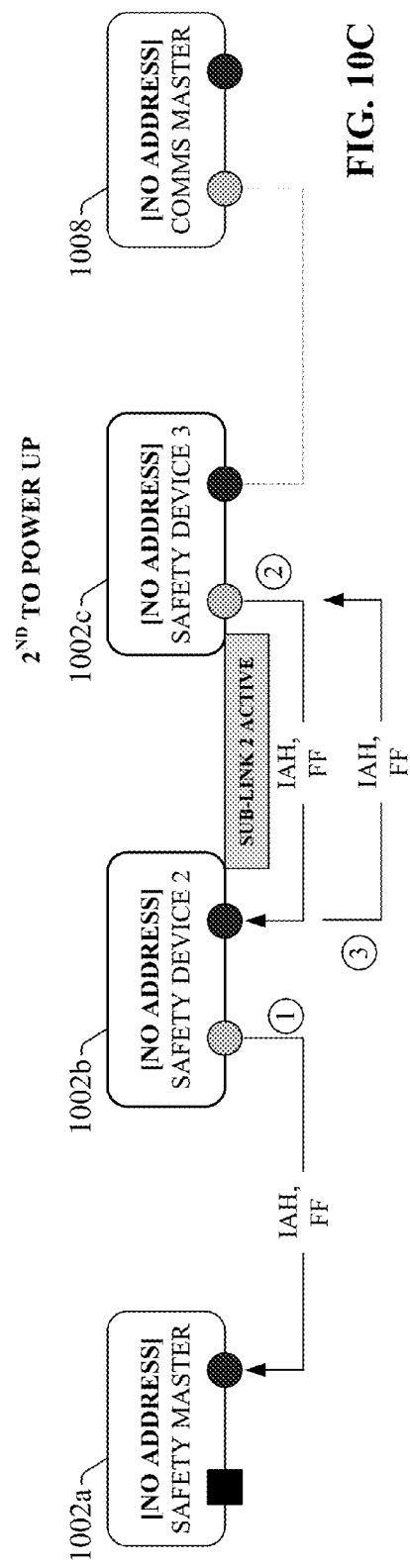
FIG. 10B
FIG. 10C

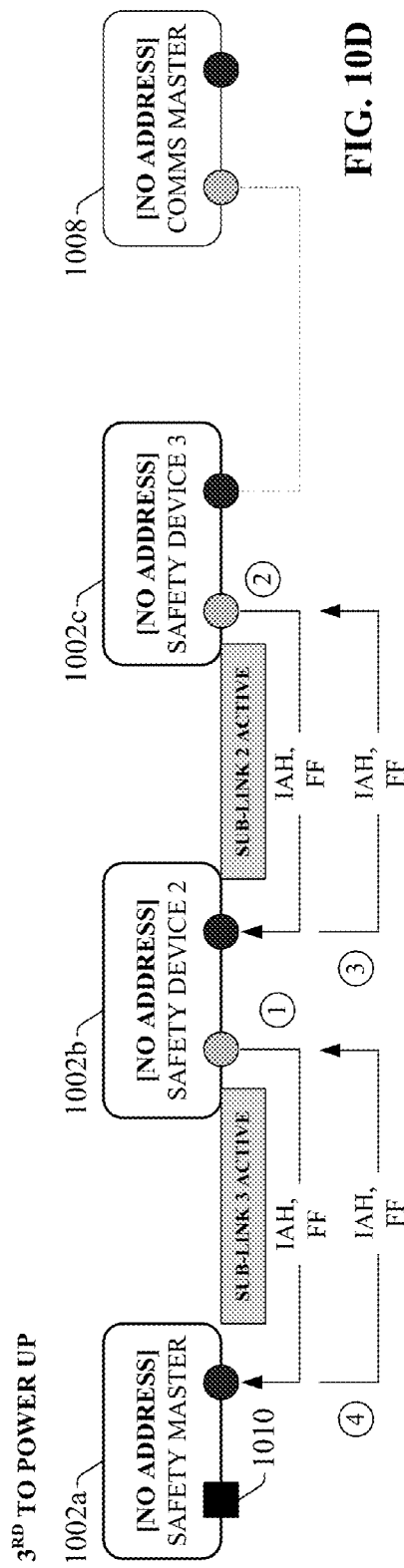
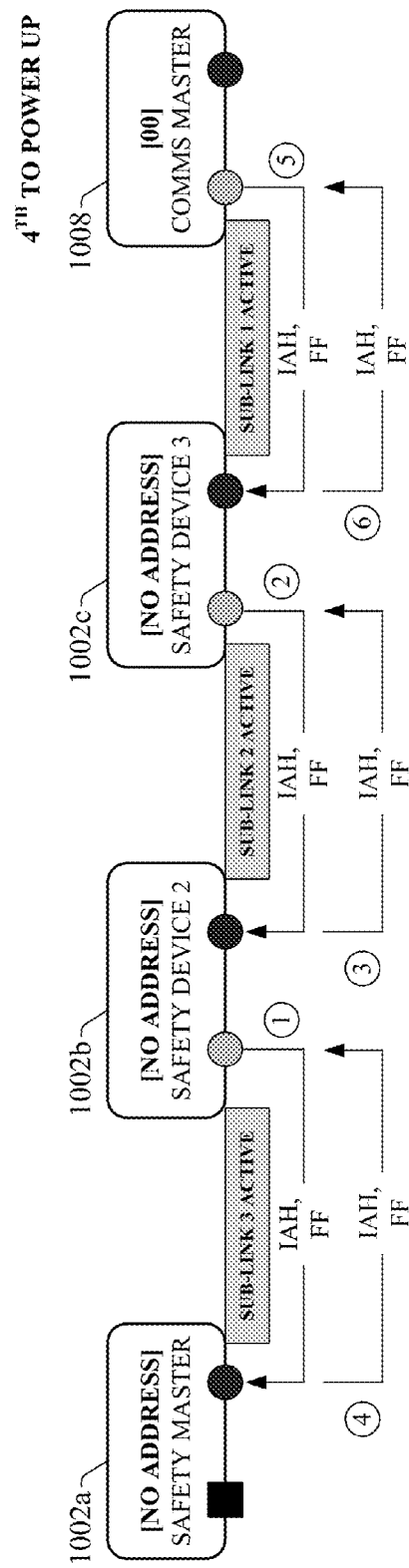

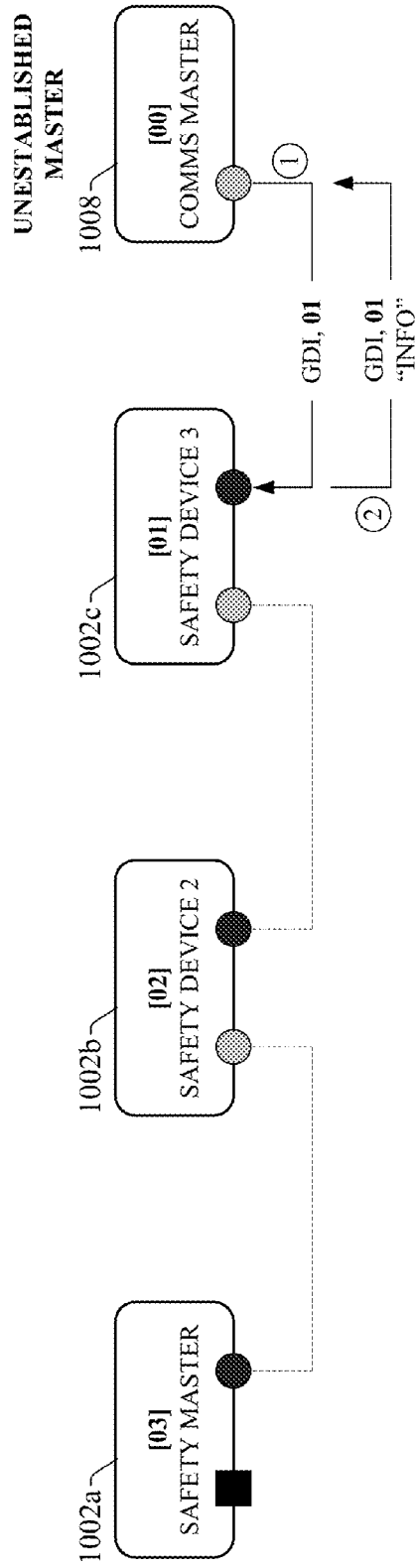
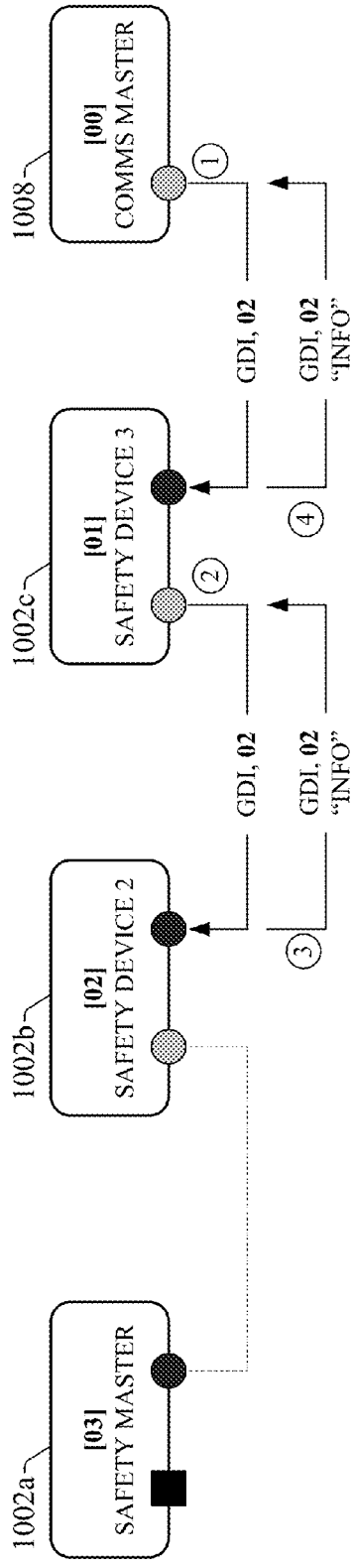
FIG. 13A
FIG. 13B

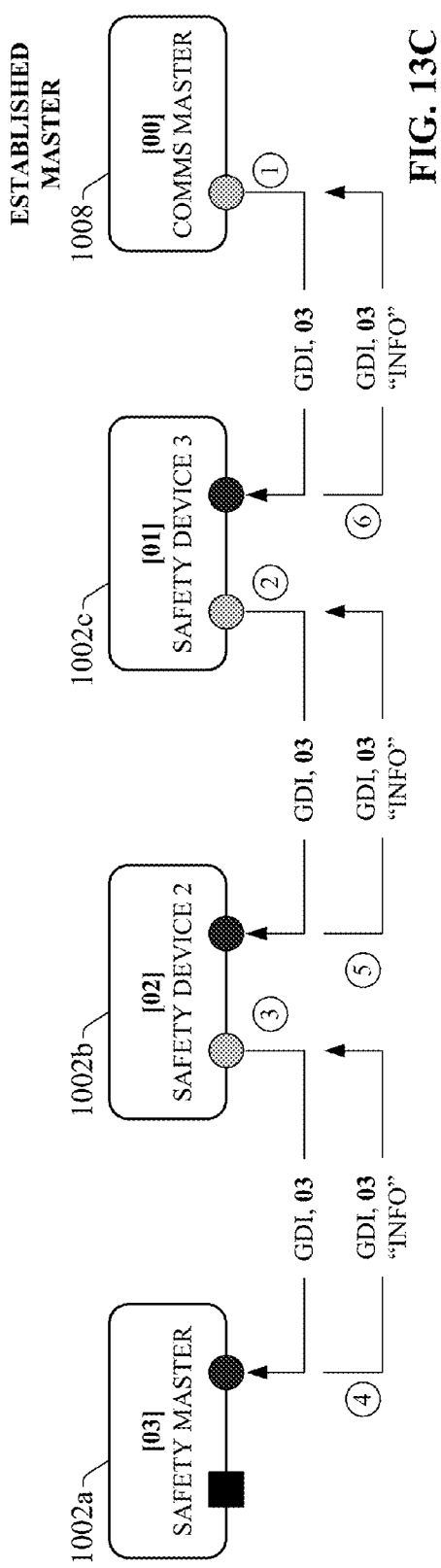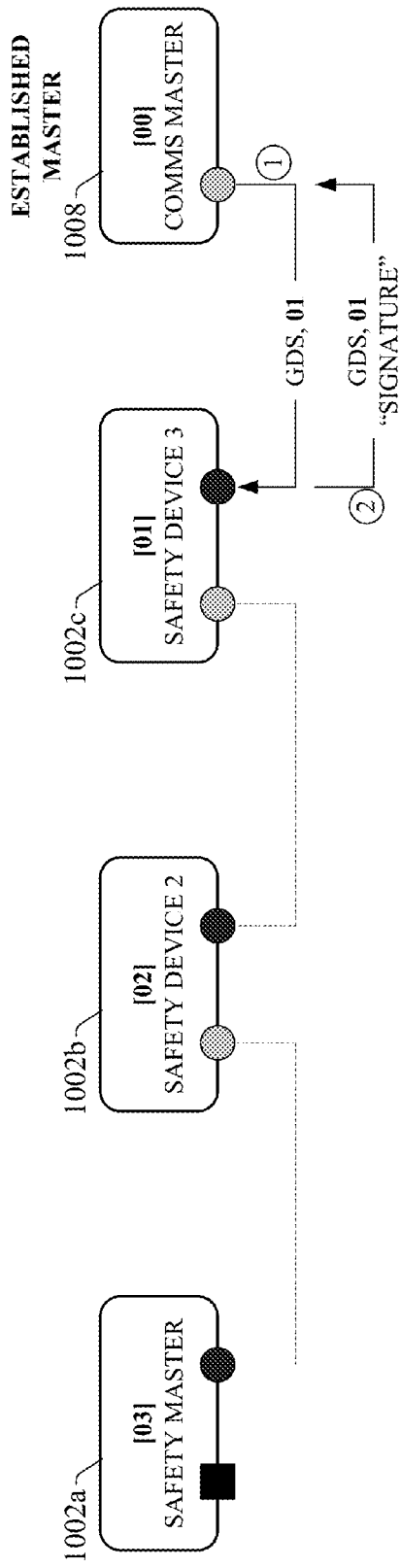

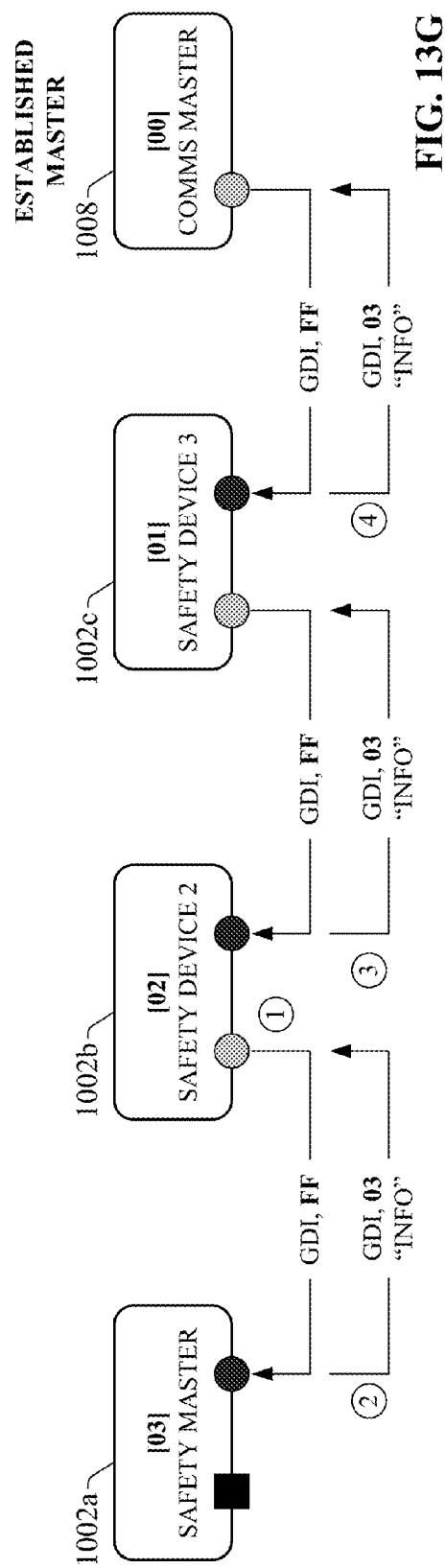

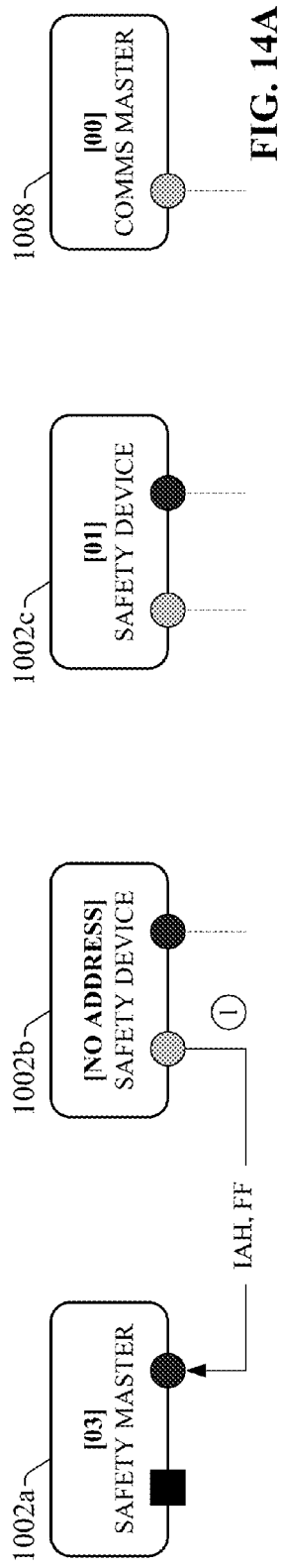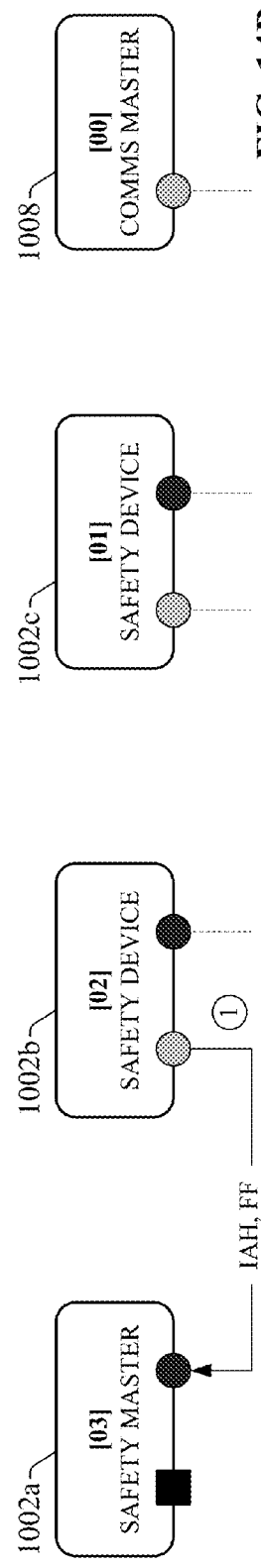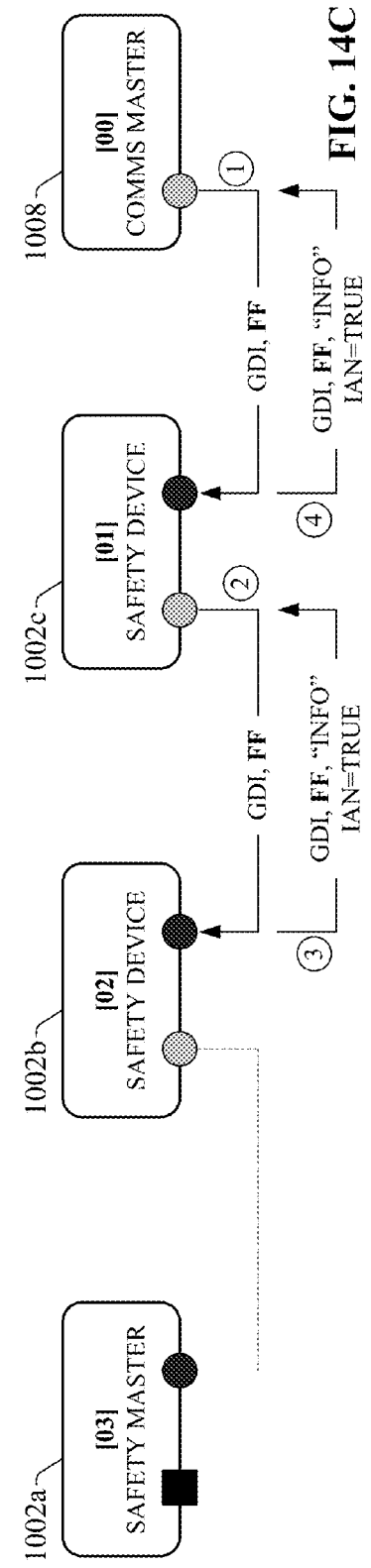

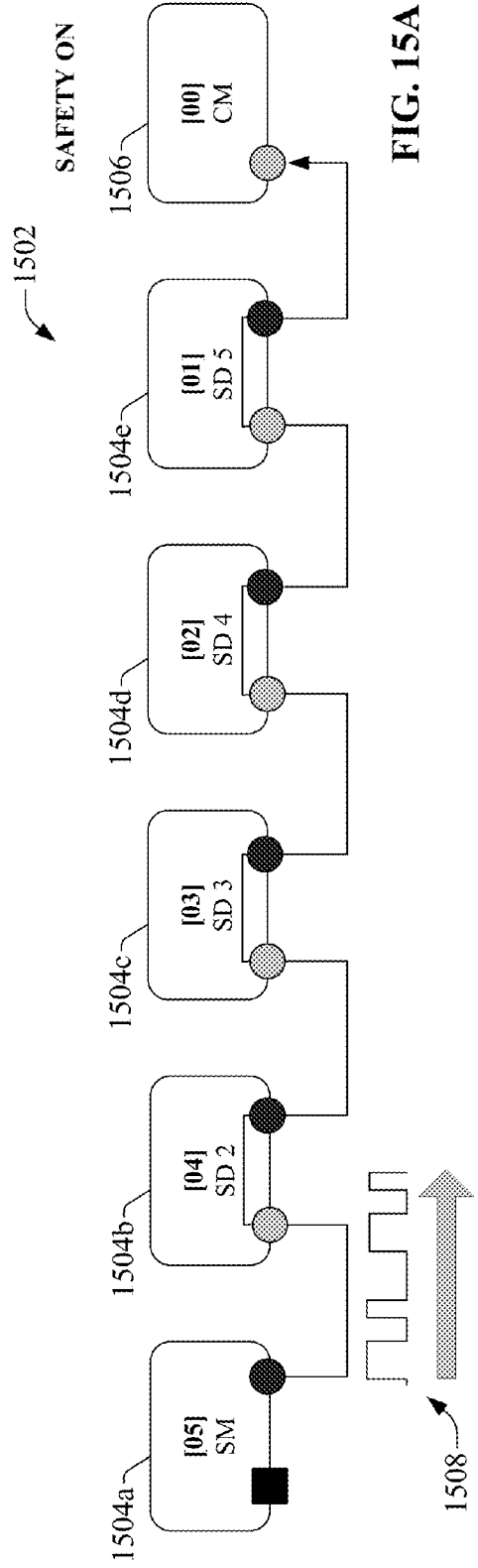
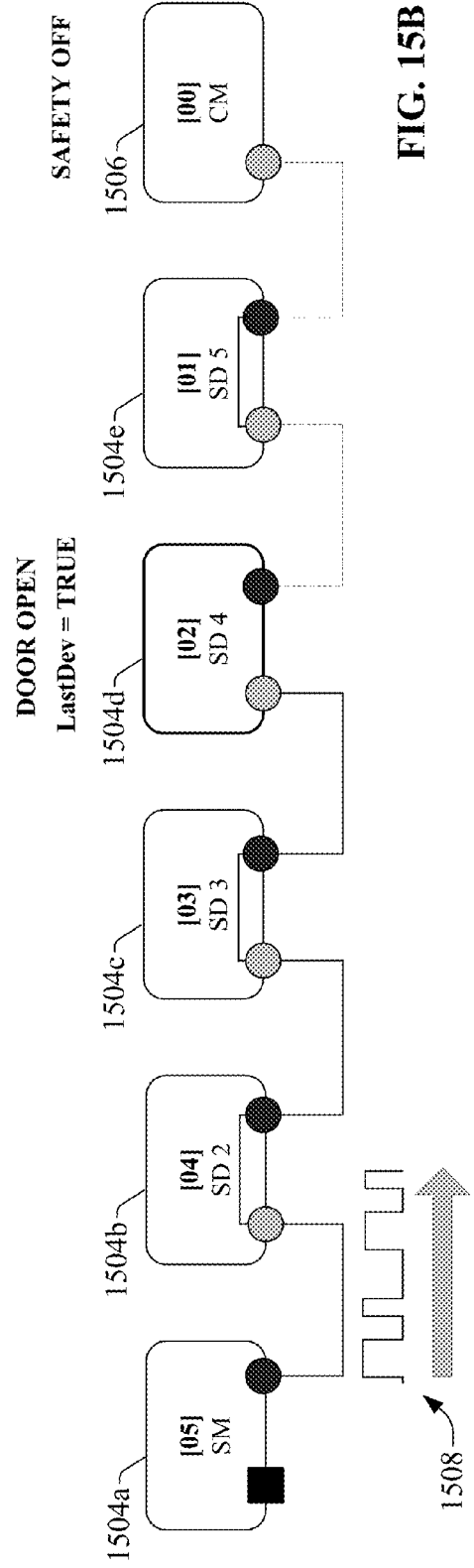
FIG. 15A
FIG. 15B

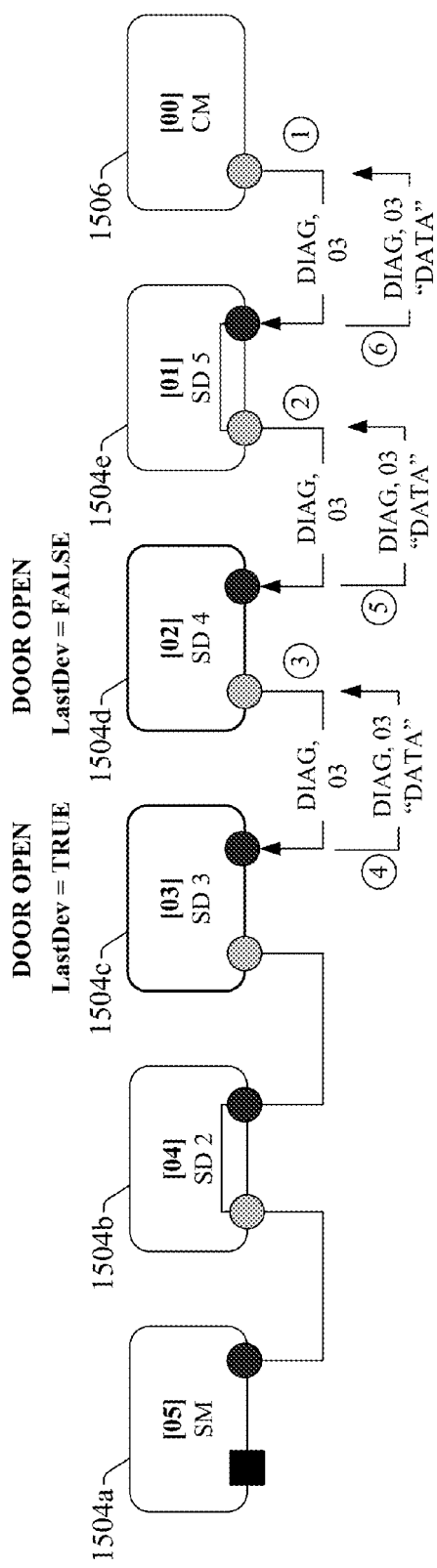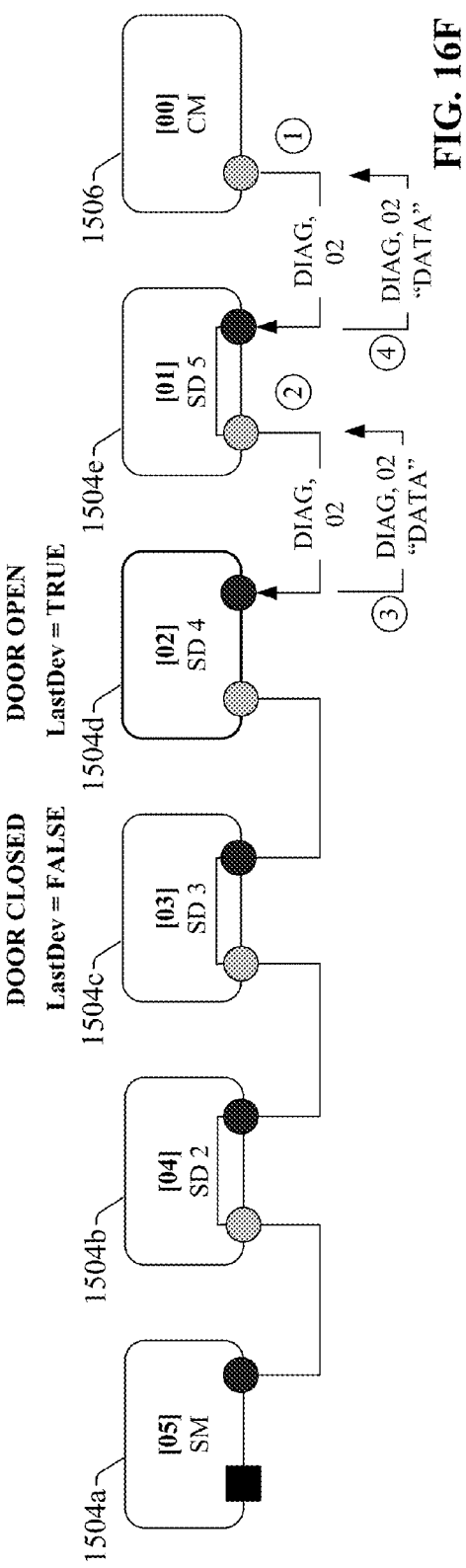

DIAGNOSTICS AND ENHANCED FUNCTIONALITY FOR SINGLE-WIRE SAFETY COMMUNICATION

BACKGROUND

The subject matter disclosed herein relates generally to industrial safety systems, and, more particularly, to a single-wire safety architecture that facilitates safety-rated monitoring of safety input devices as well as diagnostics and enhanced functionality over a single-wire communication channel.

BRIEF DESCRIPTION

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

In one or more embodiments, a safety input device is provided, comprising a safe state detection component configured to determine whether the safety input device is in a safe state; a pulse detection component configured to verify that a modulated pulse pattern of a safety signal received on an input terminal of the safety input device corresponds to a defined pulse pattern; a safety signal relaying component configured to output the safety signal on an output terminal of the safety input device in response to verification that the modulated pulse pattern corresponds to the defined pulse pattern and a determination that the safety input device is in the safe state; and a message processing component configured to process a first input message received via the input terminal, to process a second input message received via the output terminal, to send a first output message via the input terminal, and to send a second output message via the output terminal.

Also, one or more embodiments provide a method for operating a safety input device on a single-wire safety circuit, comprising determining, by a safety input device comprising a processor, whether the safety input device detects a safe status; comparing, by the safety input device, a pulse pattern carried by a safety signal received on an input terminal of the safety input device with a defined pulse pattern; in response to determining that the pulse pattern matches the defined pulse pattern based on the comparing and that the safety input device detects the safe status, outputting the safety signal via an output terminal of the safety input device; processing a first input message received via the input terminal; processing a second input message received via the output terminal; sending a first output message via the input terminal; and sending a second output message via the output terminal.

Also, according to one or more embodiments, a non-transitory computer-readable medium is provided having stored thereon instructions that, in response to execution, cause a system to perform operations, the operations comprising confirming that a safety signal received on an input terminal of the safety input device carries a modulated pulse pattern corresponding to a defined pulse pattern; in response to the confirming and a determination that the safety input device is in a safe state, outputting the safety signal via an output terminal of the safety input device's safety function is valid; processing a first input message received via the input terminal; processing a second input message received via the output terminal; sending a first output message via the input terminal; and sending a second output message via the output terminal.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIGS. 10A-10E are block diagrams illustrating power up, auto-detection, and sub-link phases of an example single-wire safety system.

FIGS. 13A-13G are block diagrams illustrating the link identification phase of an example single-wire safety system.

FIGS. 14A-14C are block diagrams illustrating a scenario in which a safety device on a previously established single-wire safety link has been reset and cleared of its address.

FIGS. 15A-15D are block diagrams illustrating safety and diagnostic modes for an example single-wire safety system.

FIGS. 16A-16F are block diagrams illustrating how messaging is performed in a scenario in which multiple safety devices switch to their safe state.

DETAILED DESCRIPTION

Figure 1:
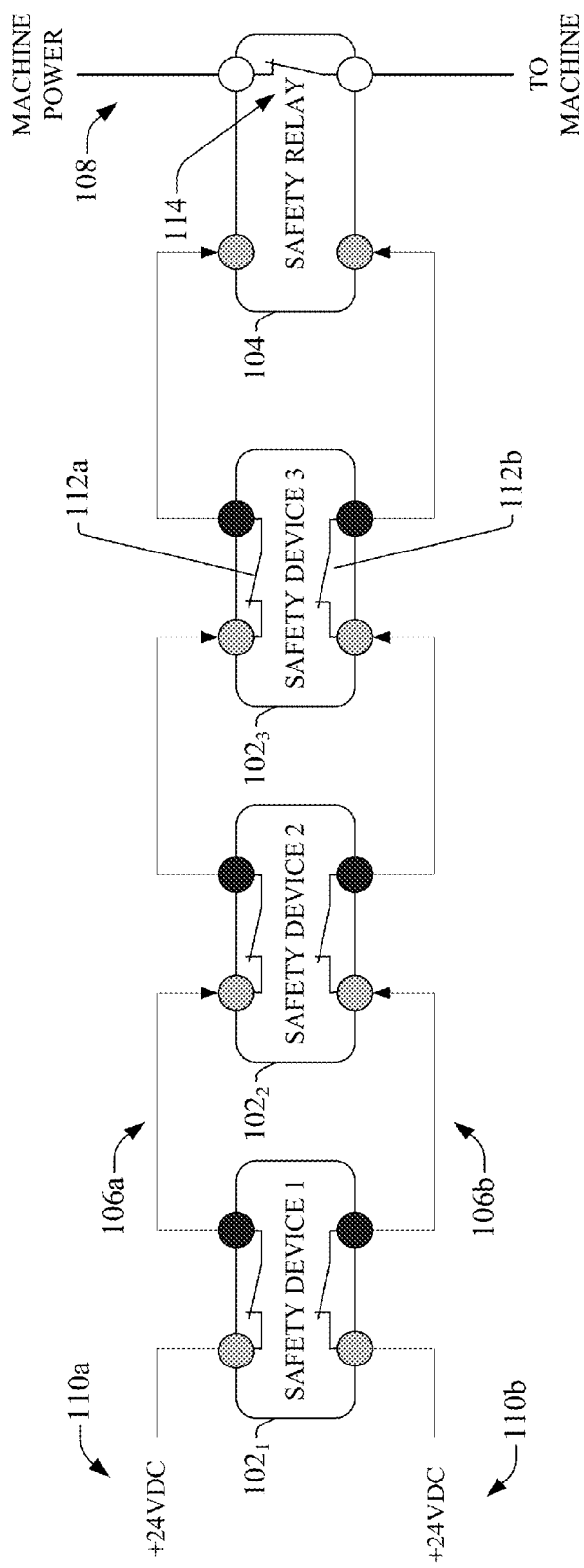
FIG. 1 is a block diagram of an example safety circuit that utilizes redundant signal paths to improve safety reliability.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Modern industrial automation systems often include a number of hazardous machine access points that, if inappropriately breached, may cause injury to an operator. These access points can expose the operator to risks associated with dangerous machine components, including but not limited to crushing by moving parts, electrocution through contact with exposed high-voltage lines or components, chemical burn, laceration or dismemberment by a moving blade, radiation exposure, or other such hazards To mitigate the risks associated with these access points, plant engineers typically implement safety systems designed to protect operators who interact with the access points. These safety systems often include a safety relay or controller that monitors the states of various safety input devices, and disconnects power to hazardous machine components if any of the safety input devices indicate a potentially unsafe condition. An example safety input device may comprise a proximity switch installed on a safety gate that provides access to a hazardous machine. The proximity switch output may be provided as an input to the safety relay, which operates a contactor to isolate power from the machine when the proximity switch indicates that the safety gate is open. In another example, an access point that allows an operator to load a part in a stamping press area may be protected by a light curtain that detects when a physical body (e.g., an operator's arm) has reached through the access point. As with the example proximity switch described above, the light curtain's output can be tied to the safety relay as an input, such that the safety relay isolates power to the press while the light curtain is broken by the detected body Other example safety input devices can include, but are not limited to, emergency stop pushbuttons, industrial safety mats that detect human presence at a particular area based on weight detection, emergency pull-cord devices, photoelectric or laser-based sensors, or other such safety detection devices.

The functional safety solutions implemented for a hazardous access point must be compliant with current industry-specific functional safety standards, such as those defined by the International Organization for Standardization (ISO) or the International Electrotechnical Commission (IEC). Such standards may define formal methodologies for determining a risk level associated with a machine, and provide statutory guidelines for designing safety systems to mitigate the risk. These safety standards dictate safety system types and configurations that must be implemented to counter a particular type of hazard.

To ensure highly reliable safety response even in the event of a failure of one or more safety input devices, safety systems are often designed with dual redundant channels for conveying a safety signal. FIG. 1 illustrates an example safety circuit that utilizes redundant signal paths to improve safety reliability. In this example, safety devices 102 are connected in series to a safety relay 104. Safety devices 102 comprise devices that verify whether the safety relay should enter the safe state based on their respective access points, including but not limited to proximity switches that determine when a safety gate is in the closed position, emergency stop pushbuttons, safety mats, light curtains, etc. Each of the safety devices 102 are equipped with dual redundant contacts 112a and 112b that are designed to close when the device is in the safe state, allowing respective 24 VDC signals 110 to pass.

Safety relay 104 includes at least one resettable contact 114 that controls the connection of machine power 108 to at least one machine, motor, or industrial device. Safety relay 104 will only allow the contact 114 to be reset if both 24 VDC signals are detected, indicating that all safety devices 102 have validated their safety functions. If any of the safety devices 102 switch to a safe state (e.g., a light curtain is broken, an emergency stop button is pressed, a safety door is opened, etc.), the circuit to the safety relay 104 is broken, and the safety relay 104 isolates power from the machine, placing the industrial system in a safe state by preventing hazardous motion.

The use of two separate paths through the safety devices improves safety reliability by ensuring that the safety relay 104 disconnects machine power when a safety device switches to a safe state even in the event that one of the safety device's internal contacts has failed. That is, even if one of the two contacts within a safety device has fused closed, the second contact will still open in response to detection of the safe state, ensuring that the safety relay 104 will see the loss of the 24 VDC signal and disconnect power from the machine. While providing an enhanced degree of safety reliability, implementation of dual redundant signal paths consumes additional terminal space and doubles the wiring requirement relative to a single-wire solution. Moreover, the presence of two separate channels introduces the possibility of cross faults between the two lines, which can prevent the safety relay from detecting an open in the safety circuit.

Figure 2:
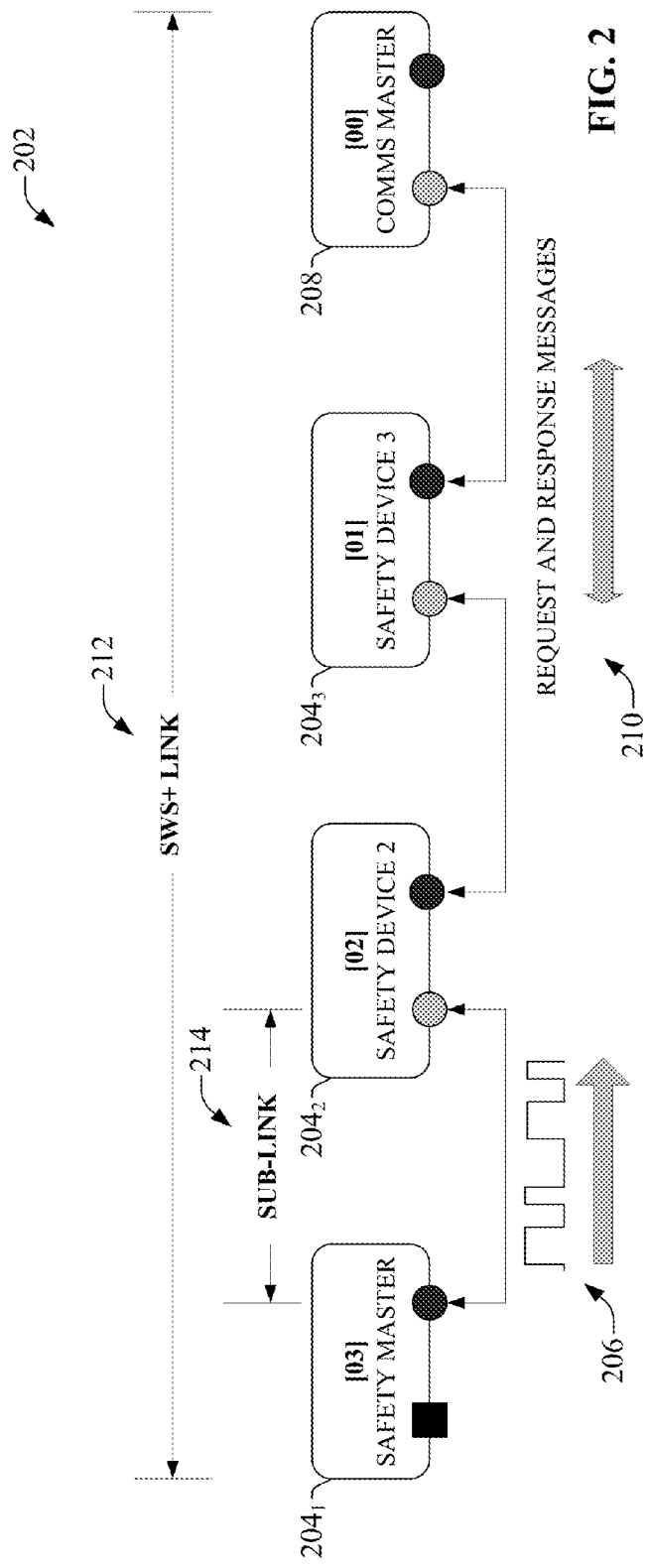
FIG. 2 is a block diagram of an example single-wire safety system architecture.

To address these and other issues, one or more embodiments of the present disclosure provide a single-wire safety system architecture that provides reliable safety device monitoring without the need for dual redundant signal channels. FIG. 2 illustrates an example single-wire safety system architecture 202 according to one or more embodiments. The safety system architecture 202 comprises a safety relay acting as a communications master 208 (referred to herein as a "comms master") and three safety devices 204 connected in series with the safety relay (although any number of safety devices may be added to the safety circuit without departing from the scope of this disclosure). The safety devices are configured for compliance with a single-wire safety communication protocol, to be described in more detail herein. Safety device $204_1$, which is farthest from the comms master 208 in the communication chain, serves as a safety master. A safety device acting as safety master generates a defined pulse train 206 that is passed through each safety device in the chain to the comms master 208 (the safety relay), which remains in operational mode as long as the defined pulse train 206 is recognized. The total path between the safety master $204_1$ and the comms master 208 comprises a single-wire safety plus (SWS+) link 212, which is made up of multiple sub-links 214 between adjacent safety devices on the circuit. When one of the safety devices 204 identifies the loss of its safety function (e.g., opening of a safety gate, pressing of an emergency stop button, etc.) and enters the safe state, that device ceases to pass the pulse train 206 to downstream devices, preventing the signal from reaching the comms master 208. Upon detecting loss of the pulse train signal, the comms master 208 isolates power to the industrial system components (e.g., machine, industrial device, motor, etc.).

In some embodiments, to ensure a high degree of safety reliability without the use of dual redundant signal channels, each safety device on the circuit is configured to perform a two-channel evaluation of the pulse signal. Moreover, the safety master $204_1$, which generates the pulse train 206, can be configured to monitor two-channel feedback of the output signal, such that short-circuiting of the signal to 24 VDC, 0 VDC, or to other clocked signals can be detected.

The architecture implements a bi-directional communication protocol on the single-wire safety channel, allowing the devices in the chain to share information—including but not limited to status data, address information, presence indications, etc.—via the same channel over which the pulsed signal is sent. The single-wire protocol allows the safety devices to exchange request and response messages 210 over the channel, while coordinating sending and receiving of these messages with transmission of the pulse train 206.

Figure 3:
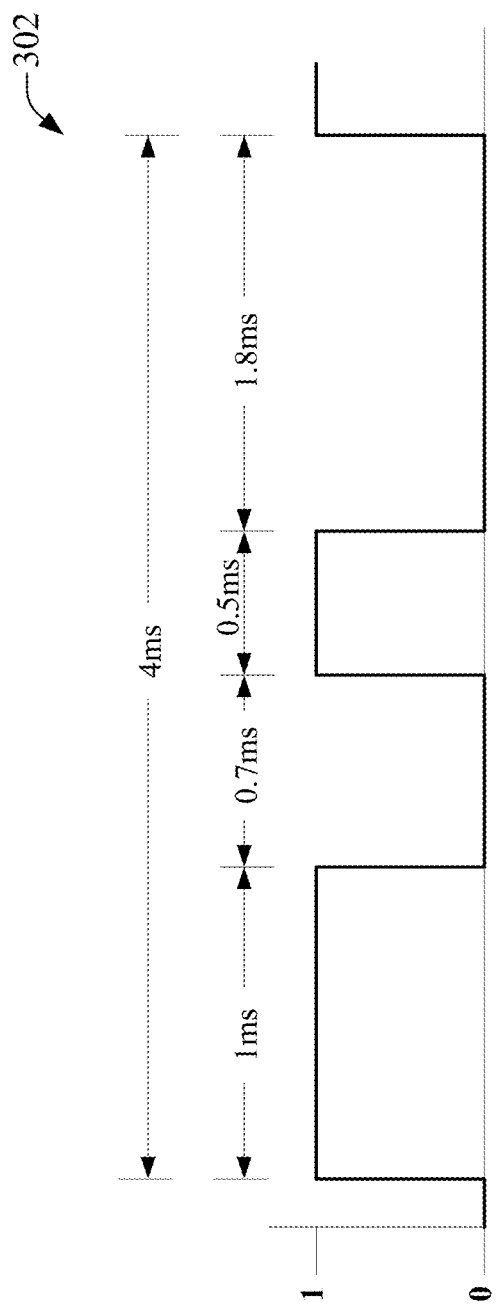
FIG. 3 is a timing chart of an example pulse signal that can be generated by a safety master device.

FIG. 3 is a timing diagram of an example pulse signal 302 that can be generated by the safety master device. The pulse pattern illustrated in FIG. 3 is not intended to be limiting, and it is to be appreciated that any pulse pattern may be implemented without departing from the scope of one or more embodiments of this disclosure. In this example, the pulse signal 302 has a total period of 4 ms, comprising a 1 ms ON signal, a 0.7 ms OFF signal, a 0.5 ms ON signal, and a 1.8 ms OFF signal. Safety devices and comms masters compliant with the single-wire protocol can be configured to recognize and generate this pulse pattern. The comms master can be configured to enable the safety relay outputs when this pulse pattern is received from the safety device nearest to the comms master on the safety circuit.

Figure 4:
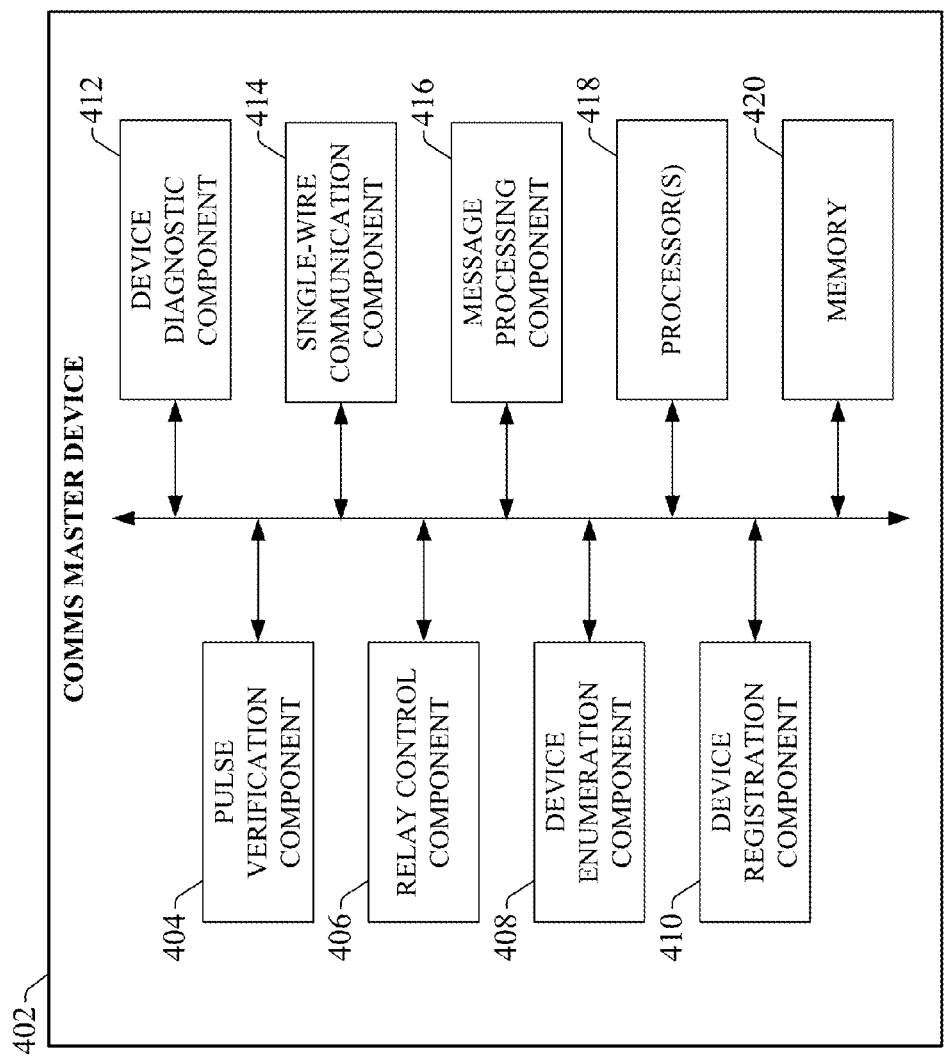
FIG. 4 is a block diagram of an example comms master device.

FIG. 4 is a block diagram of an example comms master device according to one or more embodiments of this disclosure. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Comms master device 402 can include a pulse verification component 404, a relay control component 406, a device enumeration component 408, a device registration component 410, a device diagnostic component 412, a single-wire communication component 414, a message processing component 416, one or more processors 418, and memory 420. In various embodiments, one or more of the pulse verification component 404, relay control component 406, device enumeration component 408, device registration component 410, device diagnostic component 412, single-wire communication component 414, message processing component 416, the one or more processors 418, and memory 420 can be electrically and/or communicatively coupled to one another to perform one or more of the functions of the comms master device 402. In some embodiments, components 404, 406, 408, 410, 412, 414, 416 can comprise software instructions stored on memory 420 and executed by processor(s) 418. Comms master device 402 may also interact with other hardware and/or software components not depicted in FIG. 4. For example, processor(s) 416 may interact with one or more external user interface devices, such as a keyboard, a mouse, a display monitor, a touchscreen, or other such interface devices.

Pulse verification component 404 can be configured to receive a pulse signal via a single-wire safety input terminal and identify a defined pulse pattern conveyed on the signal (e.g., the example pulse pattern illustrated in FIG. 3 or another pulse pattern). Relay control component 406 can be configured to control the state of one or more safety relays based on detection of the defined pulse pattern by the pulse verification component 404. Device enumeration component 408 can be configured to generate and exchange message signals with respective safety devices on a safety circuit in connection with setting and recording device identifiers (addresses) for each safety device. Device registration component 410 can be configured to exchange message signals with the safety devices in connection with collecting information about the safety devices (e.g., device types, hardware and software revision numbers, device signatures, etc.), and registering the collected device information in memory 420.

Device diagnostic component 412 can be configured to exchange message signals with the safety devices in connection with collecting fault or status information from the devices. Single-wire communication component 414 can be configured to coordinate bi-directional data traffic on the signal-wire channel. Message processing component 416 can be configured to process input messages received on the single-wire safety input terminal and to send output messages on the single-wire safety output terminal for transmission on the single-wire safety channel. Messages sent and received via the single-wire safety input terminal can include, but are not limited to, enumeration messages, device information request and response messages, messages indicating that the comms master device is active, and other such messages.

The one or more processors 418 can perform one or more of the functions described herein with reference to the systems and/or methods disclosed. Memory 420 can be a computer-readable storage medium storing computer-executable instructions and/or information for performing the functions described herein with reference to the systems and/or methods disclosed.

Figure 5:
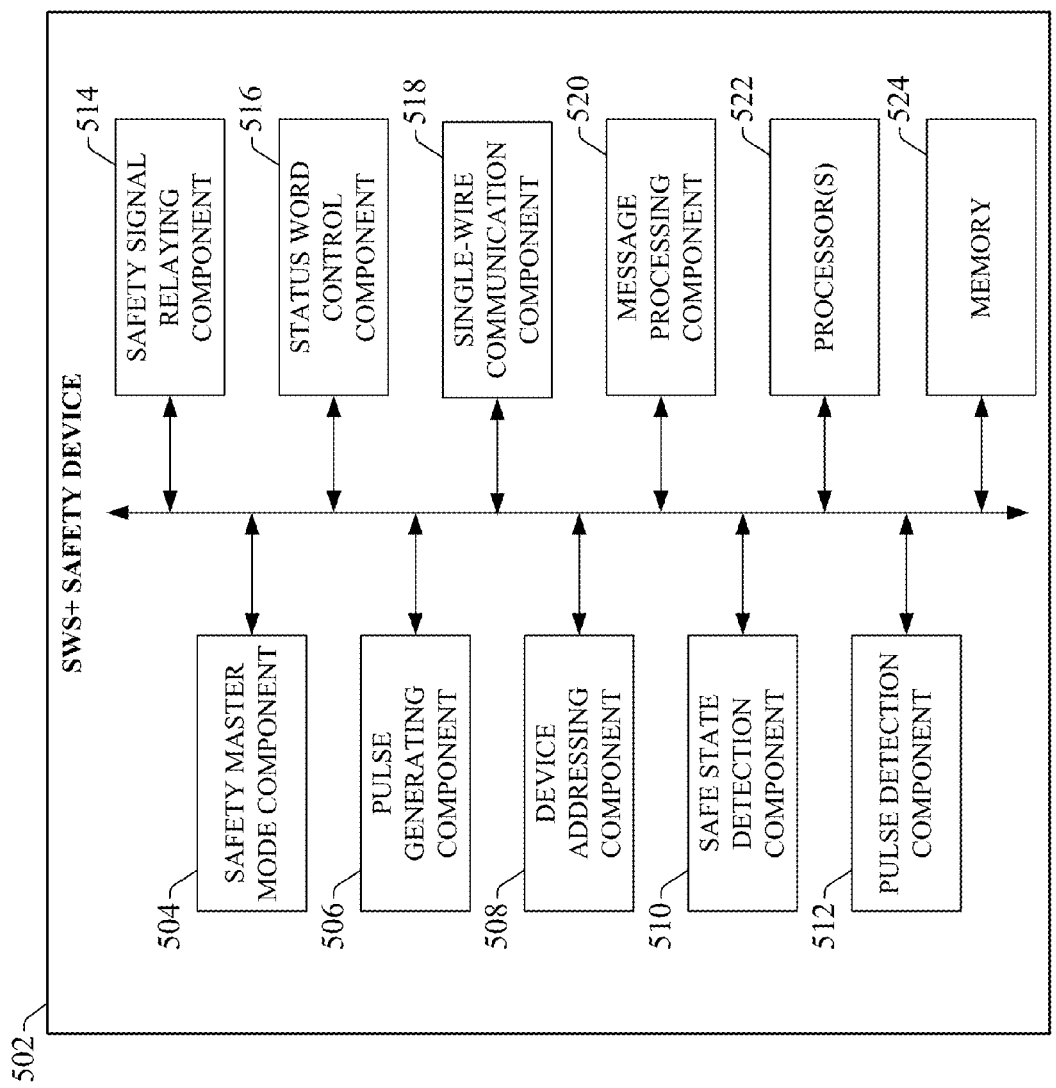
FIG. 5 is a block diagram of an example SWS+ safety device.

FIG. 5 is a block diagram of an example SWS+ safety device 502 according to one or more embodiments of this disclosure. SWS+ safety device 502 can comprise substantially any type of safety input device, including but not limited to an emergency stop pushbutton, a light curtain, photo sensor, a safety mat, a safety door switch (e.g., a proximity switch or reed switch), an emergency pull cord device, a laser scanner, or other type of safety input device.

SWS+ safety device 502 can include a safety master mode component 504, a pulse generating component 506, a device addressing component 508, a safe state detection component 510, a pulse detection component 512, a safety signal relaying component 514, a status word control component 516, a single-wire communication component 518, a message processing component 520, one or more processors 522, and memory 524. In various embodiments, one or more of the safety master mode component 504, pulse generating component 506, device addressing component 508, safe state detection component 510, pulse detection component 512, safety signal relaying component 514, status word control component 516, single-wire communication component 518, message processing component 520, the one or more processors 522, and memory 524 can be electrically and/or communicatively coupled to one another to perform one or more of the functions of the SWS+ safety device 502. In some embodiments, components 504, 506, 508, 510, 512, 514, 516, 518, and 520 can comprise software instructions stored on memory 524 and executed by processor(s) 522. SWS+ safety device 502 may also interact with other hardware and/or software components not depicted in FIG. 5. For example, processor(s) 522 may interact with one or more external user interface devices, such as a keyboard, a mouse, a display monitor, a touchscreen, or other such interface devices.

Safety master mode component 504 can be configured to control whether the SWS+ safety device 502 operates as a safety master device within a single-wire safety system. If the SWS+ safety device 502 operates in safety master mode, the device 502 will generate the pulsed safety signal to be placed on the single-wire communication channel. Alternatively, if the SWS+ safety device 502 does not operate in safety master mode, the device 502 will receive the pulsed safety signal from an upstream safety device via the single-wire communication channel and, if the safety device 502 is not in a safe state, relay the pulse signal to the next downstream device on the safety circuit. In one or more embodiments, the safety master mode component 504 can switch the SWS+ safety device to safety master mode in response to detecting the presence of a terminator on the device's single-wire safety channel input terminal.

The pulse generating component 506 can be configured to generate the pulse pattern (e.g., pulse signal 302 of FIG. 3 or another pattern) and output the pulse pattern on the device's single-wire safety channel output terminal if the device 502 is operating in safety master mode. The device addressing component 508 can be configured to set an address for the SWS+ safety device 502, and to report this address to other devices on the safety circuit via messages sent over the single-wire communication channel. The safe state detection component 510 can be configured to determine whether the SWS+ safety device 502 is in its safe state. The conditions for identifying the safe state of the SWS+ safety device depend on the type of safety device. For example, a door-mounted reed switch is considered to be in its safe state when the switch is not in proximity to its corresponding magnet, indicating that the safety door on which the switch is mounted is opened. In another example, a light curtain is considered to be in its safe state when objects are detected between the light curtain's transmitter and receiver photo-arrays.

Pulse detection component 512 can be configured to identify presence of the defined pulse pattern on the device's single-wire safety channel input terminal. The safety signal relaying component 514 can be configured to relay the pulsed safety signal from the single-wire safety channel input terminal to a single-wire communication output terminal for transmission to the next downstream device if certain defined conditions are satisfied. The defined conditions can include at least detection of a valid pulse pattern on the safety signal received at the safety input terminal (as determined by the pulse detection component 512), and verification that the SWS+ safety device is not in its safe state (as determined by the safe state detection component 510).

Status word control component 516 can be configured to set status bits and words based on detected statuses of the SWS+ safety device, and to send the status bits and words to other devices on the safety circuit via the single-wire communication channel. Single-wire communication component 518 can be configured to coordinate bi-directional communication on the single-wire communication channel. Message processing component 520 can be configured to process input messages received on either the single-wire safety channel input terminal or the single-wire safety channel output terminal, and to send output messages on either the input or output terminal. As will be described in more detail herein, input messages received on the input or output terminal via the single-wire channel can include, but are not limited to, requests to provide device information, requests for the safety device's signature, enumeration messages, or other such input messages. Output messages can include, but are not limited to, response messages including the safety device's signature or device information, enumeration messages, device presence messages, relayed requests for another device's information, or other such messages.

The one or more processors 522 can perform one or more of the functions described herein with reference to the systems and/or methods disclosed. Memory 524 can be a computer-readable storage medium storing computer-executable instructions and/or information for performing the functions described herein with reference to the systems and/or methods disclosed.

Figure 6:
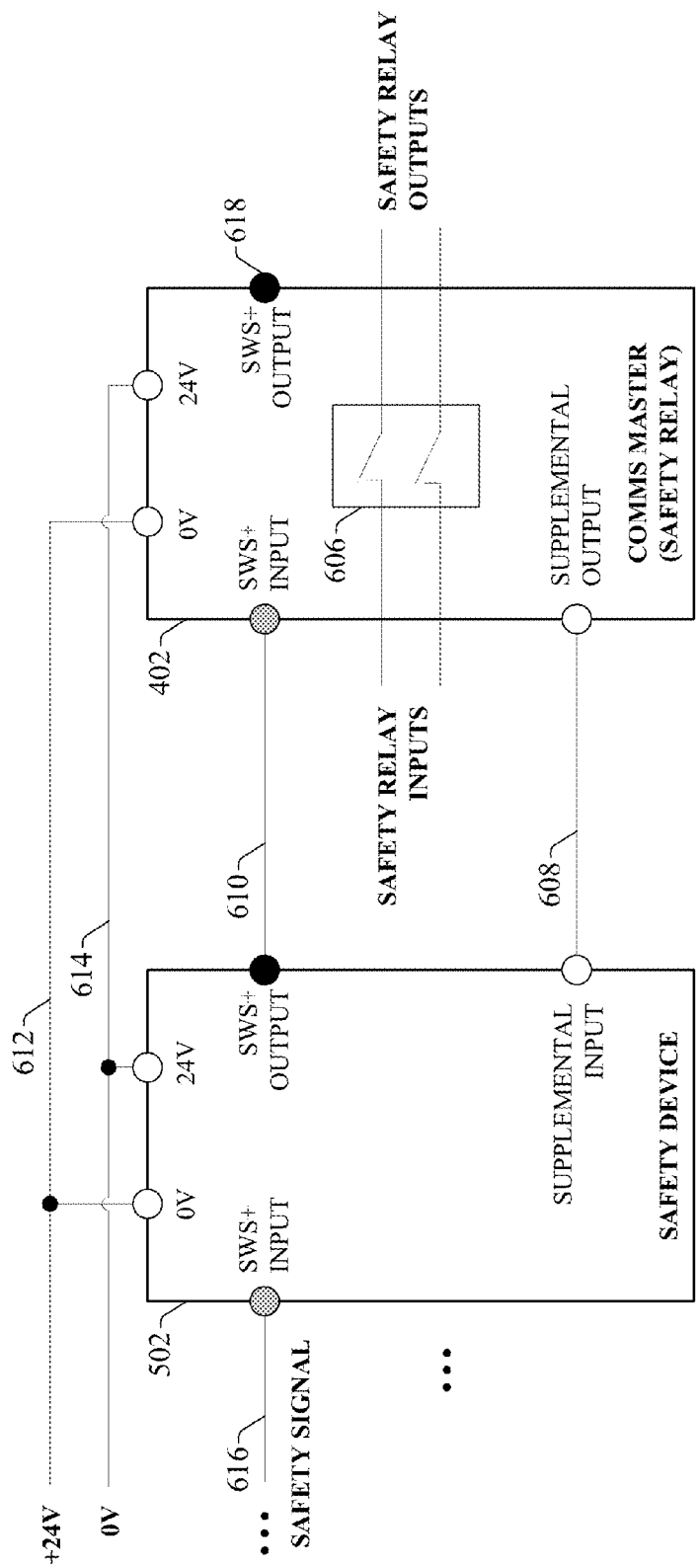
FIG. 6 is an example wiring schematic illustrating connections between a safety device and a comms master.

FIG. 6 is an example wiring schematic illustrating connections between a safety device and a comms master. In this example, safety device 502 includes terminals for 0V and 24 VDC power, an SWS+ INPUT terminal, and an SWS+ OUTPUT terminal. During normal operation (SWS mode), the SWS+ INPUT terminal receives the pulsed safety signal from an upstream safety device on line 616, and the SWS+ OUTPUT terminal sends the safety signal to the next downstream device on line 610 (in the illustrated example, the next downstream device is the comms master 402; in the present disclosure, the terms "upstream" and "downstream" are relative to the direction of the pulsed safety signal from the safety master to the comms master). Safety device 502 will only send the pulse signal out on the SWS+ OUTPUT terminal if the valid pulse pattern is present on the SWS+ INPUT terminal and the safety device 502 is not in the safe state. During diagnostic or configuration mode, safety device 502 uses the SWS+ INPUT and SWS+ OUTPUT terminals to exchange configuration or diagnostic messages with adjacent devices over lines 616 and 610 (the single-wire channel) in a bi-directional manner, as will be described in more detail herein.

FIG. 6 depicts safety device 502 as being wired for normal operation, whereby the safety device 502 resides between two other devices on the safety circuit. However, if safety device 502 is the last device on the safety circuit, such that there are no other upstream devices from which to receive the safety signal, a terminator can be connected to the SWS+ INPUT terminal. When this terminator is detected on the SWS+ INPUT terminal, safety device 502 is configured to operate in safety master mode, whereby the safety device generates the pulsed safety signal for the safety circuit, as will be described in more detail herein.

Comms master 402 includes terminals for 0V and 24 VDC power, an SWS+ INPUT terminal for receiving the pulse signal on line 610, and an SWS+ OUTPUT terminal 618 for sending the pulse signal to another device (e.g., an expansion relay module or other device). Since the comms master 402 is typically a safety relay configured to comply with the single-wire communication protocol described herein, the comms master 402 also includes one or more safety contacts 606 for controlling application of machine power to one or more industrial machines or devices.

In some embodiments, comms master 402 may also include a SUPPLEMENTAL OUTPUT terminal for sending supplemental messages to safety devices on the safety circuit on a dedicated line 608 that is separate from the SWS channel. These messages can be received via SUPPLEMENTAL INPUT terminal on safety device 502. For example, comms master 402 may use the SUPPLEMENTAL OUTPUT terminal to send lock commands to safety devices that have integrated mechanical locks; e.g., remotely actuated door locks that include proximity switches to determine when the door is in the closed position. In such scenarios, the comms master can be programmed to actuate the locks in response to defined conditions to prevent the doors from being opened during dangerous operations. In another example, the comms master 402 may be configured to output a signal on the SUPPLEMENTAL OUTPUT terminal that, when received by the safety input devices, forces the safety input devices to switch from operational mode to the safe state (configuration or diagnostic mode).

Figure 7:
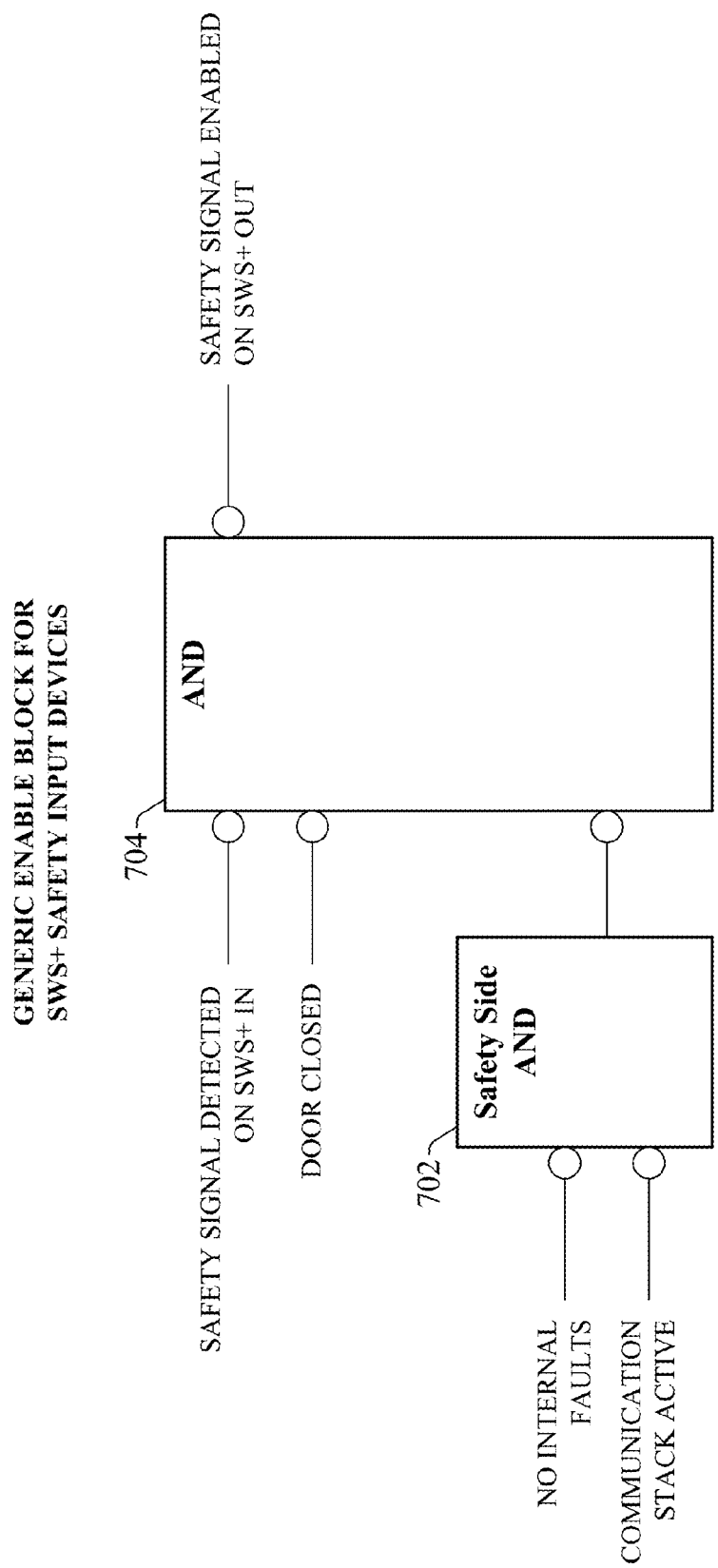
FIG. 7 is an example logic diagram illustrating enable conditions for an SWS+ OUTPUT terminal of a single-wire safety input device.

FIG. 7 is an example logic diagram illustrating the enable conditions for outputting the safety signal on the SWS+ OUTPUT terminal of safety device 502. The illustrated logic diagram can be implemented, for example, by the safety signal relaying component 514 illustrated in FIG. 5. In this example, the safety device is assumed to be a safety door switch that uses a proximity switch or reed switch to determine when a safety door or gate is in the closed position. AND block 704 determines whether the safety signal is detected on the safety device's SWS+ INPUT terminal, and whether the safety device registers its safety function is valid (in this example, the safe state is active when the door is closed) and whether the SUPPLEMENTAL OUTPUT is requesting the device to be in the safe state. The safety side AND block 702 determines whether any internal device faults are active, and whether the device's communication stack has become active. If no (a) internal faults are detected, (b) the communication stack is active, (c) the door is closed, (d) the SUPPLEMENTAL OUTPUT is not requesting a safe state, and (e) the safety signal is detected on the SWS+ INPUT terminal, the safety device enables the safety signal on the SWS+ OUTPUT terminal, thereby passing the received pulsed safety signal to the next sub-link of the single-wire safety channel.

Figure 8:
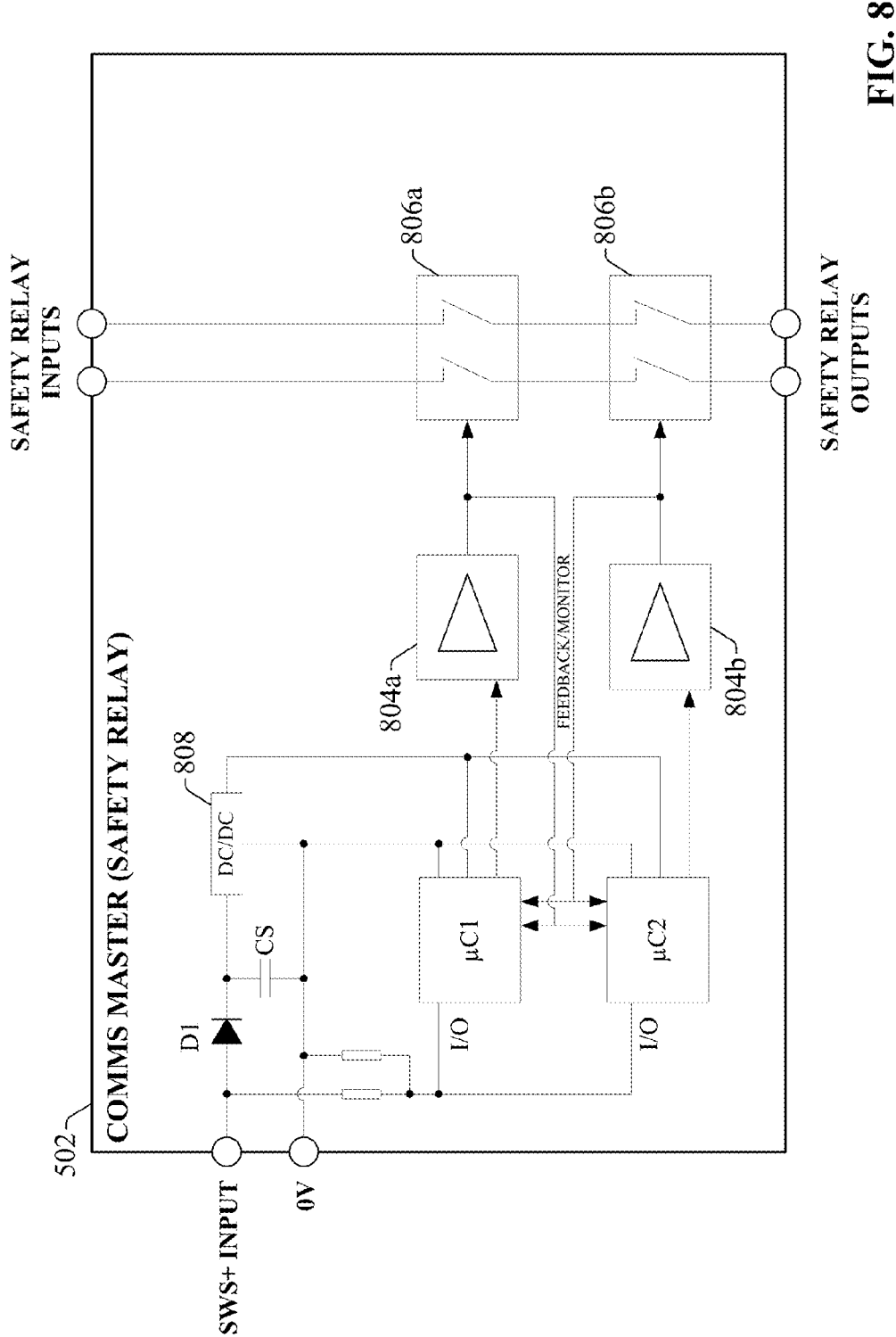
FIG. 8 is an example generalized electrical schematic that can be used to confirm receipt of a defined pulse signal on an SWS+ INPUT terminal of a comms master device.

FIG. 8 is an example generalized electrical schematic that can be used to confirm receipt of the defined pulse pattern on the SWS+ INPUT terminal of the comms master 402. The example schematic can reliably verify the pulse signal using independent redundant verification. For clarity, the circuitry used to control diagnostic and configuration message communication is omitted from FIG. 8, and the illustrated schematic only includes elements for confirming receipt of the defined pulse signal. It is to be appreciated that the schematic depicted in FIG. 8 is only intended to be exemplary, and that any suitable electrical design for controlling safety relay outputs based on presence or absence of a specified pulse pattern is within the scope of one or more embodiments of this disclosure.

The comms master 402 receives the pulsed safety signal via the SWS+ INPUT terminal, and splits the received signal between a power storage capacitor CS (e.g., an electrolyte capacitor) and two microcontrollers µC1 and µC2. A DC/DC converter 808 connected to the storage capacitor CS generates a supply power having a supply voltage of 5V from the input 24V pulse train signal. The 0V terminal receives the 0V ground potential. While all safety input devices on the safety circuit are in their respective safe states, comms master 402 is provided with the supply voltage via the diode D1, the storing capacitor CS and the DC/DC converter 808, representing the necessary operating voltage. When powered by the output of the DC/DC converter 808, the microcontrollers µC1 and µC2 are activated. If these microprocessors now additionally detect a valid pulse code at their I/O terminals, the driver units 804a and 804b are controlled to trigger the relay pairs 806a and 806b for providing a switched-on status of the safety relay outputs. Consequently, SWS+ INPUT must receive a voltage different from 0V, which additionally must have a valid pulse pattern in order to cause the comms master 402 to output a valid output signal.

With this safety device topology, it is possible to fulfill the requirements of category 4 of the safety standards using only a single-channel connection. The high safety category is achieved due to the predetermined pulse pattern conveyed on the signal and the two-channel evaluation of this signal using both microprocessors. Furthermore, by feeding back the output signals of the driver units 804a and 804b to both microprocessors in a parallel way, a plausibility check can be performed to ensure fault-free operation of the microprocessors.

When any of the safety input devices on the safety circuit go to the safe state (e.g., a light curtain is broken, an emergency stop pushbutton is pressed, etc.), the pulse signal is no longer received at the SWS+ INPUT terminal of the comms master 402, causing relay pairs 806a and 806b to open, thereby disconnecting power from the industrial devices fed by the safety relay outputs. Opening of the safety relay outputs is triggered when either of two criteria is met—when one or both of microcontrollers µC1 and µC2 do not detect a valid pulse pattern on their input terminals, or when the microcontrollers do not receive a supply voltage from DC/DC converter 808. Thus, a failure of one of the microcontrollers, one of the driver units 804a and 804b, or one of the relay pairs 806a and 806b does not prevent safe operation of the comms master 402.

Figure 9:
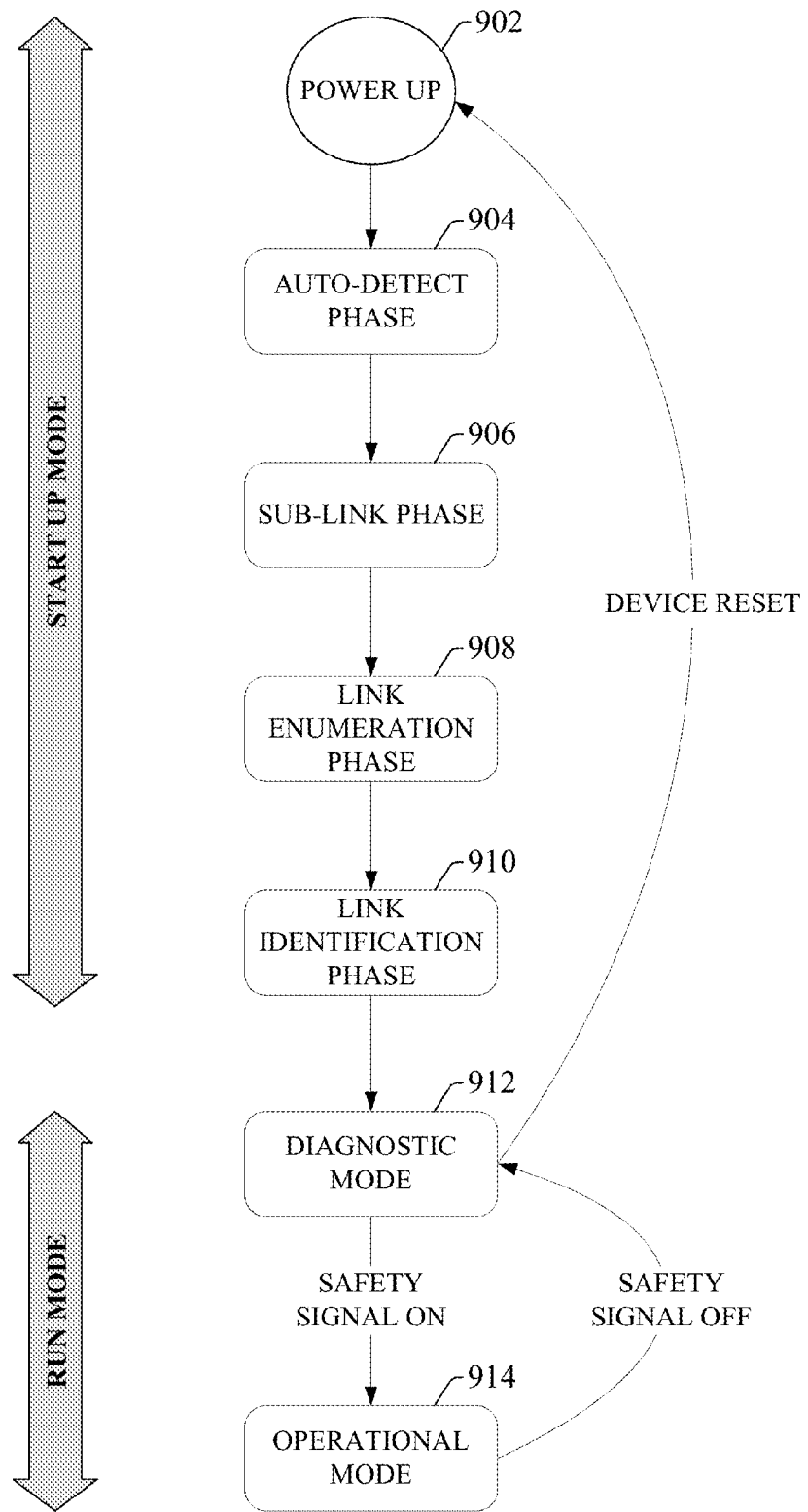
FIG. 9 is a state diagram illustrating the sequence of operations for a single-wire safety architecture.

FIG. 9 is a state diagram illustrating the sequence of operations for a single-wire safety architecture according to one or more embodiments. The operations can be classified according to start up mode operations (phases 902-910) and run mode operations (phases 912-914). FIG. 9 provides a general overview of the sequence of events during start up and operation of the single-wire safety circuit. The individual phases will be described in more detail herein. Start up mode begins with power up 902, during which power is applied to the safety input devices and comms master device comprising the single-wire safety circuit. As the devices on the circuit are powered up, the system enters the auto-detect phase, during which each device initializes, identifies adjacent devices on the circuit, and reports its presence to the adjacent devices. When two adjacent devices have detected each other, the sub-link phase 906 is entered, during which a communication sub-link between the two adjacent devices is established. As will be described in more detail herein, establishment of sub-links between adjacent devices is performed asynchronously, and it is not necessary for the comms master to be powered up before two adjacent safety input devices can establish a sub-link with one another. By allowing adjacent devices to establish sub-links asynchronously as they are powered up and identified, regardless of the state of the comms master, the total SWS+ link (comprising all sub-links between adjacent devices) can be established quickly.

When at least the sub-link between the comms master and its adjacent safety input device has been established, the system enters the link enumeration phase 908, during which the comms master addresses each device on the system. As will be described in more detail herein, the comms master may begin enumerating devices before all sub-links on the circuit have been established, provided there is a path of established sub-links between the comms master and at least one safety input device. Thus, there may be some overlap between the sub-link phase 906 and the link enumeration phase 908. After the link enumeration phase 908, the system enters the link identification phase 910, during which the comms master collects device information from each safety input device on the circuit, including but not limited to device type or model information, vendor information, hardware and software revision information, device data signatures, etc. The comms master records this device information on local memory.

Once phases 902-910 have completed, the system can enter normal operation (run mode). During diagnostic mode 912, the system determines whether the pulsed safety signal is present at the comms master, indicating that all safety input devices on the circuit are in their respective operation states. If the safety signal is detected ("safety signal on"), the system enters operational mode 914, during which the comms master allows its relays (e.g., relay pairs 806a and 806b of FIG. 8) to be closed, providing power to the industrial machines and devices connected to the safety relay outputs. If the safety signal is no longer detected at the comms master ("safety signal off"), indicating that one or more of the safety input devices has entered the safe state, the system transitions back to diagnostic mode 912, during which the comms master begins polling the safety input devices individually to determine which device has been switched and to collect other diagnostic information, as will be described in more detail herein. Message exchange between devices during diagnostic mode 912 is performed over the same single-wire communication channel over which the pulsed safety signal is sent. If a safety device on the circuit is reset (e.g., power is cycled on the device), steps 902-910 are repeated for that device.

Figure 10A:
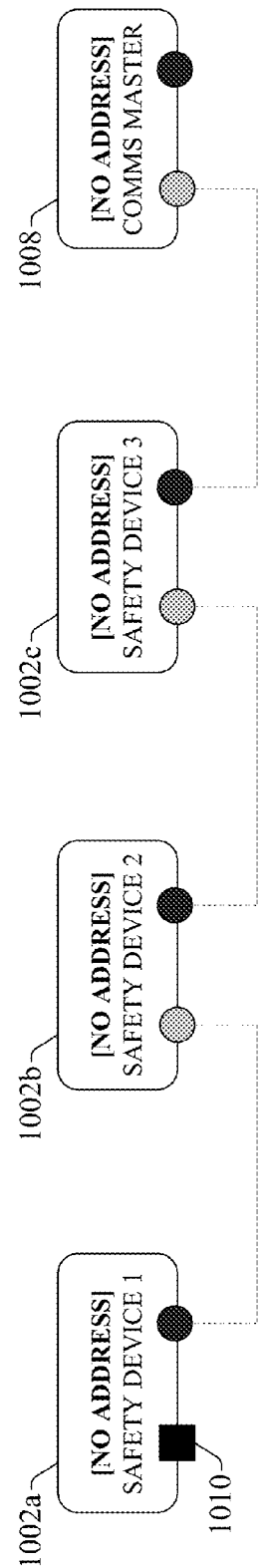

FIG. 10A-10E are block diagrams illustrating the power up, auto-detection, and sub-link phases according to one or more embodiments. FIG. 10A is a simplified block diagram of an example single-wire safety circuit prior to initial power up. The safety circuit includes three safety devices 1002a-1002c and a comms master 1008. Safety devices 1002a-1002c can comprise any types of safety input devices compatible with the single-wire communication protocol described herein, including but not limited to safety door switches, light curtains, photoelectric sensors, laser scanners, safety mats, emergency stop pushbuttons or pull cord devices, or other such safety devices.

The SWS+ OUTPUT terminal of each device on the safety circuit (depicted in black in FIG. 10A) is wired to the SWS+ INPUT terminal (in grey) of the next downstream device. Safety device 1002a, which is the last device on the safety circuit, is fitted with a terminator 1010 on its SWS+ INPUT terminal. As the last device, safety device 1002a will operate as the safety master for the single-wire safety circuit by generating the pulse pattern to be placed on the channel. The safety master device (safety device 1002a) and the comms master 108 act as anchors for the single-wire safety circuit.

Devices 1002a-1002c and 1008 initially lack SWS addresses prior to being powered up. As the devices are powered up, sub-links between adjacent devices are established in a piecemeal fashion depending on the order in which the devices become active. Turning to FIG. 10B, if safety device 1002b is the first device to power up, that device outputs an "I am here" (IAH) signal on its SWS+ INPUT terminal, sending the IAH message (labeled "1" in FIG. 10B) via the single-wire channel to the SWS+ OUTPUT terminal of the next upstream device (device 1002a). Since safety device 1002b has not yet obtained an address, the IAH signal is sent with a 0xFF address packet. Since safety device 1002a has not yet powered up, safety device 1002b does not yet receive a response to the IAH signal from that device. Safety device 1002b also begins listening for incoming IAH signals on its SWS+ OUTPUT terminal.

In this example, safety device 1002c is the second device to power up, as shown in FIG. 10C. As with safety device 1002b, safety device 1002c begins sending an IAH message with a 0xFF address packet (labeled "2" in FIG. 10C) to the next upstream device—safety device 1002b—via the single-wire channel. Since safety device 1002b is active, it responds to the IAH message received from safety device 1002c with its own IAH message (labeled "3" in FIG. 10C). Safety device 1002b outputs this response IAH message on its SWS+ OUTPUT terminal, causing the response message to be sent via the single-wire channel to safety device 1002c. The single-wire communication components 518 of the respective safety devices coordinate the sending and receiving of the messages bi-directionally on the single-wire channel. Meanwhile, safety device 1002b continues to send its IAH message to safety device 1002a, which has not yet become active.

Once IAH messages 2 and 3 have been exchanged, the sub-link between safety devices 1002b and 1002c (labeled sub-link 2) becomes active and IAH packets and responses continue to be exchanged between those two devices until the entire link (comprising all sub-links between the safety master and the comms master) becomes active. The IAH packets between safety devices 1002b and 1002c continue to be sent with 0xFF address packets until the devices are addressed during the enumeration phase, which will be initiated by the comms master 1008 after that device becomes active and establishes a sub-link with its nearest safety device.

Turning to FIG. 10D, safety device 1002a is the third device to power up, causing that device to detect the IAH message that safety device 1002b has been sending since its activation. Upon detection of this IAH message, safety device 1002a sends an IAH response (labeled "4") to safety device 1002b, and the sub-link between safety devices 1002a and 1002b (sub-link 3) is established. Since the SWS+ INPUT terminal of safety device 1002a has been fitted with terminator 1010, that device does not attempt to output an IAH message on that terminal.

Finally, as illustrated in FIG. 10E, the comms master 1008 is the fourth and last device on the circuit to power up. Upon activation, comms master 1008 sends its own IAH message (labeled "5") to device 1002c via the single-wire channel. Safety device 1002c responds with its own IAH message (labeled "6"), causing the sub-link between those two devices (sub-link 1) to be established. Once sub-link 1 has been established, comms master 1008 can initiate the enumeration phase and begin enumerating the safety devices 1002a-1002c.

By allowing safety devices 1002a-1002c to begin establishing sub-links between one another as they become active without waiting for the comms master 1008 to power up, the complete communication link between the safety master 1002a and comms master 1008 can be established quickly, since some or all of the sub-links between safety devices 1002a-1002c may already be established when the comms master 1008 becomes active. It is to be appreciated that the order of activation depicted in FIGS. 10A-10E is only intended to be exemplary, and that the comms master 1008 is not required to be the last device to be activated. As will be described below, once sub-link 1 is established between comms master 1008 and its adjacent safety device 1002c, the comms master 1008 will initiate the enumeration phase and begin assigning addresses to the safety devices on the safety circuit. The comms master 1008 can begin enumerating the safety devices even if some sub-links have not yet been established (e.g., in the event that comms master 1008 becomes active before one or both of safety devices 1002a and 1002b have powered up), such that the comms master 1008 enumerates each safety device when a communication path between the comms master 1008 and the safety device becomes available.

Safety input devices that are compliant with the single-wire safety protocol described herein can automatically configure themselves as either a normal safety input device or as a safety master device. In this regard, the safety master mode component 504 of the safety input devices can detect the presence of a terminator (e.g., terminator 1010) on the SWS+ INPUT terminal, and cause the safety input device to switch to safety master mode operation if the terminator is detected. Since all compliant safety input devices are capable of operating in safety master mode, each device also includes a pulse generating component 506 configured to generate the defined pulse pattern and to output a safety signal modulated with the pulse pattern on its SWS+ OUTPUT terminal. The pulse generating component 506 is activated by the safety master mode component 504 based on presence of the terminator on the SWS+ INPUT terminal.

Upon establishing an active sub-link, the comms master 1008 initiates the enumeration phase, during which the safety devices 1002a-1002c are assigned addresses. FIGS. 11A-11F are block diagrams illustrating the enumeration phase according to one or more embodiments. The example illustrated in FIGS. 11A-11F assumes that all sub-links have been established at the time the enumeration phase is initiated (that is, the comms master 1008 is the last device on the circuit to become active). However, in one or more embodiments the comms master 1008 can begin enumerating when sub-link 1 is established, even if other sub-links are not yet active, as will be described in more detail below.

Figure 11A:
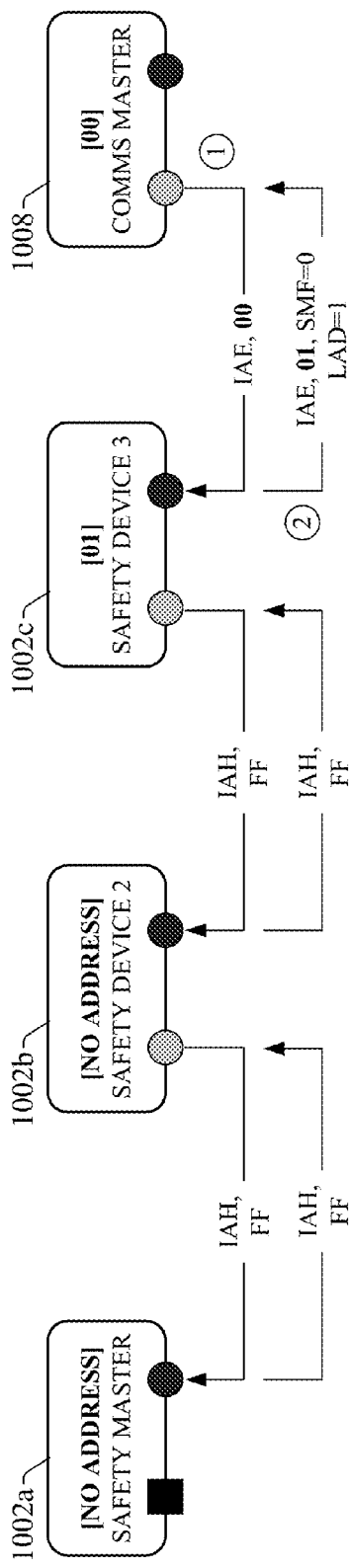
FIGS. 11A-11F are block diagrams illustrating the enumeration phase of an example single-wire safety system.

When sub-link 1 has been established between the comms master 1008 and its nearest safety device (safety device 1002c), comms master 1008 assigns address 00 to itself, ceases transmission of its IAH message, and sends an "I am enumerating" (IAE) message to safety device 1002c together with its address of 00, as shown in FIG. 11A (the IAE message is labeled "1"). Comms master 1008 outputs this IAE message on its SWS+ INPUT terminal, sending the message to safety device 1002c via the single-wire communication channel. Upon receipt of the IAE message, safety device 1002c reads the address included in the message (00), increments this address by one (01), and assigns itself this incremented address. Safety device 1002c also determines whether the safety master 1002a has been found. In the example depicted in FIG. 11A, although the sub-link to the safety master 1002a has been established, the safety master has not yet been addressed and therefore has not been found at this stage. Accordingly, safety device 1002c sets a "safety master found" (SMF) bit to 0, indicating that the safety master has not yet been found. Also, since no other devices have been addressed at this stage, safety device 1002c sets a "last addressable device" (LAD) value to "1" (representing its own address).

After programming itself with its new address and determining the SMF and LAD values as described above, safety device 1002c then sends a return IAE message (labeled "2" in FIG. 11A) to the comms master 1008 over the single-wire channel (output on the safety device's SWS+ OUTPUT terminal). The return IAE message includes the safety device's self-assigned address (01), the SMF value (0), and the LAD value (1). In this way, the comms master 1008 remains updated on the enumeration progress.

In one or more embodiments, the comms master 1008 will send the IAE message (message 1) once, and await for the response message (message 2). If the response message is not received at the comms master's SWS+ INPUT terminal within a defined period of time, the comm master 1008 will resend the IAE message. This sequence will repeat until the response IAE message is received at the comms master 1008, or until a defined number of allowable re-sends has been reached, causing a time-out error. Once comms master receives the response IAE message from safety device 1002c, the two devices will continue to exchange their IAE message and response until the safety master (safety device 1002a) is found.

Figure 11B:
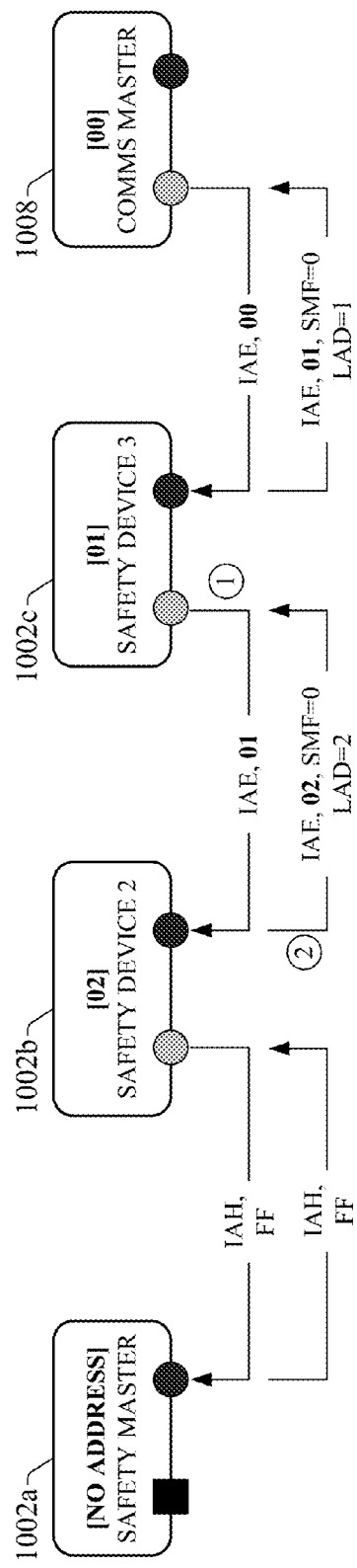

Since sub-link 2 between safety device 1002c and 1002b is active at this time, safety device 1002b also ceases transmission of its IAH message and sends an IAE message to safety device 1002c via the single-wire channel, as shown in FIG. 11B. This IAE message is labeled "1" in FIG. 11B. The IAE message—which includes the address of the sending device—is output on the SWS+ INPUT terminal of safety device 1002c, and received at the SWS+ OUTPUT terminal of safety device 1002b. Upon receipt of the IAE message from safety device 1002c, safety device 1002b performs similar operations to those performed by safety device 1002c in response to receipt of the IAE message from the comms master 1008. That is, safety device 1002b reads the address contained in the received IAE message (01) and assigns itself the next incremental address (02). Safety device 1002b then sends a response IAE message (labeled "2" in FIG. 11B)—including its newly assigned address and appropriate SMF and LAD values—to safety device 1002c via the single-wire channel. At this stage, the safety master (safety device 1002a) has still not been found (SMF=0), and the last addressable device is the device addressed 02 (LAD=2).

Figure 11C:
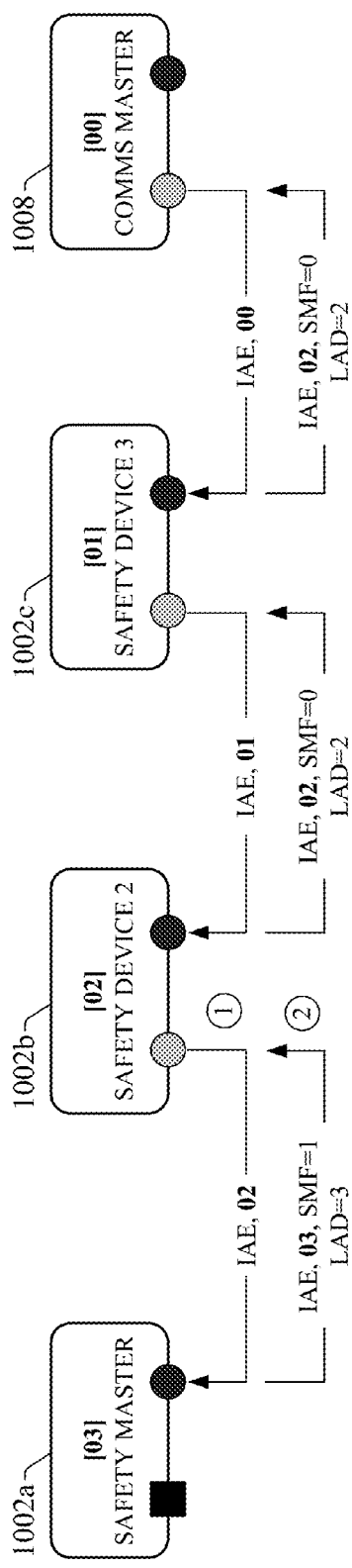

As shown in FIG. 11C, upon receipt of the response IAE message from safety device 1002b, safety device 1002c updates its own IAE response message to comms master 1008 to report that address 02 has been configured and to reflect the new last addressable device by setting LAD=2, ensuring that the comms master is kept updated on the enumeration process. Meanwhile, the newly addressed safety device 1002b determines that sub-link 3 between itself and the safety master 1002a is established, and therefore replaces the IAH message being output on its SWS+ INPUT terminal with an IAE message (labeled "1 in FIG. 1C) directed to the safety master 1002a over the single-wire channel. In response, the safety master 1002a sets its own address to 03 and sets its SMF value to 1, indicating that the safety master has been found. Safety master 1002a then outputs a response IAE message (labeled "2" in FIG. 11C) on its SWS+ OUTPUT terminal directed to safety device 1002b. The response IAE message from the safety master 1002a reports its address (03), a value of SMF=1, and a value of LAD=3.

Figure 11D:
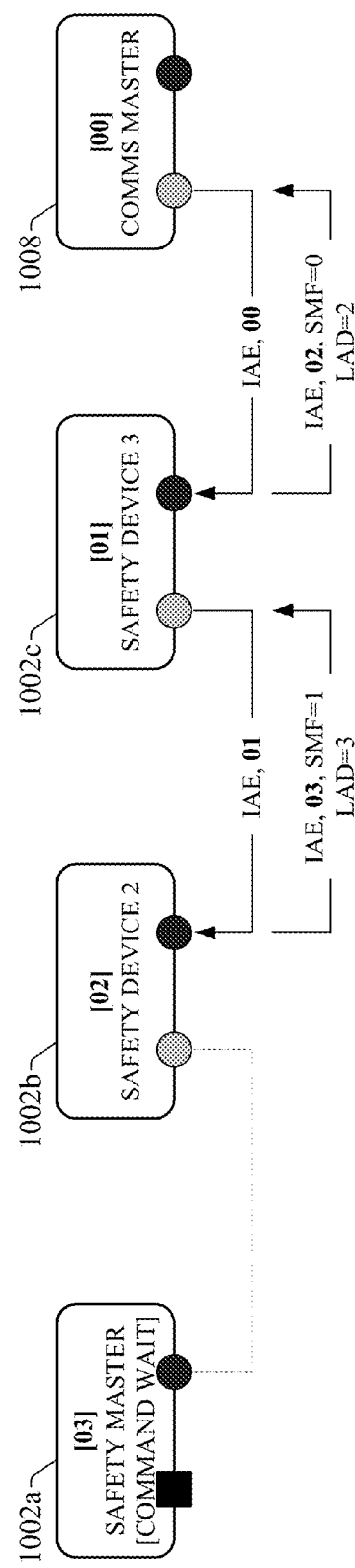
Figure 11E:
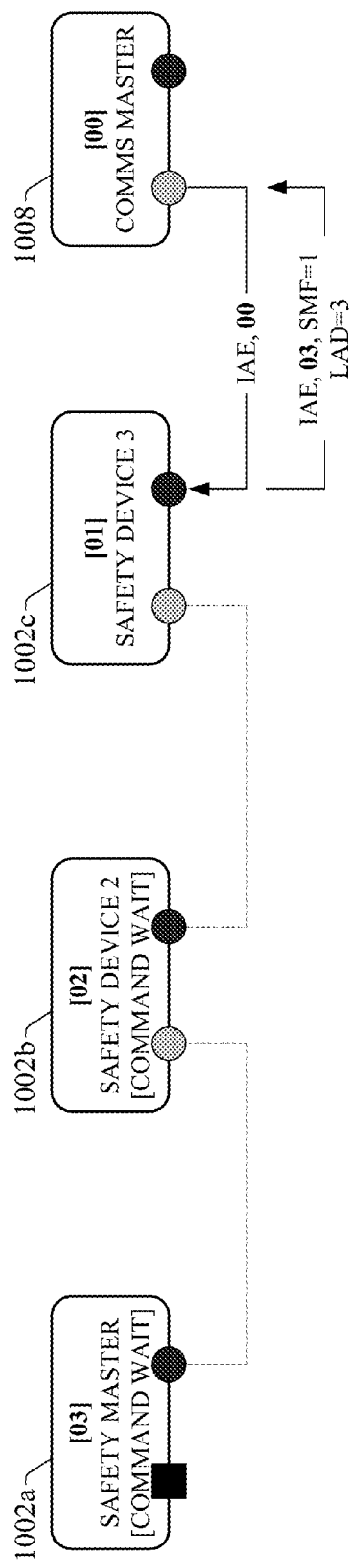
Figure 11F:
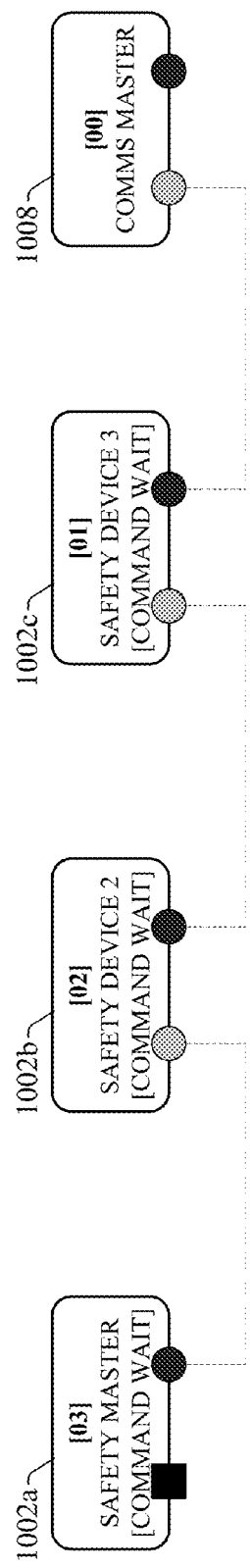

In general, all devices on the safety circuit will continue to exchange their IAE messages and responses until detecting that SMF=1, at which time the devices will enter a "command wait" mode. Accordingly, when safety master 1002a receives the IAE message from safety device 1002b and programs its address, the safety master 1002a enters the "command wait" mode, as shown in FIG. 11D. Upon receipt of the IAE response message from safety master 1002a, safety device 1002b reads the SMF value reported by the safety master, and modifies its own IAE response message to safety device 1002c to reflect the new last addressable device (LAD=3) and the fact that the safety master has been found (SMF=1). As shown in FIG. 11E, safety device 1002b then enters "command wait" mode, while safety device 1002c modifies its IAE response message to the comms master 1008 to set SMF=1 and LAD=3, thereby informing the comms master that the safety master has been found. As shown in FIG. 11F, safety device 1002c then enters "command wait" mode, at which stage all safety devices 1002a-1002c are awaiting instructions from the comms master 1008, and the complete SWS link between the safety master 1002a and the comms master 1008 is formed. The comms master 1008 records the device address information on local memory.

As illustrated in the sequence described above in connection with FIGS. 11A-11F, each of the three sub-links between devices is substantially independent of the other sub-links. As such, the comms master can begin the enumeration phase even if some sub-links have not yet been established, provided sub-link 1 between the comms master and its nearest safety device is active. Although the example illustrated in FIGS. 11A-11F assumes that all sub-links have been established at the time the enumeration phase is initiated (that is, the comms master 1008 is the last device on the circuit to become active), it is possible that the comms master will power up before one or more of the safety devices on the circuit become active in some scenarios. For example, if safety device 1002c and comms master 1008 power up before safety devices 1002a and 1002b, sub-link 1 between the comms master 1008 and safety device 1002c will be established before sub-link 2 (between safety devices 1002b and 1002c) and sub-link 3 (between safety master 1002a and safety device 1002b) are active. Nevertheless, comms master 1008 can initiate enumeration of safety device 1002c while sub-links 2 and 3 are in the process of becoming active. Once enumerated, the non-addressed IAH message being sent from safety device 1002c to safety device 1002b is changed to an addressed IAE message while awaiting power-up of safety device 1002b. When safety device 1002b becomes active and sub-link 2 is established (upon safety device 1002c receiving an IAH message from safety device 1002b, as illustrated in FIG. 10C), safety device 1002b receives the IAE message from safety device 1002c and initiates its enumeration sequence as previously described. This process is repeated for the safety master 1002a when that device becomes active. Enumerating devices on the safety circuit as the devices and sub-links therebetween become available, rather than waiting for the complete communication link between the safety master and the comms master to be established before initiating enumeration, can reduce latency between power-up and device enumeration.

Figure 12A:
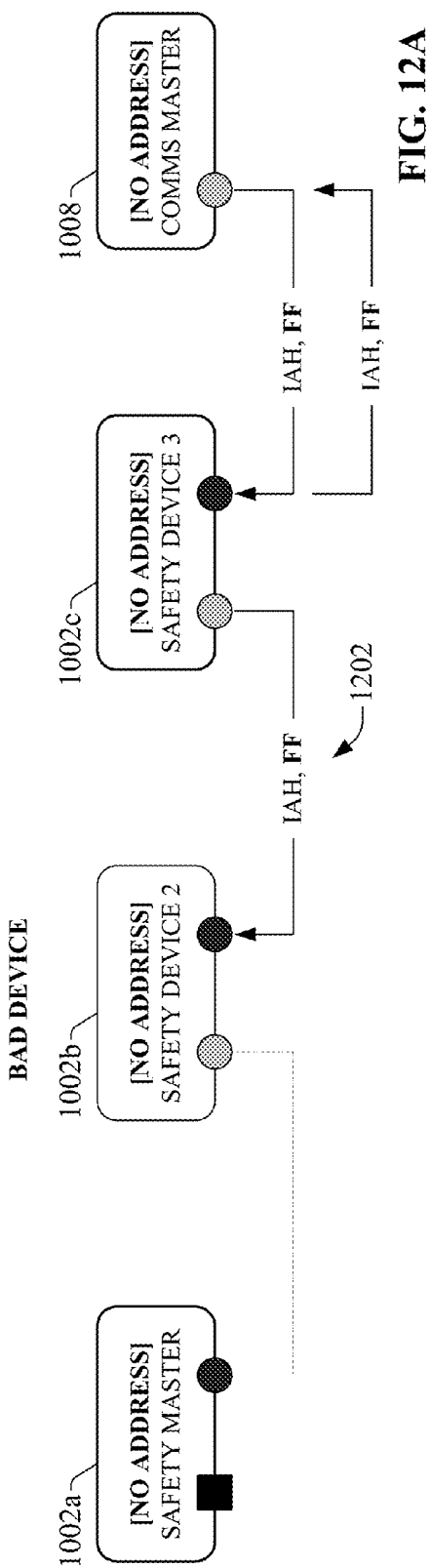
FIGS. 12A-12B are block diagrams illustrating diagnosis of a device failure on an example single-wire safety system.
Figure 12B:
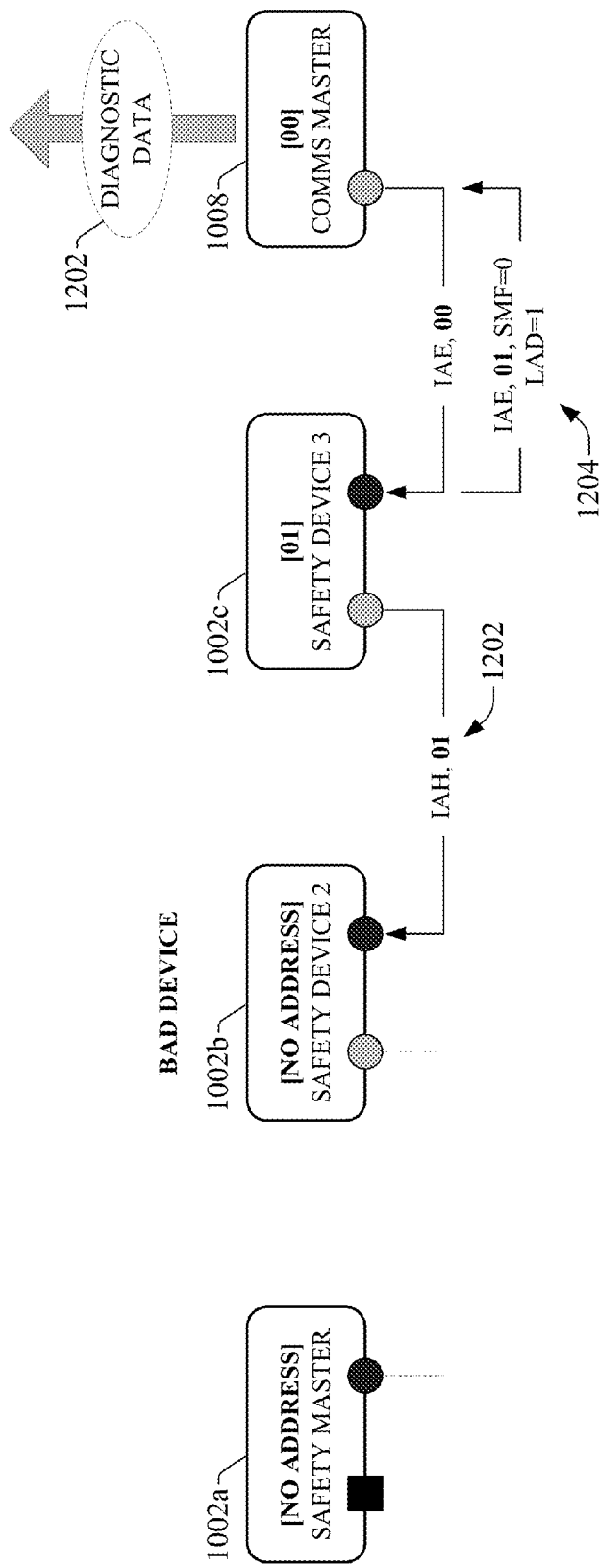

Since the safety devices provide the comms master with updated information regarding the progress of sub-link creation, the architecture described above can allow problems with sub-link start-up to be diagnosed without requiring a time-out. FIGS. 12A-12B are block diagrams illustrating diagnosis of a device failure according to one or more embodiments. In this example, safety devices 1002a and 1002c and comms master 1008 have powered up during the sub-link phase, but safety device 1002b has not activated due to a power issue, a device fault, or other issue. Since safety device 1002c and comms master 1008 are active, those devices exchange IAH messages as shown in FIG. 12A, thereby establishing the sub-link between those devices. However, faulty safety device 1002b does not respond to the IAH message 1202 sent by safety device 1002c. With the sub-link between the comms master and its nearest safety device established, the comms master 1008 initiates the enumeration phase, causing IAE messages to be exchanged between the comms master and safety device 1002c, as shown in FIG. 12B. As described above in connection with FIGS. 11A-11F, the response IAE message 1204 from safety device 1002c to comms master 1008 includes the newly configured address (01), the current SMF value (SMF=0, since the safety master 1002a has not yet been found), and the current LAD value (LAD=1).

Since safety device 1002b had not powered up and therefore does not respond to the IAH message sent by safety device 1002c, comms master 1008 and safety device 1002c will continue to exchange the IAE messages shown in FIG. 12B, indicating to the comms master that the safety device addressed 01 remains the last addressable device and that the safety master has not yet been found. One or both of these values may be displayed on the comms master 1008 as diagnostic data (e.g., as a digital display, via LED indictors, on an integrated monitor on the comms master, etc.), allowing a user to determine which device in the chain has failed to activate. In this example, since the comms master 1008 indicates address 01 as the last addressable device, the user is directed to the safety device following the first safety input device in the chain. The faulty device can be corrected or replaced without resetting the comms master 1108 or safety device 1002c, which continue to exchange their IAE messages while faulty safety device 1002b is being investigated and corrected. Note that any devices between the faulty device and the comms master 1008 can still be queried by the comms master, since those devices can be addressed and accessed without waiting for the faulty device to become active. Once safety device 1002b is fixed and becomes active, it will see the IAH message 1202 being sent by safety device 1002c and the sub-link will be created between 1002c and 1002b. Safety device 1002b will then respond to the next IAE message.

After all sub-links have been established and all devices on the safety circuit have been enumerated, the comms master 1008, if not connected to a SWS+ link before, initially has no record or history for the safety input devices on the circuit. The comms master 1008 is considered "unestablished" until it has collected device information from all safety input devices on the circuit and stored the information in memory. Accordingly, after the link enumeration phase has completed, the system enters the link identification phase, during which the comms master 1008 collects device information from the safety input devices via the single-wire channel. FIGS. 13A-13D are block diagrams illustrating the link identification phase. As shown in FIG. 13A, the comms master 1008 initiates the link identification phase by sending a "get device identification" (GDI) message (labeled "1" in FIG. 13A) to its nearest safety input device (safety device 1002c) via the single-wire channel (that is, by outputting the GDI message on the SWS+ INPUT terminal of the comms master). The GDI message includes the address (01) of the safety device being polled by the comms master. In response to detecting this GDI message on its SWS+ OUTPUT terminal, safety device 1002c reads the address included in the message and, in response to determining that the address matches its own address, responds with a GDI response message (labeled "2" in FIG. 13A), which includes its address (01) and device information ("INFO"). In one or more embodiments, the device information can comprise a data block defined by the safety device and containing identification information for that device. For example, the device information can include one or more of a vendor identifier, a device type (e.g., light curtain, safety mat, emergency stop push button, laser scanner, etc.), a product code, a hardware revision number, a software revision number, a product name, or other such information. The device information provided by the safety device 1002c also includes a device signature that can subsequently be used by the comms master to identify the set of device information and to verify the identity of the safety device without the need to retrieve the device information a second time, as will be described in more detail herein.

Table 1 below shows an example set of device information data items that can be included in the GDI response message sent by the safety input devices. All device information data items are stored on the respective safety devices as read-only values, which are retrieved by the safety device and sent in the GDI response message when the GDI request is received from the comms master.

TABLE 1

Device Information (INFO)

| Device Attribute | Size (Bytes) | Range |
| --- | --- | --- |
| VendorID | 1 | 1-254 |
| DeviceType | 1 | |
| ProductCode | 1 | 1-254 |
| HardwareRevision | 1 | A-Z (A = 1) |
| SWMajorRevision | MS 4 bits | 1-15 |
| SWMinorRevision | LS 4 bits | 1-15 |
| ProductName | 32 | |
| ConfigurationSignature | 2 | 1-65535 |

Upon receipt of the GDI response message from safety device 1002c, comms master 1008 stores the device information in local memory in association with address 01, and polls address 02 for its device information, as shown in FIG. 13B. Comms master 1008 sends a GDI message directed to address 02 (labeled "1" in FIG. 13B) to safety device 1002c via the single-wire channel. Upon receipt of this message on its SWS+ OUTPUT terminal, safety device 1002c reads the address included in the GDI message and, in response to determining that the address does not match its own address, relays the GDI message (labeled "2" in FIG. 13B) to the next device in the safety circuit (safety device 1002b) by outputting the message on its SWS+ INPUT terminal. Determining that the address matches its own address (02), safety device 1002b sends a GDI response message (labeled "3" in FIG. 13B) back to safety device 1002c, which relays the response to the comms master 1008 as message "4". Comms master 1008 records the received device information for address 02, then polls address 03 (safety master 1002a) for its device information in a similar manner, as shown in FIG. 13C.

Another way for the comms master to retrieve GDI information from slave devices is to send one broadcast message and wait for responses from all devices. After the link enumeration phase has completed, the system enters the link identification phase, during which the comms master 1008 collects device information from the safety input devices via the single-wire channel. There are two methods that can be used for collecting this data and are explained herein.

Figure 13E:
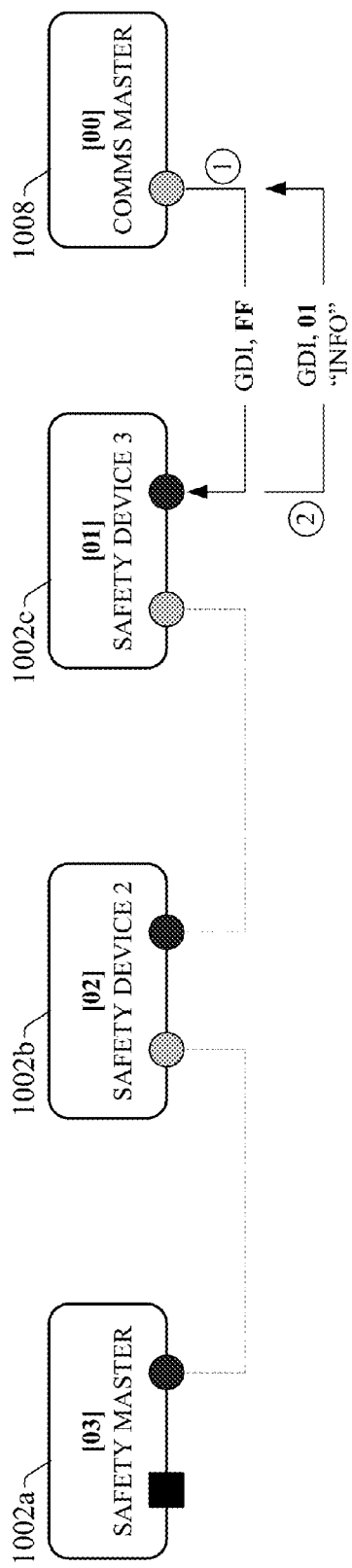
Figure 13F:
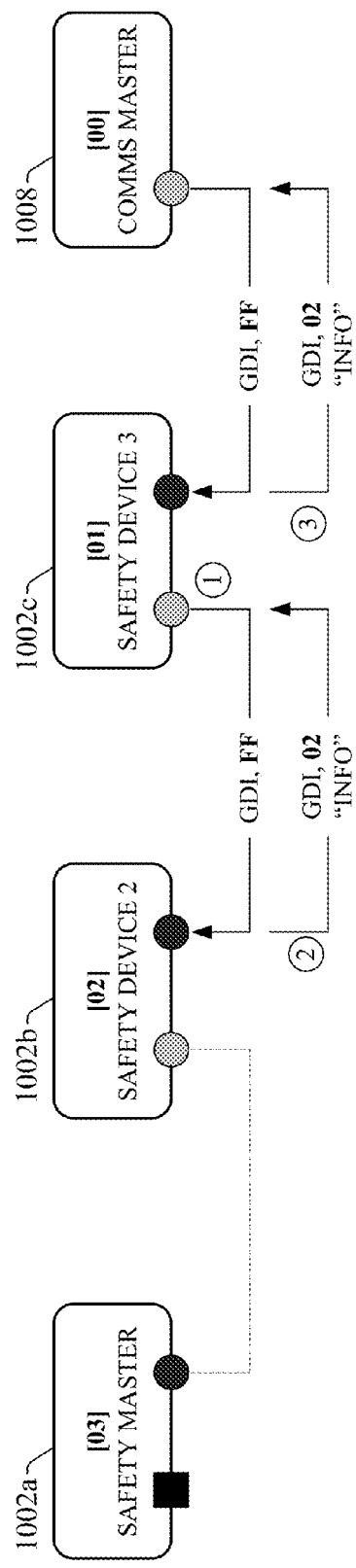

One method that the comms master can use to collect device information from slave devices is to send a broadcast request. FIGS. 13E-13H are block diagrams illustrating the link identification phase. As shown in FIG. 13E, the comms master 1008 initiates the link identification phase by sending a "get device identification" (GDI) message (labeled "1" in FIG. 13E) to its nearest safety input device (safety device 1002c) via the single-wire channel (that is, by outputting the GDI message on the SWS+ INPUT terminal of the comms master). The GDI message contains a specific address (FF). In response to detecting this GDI message on its SWS+ OUTPUT terminal, safety device 1002c reads the address included in the message and, in response to determining that the address is a broadcast address (FF), responds with a GDI response message (labeled "2" in FIG. 13E), which includes its address (01) and device information ("INFO"). Device 1002c then relays the GDI broadcast message to the next device upstream in (labeled "1" in FIG. 13F), which is device 1002b. Device 1002b reads the address included in the message and, in response to determining that the address is a broadcast address, responds with a GDI response message (labeled "2" in FIG. 13F), which includes its address (02) and device information ("INFO"). Upon device 1002c receiving this response from device 1002b, it will relay the response untouched to comms master 1008 (message "3" in FIG. 13F). After sending the GDI response downstream, device 1002b then relays the broadcast message upstream (labeled "1" in FIG. 13G) to device 1002a. Device 1002a reads the address included in the message and, in response to determining that the address is a broadcast address, responds with a GDI response message (labeled "2" in FIG. 13G), which includes its address (02) and device information ("INFO"). Upon device 1002c receiving this response from device 1002b, it will relay the response untouched to comms master 1008 (labeled "3" in FIG. 13G). Devices 1002b and 1002c relay the message from 1002a untouched to the comms master 1008 ((labeled "3" and "4" in FIG. 13G).

Once device information has been collected for all safety input devices, including the safety master, comms master 1008 is considered established. The device information saved on the comms master 1008 can subsequently be used for diagnostic purposes in the event of a problem on the safety circuit. Since the established comms master now has the device information—including device signatures—for all safety input devices stored on local memory, the comms master can subsequently confirm the presence of the previously recognized safety devices without retrieving the entire set of device information from each device. Instead, the comms master 1008 need only request the device signatures from safety devices 1002a-1002c in order to verify that the expected safety devices are present.

For example, in the event that power is cycled on the established comms master 1008, the comms master will verify that device information has already been collected for the safety devices (that is, that the comms master has already been established), and proceed to confirm whether the previously collected device information is still valid by sending "get device signature" (GDS) messages to each device via the single-wire channel, starting with safety device 1002c as shown in FIG. 13D. In response to the GDS message (labeled "1" in FIG. 13D), safety device 1002c sends a GDS response message (labeled "2") including its address (01) and its device signature ("SIGNATURE"). Upon receipt of this response, the comms master 1008 verifies that the signature included in the GDS response message matches the previously collected device signature for address 01. This is repeated for each device, with the GDS messages and responses being relayed through the safety devices in a similar manner to the GDI messages until all devices on the circuit are verified as being the same devices that were identified during the link identification phase. Verifying the previously established safety devices using device signatures mitigates the need to re-collect the larger set of device identification data from each device, thereby minimizing bandwidth usage and initialization latency.

In the event that a safety input device on the safety circuit has been replaced with a new device during the time that the established comms master has been powered down, the comms master can detect that the device has been replaced by comparing the device signature contained in the new device's GDS response message with the previously recorded device signature for that device's address. Upon detecting the signature mismatch, the comms master 1008 can retrieve the device information for the new device by sending a GDI message directed to the new device's address.

Another way for the comms master to retrieve GDS information from slave devices is to send one broadcast message and wait for responses from all devices. The broadcast message method works the same as the GDI broadcast method described above.

FIGS. 14A-14C illustrate a scenario in which a safety device on a previously established safety link has been reset and cleared of its address. In this example, safety device 1002b has been reset on a previously established safety link. Upon powering back up, safety device 1002b sends a non-addressed "I am here" message (labeled "1" in FIG. 14A) to its nearest upstream neighbor device (safety master 1002a) via the single-wire channel; that is, by outputting the IAH message on its SWS+ INPUT terminal (since the next downstream device from safety device 1002b is already in "diagnostic" mode, the reset safety device 1002b does not receive an IAH message from that device, as would typically be the case if the safety link was being newly established). As shown in FIG. 14B, safety master 1002a responds to IAH message 1 with an IAH response message (labeled "2"). Upon the next broadcast message sent by the comms master for diagnostics data (labeled "1" in FIG. 14C), device 1002b will reply with a new I Am New (IAN) indication and an address of (FF) (labeled "3" in FIG. 14C). The comms master 1008 receives this message and now knows that a new device is on the link. The link is then re-enumerated and GDI and GDS information is gathered by the comms master.

Figure 15C:
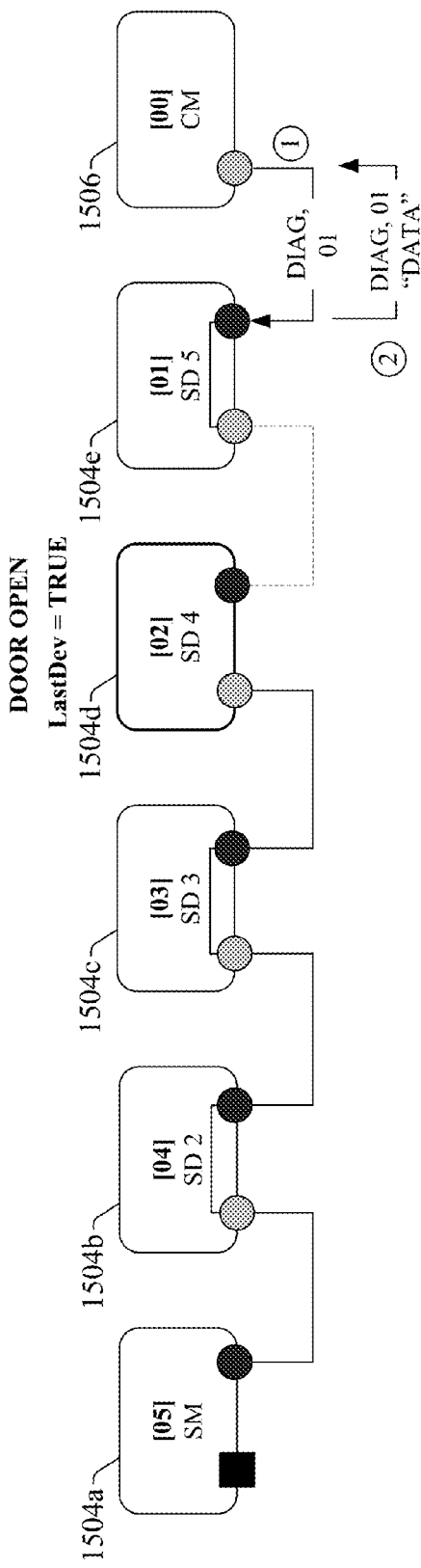

Upon completion of the sub-link, link enumeration, and link identification phases described above, the safety circuit enters run mode and normal safety operation commences. FIGS. 15A-15D are block diagrams illustrating safety and diagnostic modes according to one or more embodiments. As shown in FIG. 15A, example single-wire safety circuit 1502 comprises a comms master 1506 and five safety devices 1504a-1504e, where safety device 1504a operates in safety master mode and safety devices 1504b-1504e operate in normal mode. As safety master, safety device 1504a generates the pulsed safety signal 1508 that is placed on the single-wire safety channel. During operation mode, during which all safety devices 1504a-1504e are in their respective operational states, pulsed safety signal 1508 is relayed along the single-wire channel by the respective safety devices and received at the SWS+ INPUT terminal of comms master 1506. Each safety device that receives the pulsed safety signal 1508 on its SWS+ INPUT terminal during safety mode verifies that the received pulse pattern matches the defined pulse pattern (e.g., pulse signal 302 or another defined pulse pattern). In accordance with the enable block illustrated in FIG. 7, each safety device outputs the pulsed safety signal on its SWS+ OUTPUT terminal if (a) the pulse pattern is confirmed to be the correct pulse pattern, (b) the safety function is valid (e.g., door closed, emergency stop pushbutton disengaged, light curtain unbroken, etc.), (c) there are no internal faults on the safety device, and (d) the communication stack for the safety device is active. The pulsed safety signal is thus relayed through the safety devices via the single-wire channel to the SWS+ INPUT terminal of the comms master 1506.

Comms master 1506 detects and verifies that the pulse pattern received on the safety signal matches the defined pulse pattern (e.g., pulse signal 302 or another defined pulse pattern). As long as the defined pulse pattern is recognized on its SWS+ INPUT terminal, comms master 1506 allows its safety contactors to switch to the closed state, providing power to the industrial machines and/or devices connected to its safety relay outputs (Operational mode).

FIG. 15B illustrates a scenario in which safety device 1504d—corresponding to a door safety switch—switches to its unsafe state (e.g., the corresponding safety door has been opened). Upon switching to the safe state, safety device 1504 stops relaying the pulsed safety signal to the next downstream device on the safety circuit (safety device 1504e), preventing the pulsed safety signal from reaching the comms master 1506. Upon detecting loss of the safety signal, comms master 1506 opens its safety contactors and isolates power from the connected industrial machines and/or devices (Safe State). In addition to blocking the safety signal, safety device 1504d also sets a "last device" (LastDev) flag indicating that it is the last device on the safety circuit capable of receiving the safety signal from the safety master 1504a.

Upon detecting loss of the safety signal, comms master 1506 initiates diagnostic mode and begins collecting information from the safety devices. The comms master can retrieve data by addressing specific devices starting with device (01) or can send a broadcast address of (FF) to retrieve data from all devices. The following will described addressing specific devices. See the description above in connection with FIGS. 13E-13F for requesting and retrieving data using a broadcast message. As shown in FIG. 15C, comms master 1506 begins by sending a diagnostic message (DIAG) to address 01 (safety device 1504e) via the single-wire channel (e.g., by outputting the DIAG message on its SWS+ INPUT terminal). The DIAG message (labeled "1" in FIG. 15C) includes the address (01) for which status information is requested. Upon receiving the DIAG message on its SWS+ OUTPUT terminal and determining that the address contained in the DIAG message corresponds to its own address, safety device 1504e responds by sending a DIAG response message (labeled "2" in FIG. 15C) comprising its address number (01) and diagnostic status data (DATA). Safety device 1504e outputs this DIAG response message on its SWS+ OUTPUT terminal, sending the response via the single-wire channel.

The diagnostic status data sent by the safety device can comprise any suitable diagnostic information available on the safety device, including at least the value of the safety device's LastDev flag. For example, the diagnostic data may comprise a pre-formatted status word divided into predefined status bits and registers, where the values of the bits and registers are set by status word control component 516. Since safety device 1504 is still in its safe state, its LastDev flag has not been set. Accordingly, the DIAG response message from safety device 1504e reports a value of LastDev=FALSE. The DIAG response message can also include other status and fault information for the safety device in addition to the LastDev flag. This can include both error codes that are common to all SWS safety devices as well as device-specific status and fault information. Example device-specific status information that can be included in the DIAG response message can include, but is not limited to, door open and closed status (for door safety switches), beam on and off statuses and beam strength warnings (for light curtains), button on and off statuses (for emergency stop pushbuttons and pull-cords), or other such information.

Figure 15D:
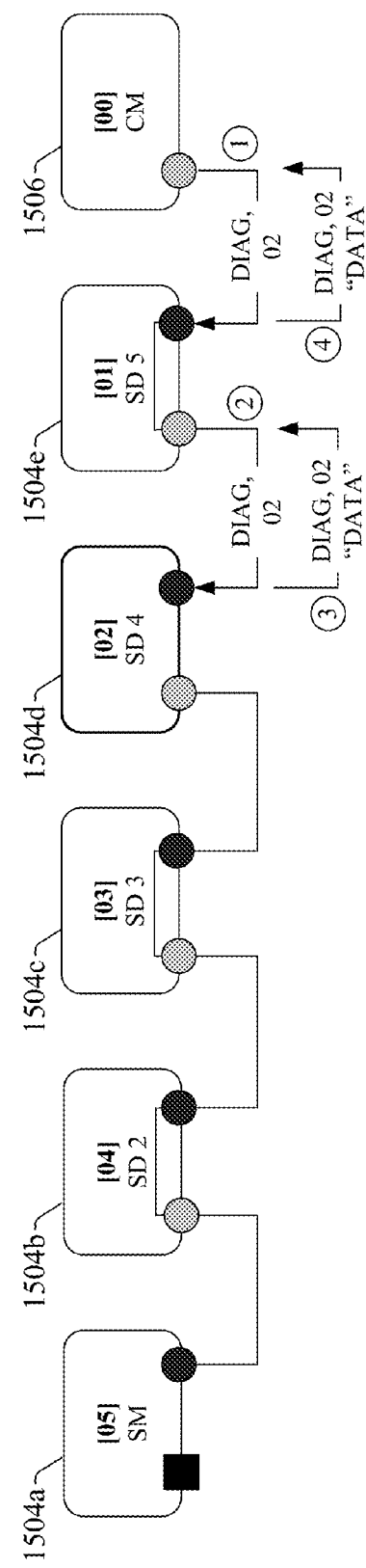

Upon receiving this DIAG response message and determining that safety device 1504e is not the last available device on the circuit (based on the value of the LastDev flag), comms master 1506 next sends a DIAG message to address 02 (corresponding to safety device 1504d), as shown in FIG. 15D. Safety device 1504e receives this DIAG message on its SWS+ OUTPUT terminal and, in response to determining that the address contained in the message does not match its own address, relays the DIAG message to the next upstream device (safety device 1504d) by outputting the DIAG message on its SWS+ INPUT terminal. Safety device 1504d responds with a response DIAG message including its address (02) and diagnostic data including at least the value of its LastDev flag (LastDev=TRUE). This DIAG response message is relayed to comms master 1506 via safety device 1504e, informing the comms master 1506 that the safety device addressed 02 is the last accessible device on the safety circuit. Based on this information, comms master 1506 determines that safety device 1504d is in its unsafe state, and can report this information to the user (e.g., via a display indication, by sending a notification to a mobile device of a specified user, etc.). In some embodiments, comms master 1506 can also retrieve information about the identified safety device from the previously registered device identification information (see FIGS. 13A-13D) and provide this information to the user as well. For example, based on the registered device information, comms master 1506 knows that the safety device corresponding to address 02 is a safety door switch, and therefore the unsafe state corresponds to a detected door open status. The comms master 1506 can therefore generate a notification that the safe state is due to the safety door corresponding to safety input device 02 being open.

Once the last device capable of receiving the safety signal from the safety master 1504a is found (that is, once the device whose LastDev flag is set to TRUE is identified), the comms master 1506 will then send the next DIAG message request. The comms master 1506 will only send DIAG messages to devices up to the device that is blocking the safety signal, mitigating unnecessary polling of active devices between the safety master 1504a and the safety device responsible for blocking the safety signal.

While the safe state of the comms master is due to safety device 1504d being in the safe state, safety master 1504a continues to send the pulsed safety signal along the single-wire channel. However, the safety signal will only be relayed as far as the SWS+ INPUT terminal of safety device 1504d. Upon returning to its operational state (when the safety door corresponding to safety device 1504d has been closed), safety device 1504d will detect the pulsed safety signal on its SWS+ INPUT terminal and resume relaying the safety signal. If device 1504e has not entered the safe state, it too will relay the pulsed signal to the comms master 1506. Subsequently, comms master 1506 detects the safety signal on its SWS+ INPUT terminal and switches operational mode back to ON, allowing the safety contactors to be closed and power to be provided on the safety relay outputs.

Figure 16A:
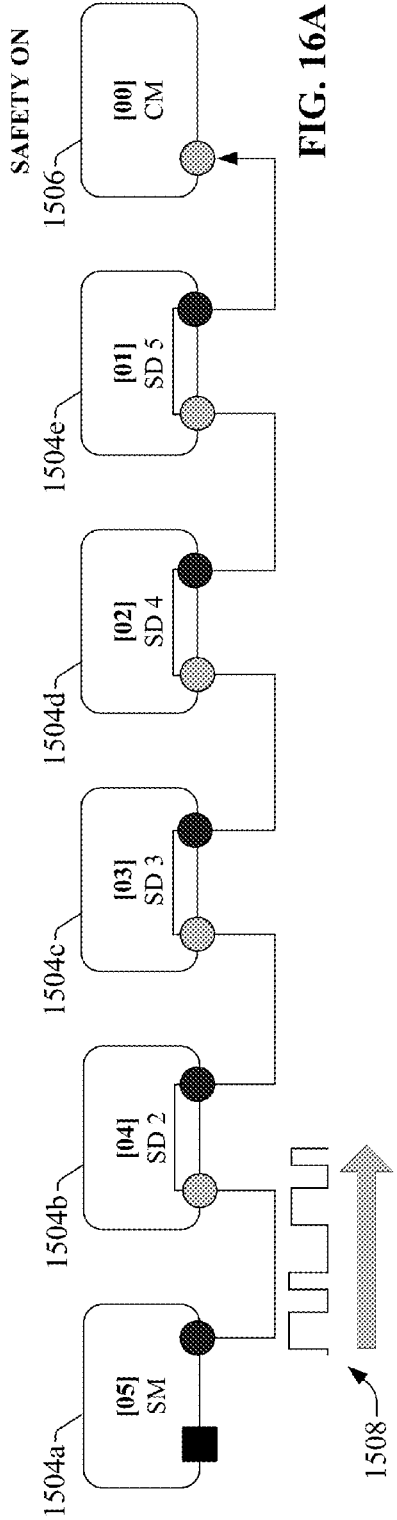
Figure 16B:
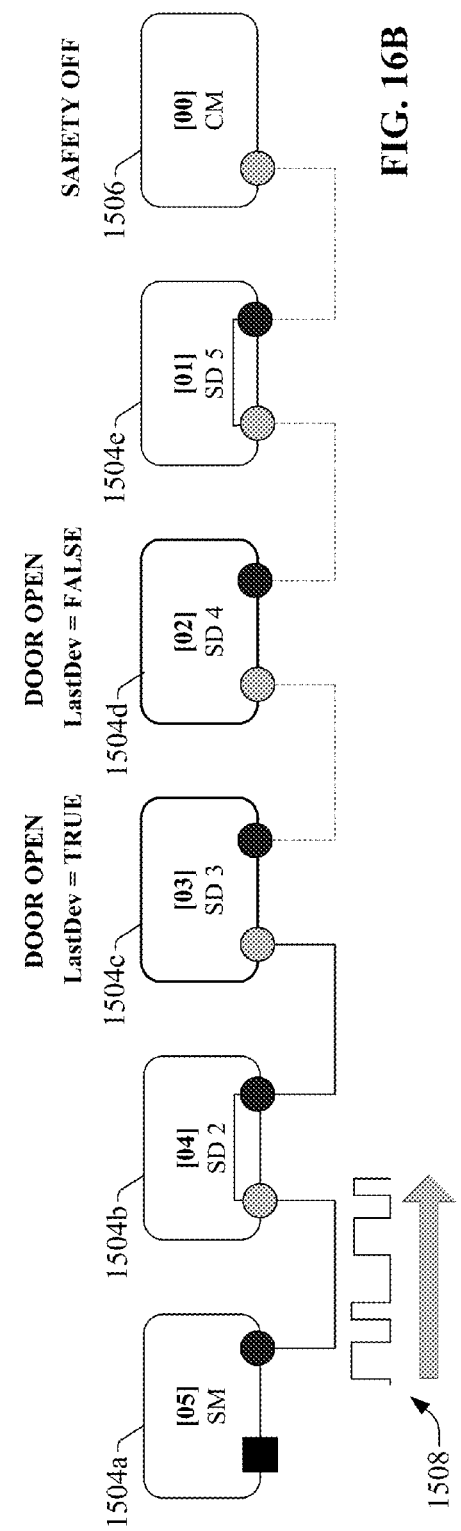

FIGS. 16A-16F are block diagrams illustrating how messaging is performed in a scenario in which multiple safety devices switch to their safe state due to their doors being opened. Initially, the safety circuit is operating in operational mode, wherein all safety devices 1504a-1504e are in their respective operational states and are relaying the pulsed safety signal 1508 to comms mater 1506, as shown in FIG. 16A. The safety door corresponding to safety device 1504d is then opened, followed by the safety door corresponding to safety device 1504c, as shown in FIG. 16B. When safety device 1504d switches to its safe state, it initially sets its LastDev flag to TRUE, as described above in the previous example. However, when safety device 1504c subsequently switches to its safe state and ceases relaying the safety signal, safety device 1504d detects the loss of the safety signal on its SWS+ INPUT terminal and resets its LastDev flag to FALSE. Meanwhile, safety device 1504c sets its LastDev flag to TRUE. In general, a given safety device sets its LastDev flag to TRUE if (a) the safety device is in its safe state, and (b) if the safety device still detects the safety signal on its SWS+ INPUT terminal. When these two conditions are true, the safety device becomes aware that it is the last device capable of receiving the safety signal and sets its LastDev flag to TRUE.

Figure 16C:
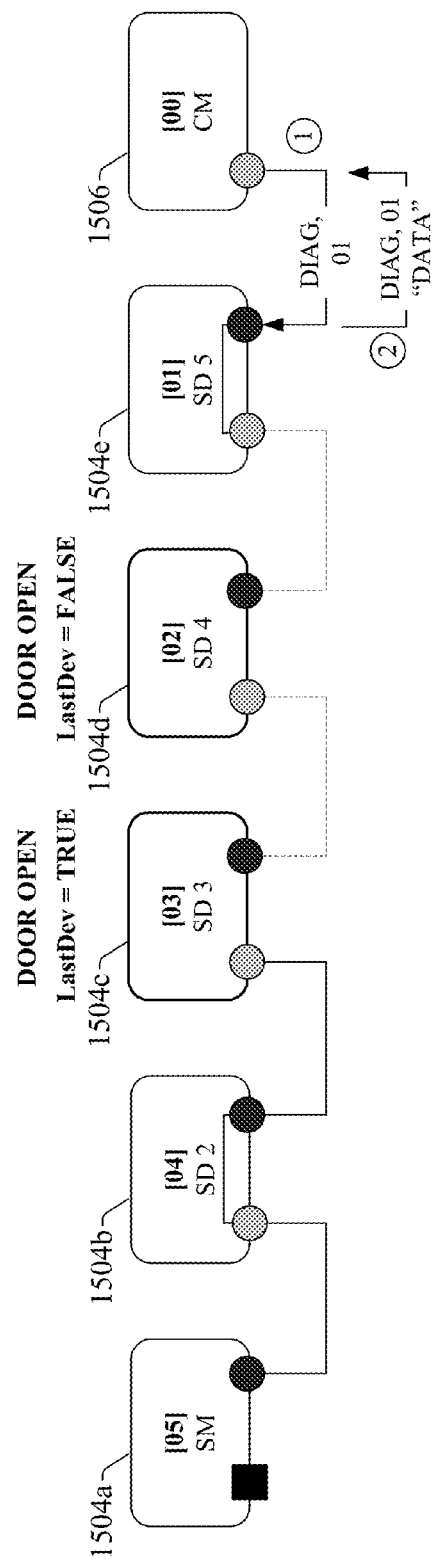
Figure 16D:
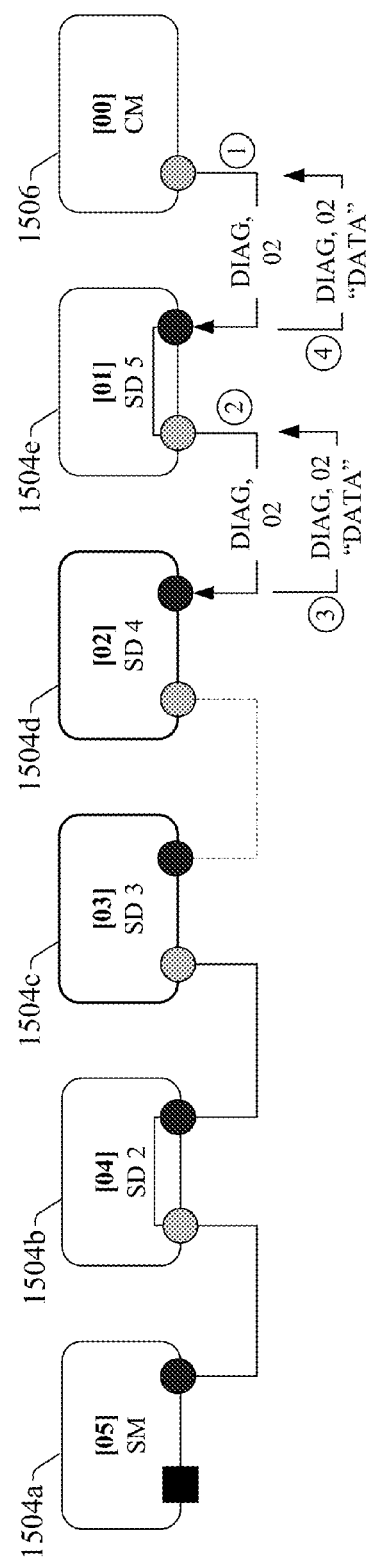

When the comms master switches from operational to the safe state in response to safety device 1504d switching to its safe state, comms master 1506 begins polling the devices for diagnostic information, by sending either a broadcast message or by asking each device individually in a round robin manner for information as shown in FIG. 16C. The illustrated example assumes that the comms master polls the devices individually; however, the broadcasting technique described above in connection with FIGS. 13E-13G may also be used. Safety device 1504e reports a value of LastDev=0, so comms master 1506 waits for more responses, as shown in FIG. 16D. Although safety device 1504d (corresponding to address 02) is in its safe state, it is not the last device capable of receiving the safety signal generated by safety master 1504a, and therefore reports LastDev=0. Accordingly, comms master 1506 proceeds to poll address 03, which reports LastDev=1, as shown in FIG. 16E. At this stage, comms master 1506 reports the statuses of safety devices 1504c, 1504d, and 1504e (e.g., doors open or doors closed).

Upon determining that safety device 1504c is the stopping point for the safety signal, comms master 1506 will continue to send DIAG requests to devices 1504e, 1504d, and 1504c. If devices 1504a or 1504b enter the safe state, they too will begin to respond to the requests and the LastDev=TRUE indicator will move to the safety device closest to the safety master with a door open.

When the safety door corresponding to safety device 1504c is closed, as shown in FIG. 16F, safety device 1504c replies to the next diagnostic request with its Safety Signal Enable SSE=TRUE. Safety devices 1504d and 1504e relay this message untouched to the comms master. In addition, safety device 1504d sends a confirmation message back to safety device 1504c acknowledging receipt of the SSE=TRUE bit. Safety device 1504c will then resume relaying the safety signal. Meanwhile, since safety device 1504d is still in its safe state (door open) but now detects the presence of the safety signal on its SWS+ INPUT terminal, that device sets its LastDev flag to TRUE. Consequently, upon receipt of the next DIAG message, safety device 1504d sends a DIAG response message that includes a value of LastDev=TRUE, and will not attempt to relay the message upstream. The comms master 1506 continues to send DIAG requests until all safety devices have sent their SSE=TRUE bits in their diagnostic message responses, been confirmed, and the safety signal is relayed to the comms master.

The foregoing examples describe a number of message types (IAH, IAE, GDI, GDS, etc.) that can be exchanged between SWS safety devices via the single-wire safety channel. Some embodiments of the SWS safety devices described herein may support additional types of messaging. For example, in one or more embodiments, the comms master may be configured to send remote restart commands to selected devices via the single-wire channel. These remote restart commands may include the address of the safety device to be restarted, such that when the targeted device receives the command on its SWS+ OUTPUT terminal and verifies the matching address, the safety device will initiate a restart sequence.

As described in the foregoing examples, the safety input device designated as the safety master modulates the safety signal according to a defined pulse pattern (e.g., the pulse pattern depicted in FIG. 3), and this safety signal is relayed from the safety master to the comms master over the single-wire channel. In some embodiments, one or more additional pulse patterns can be defined for use by the safety system devices for other purposes. For example, two different pulse patterns may be defined to convey respective two different types of safety states (e.g., a "doors closed" state and a "doors locked" state). The comms master can be configured to recognize which of the defined patterns is present on the single-wire channel and operate in accordance with the particular safe state corresponding to the detected pulse pattern (which may depend on user-defined programming downloaded to the comms master). For example, the comms master may be programmed to only enable a defined subset of its safety relay outputs if a first defined pattern is detected (e.g., a pattern corresponding to a "doors closed but unlocked" state), and to enable the remaining safety relay outputs if the second defined pattern is detected (corresponding to a "doors closed and locked" state).

FIGS. 17-28 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 17:
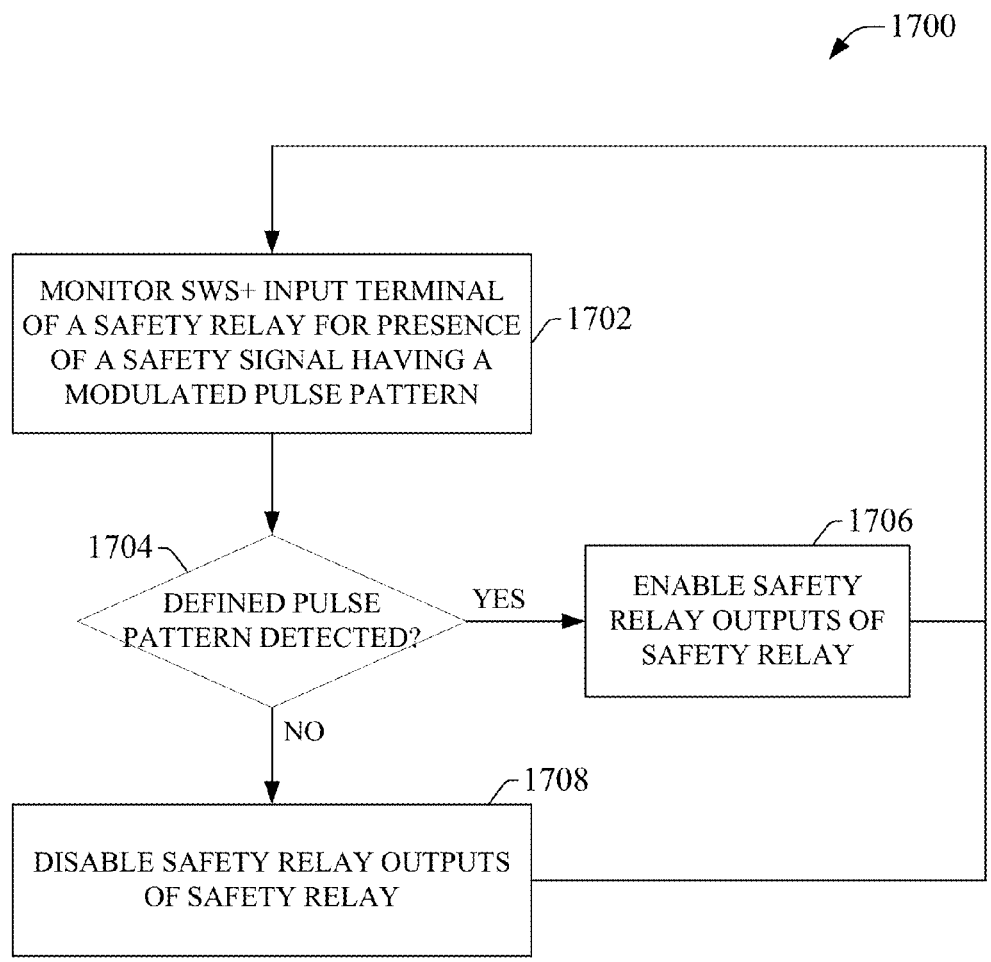
FIG. 17 is a flowchart of an example methodology for controlling safety relay outputs of a safety relay.

FIG. 17 illustrates an example methodology 1700 for controlling safety relay outputs of a safety relay. At 1702, an SWS+ INPUT terminal of a safety relay compatible with a single-wire safety (SWS+) protocol is monitored for presence of a safety signal having a modulated pulse pattern. At 1704, a determination is made regarding whether the pulse pattern detected on the safety signal matches a defined pulse pattern. If it is determined that the pulse pattern matches the defined pulse pattern, the methodology moves to step 1706, where the safety relay outputs of the safety relay are enabled and the monitoring continues at step 1702. Alternatively, if the detected pulse pattern does not match the defined pulse pattern, the methodology moves to step 1708, where the safety relay outputs are disabled, and the monitoring continues at step 1702.

Figure 18:
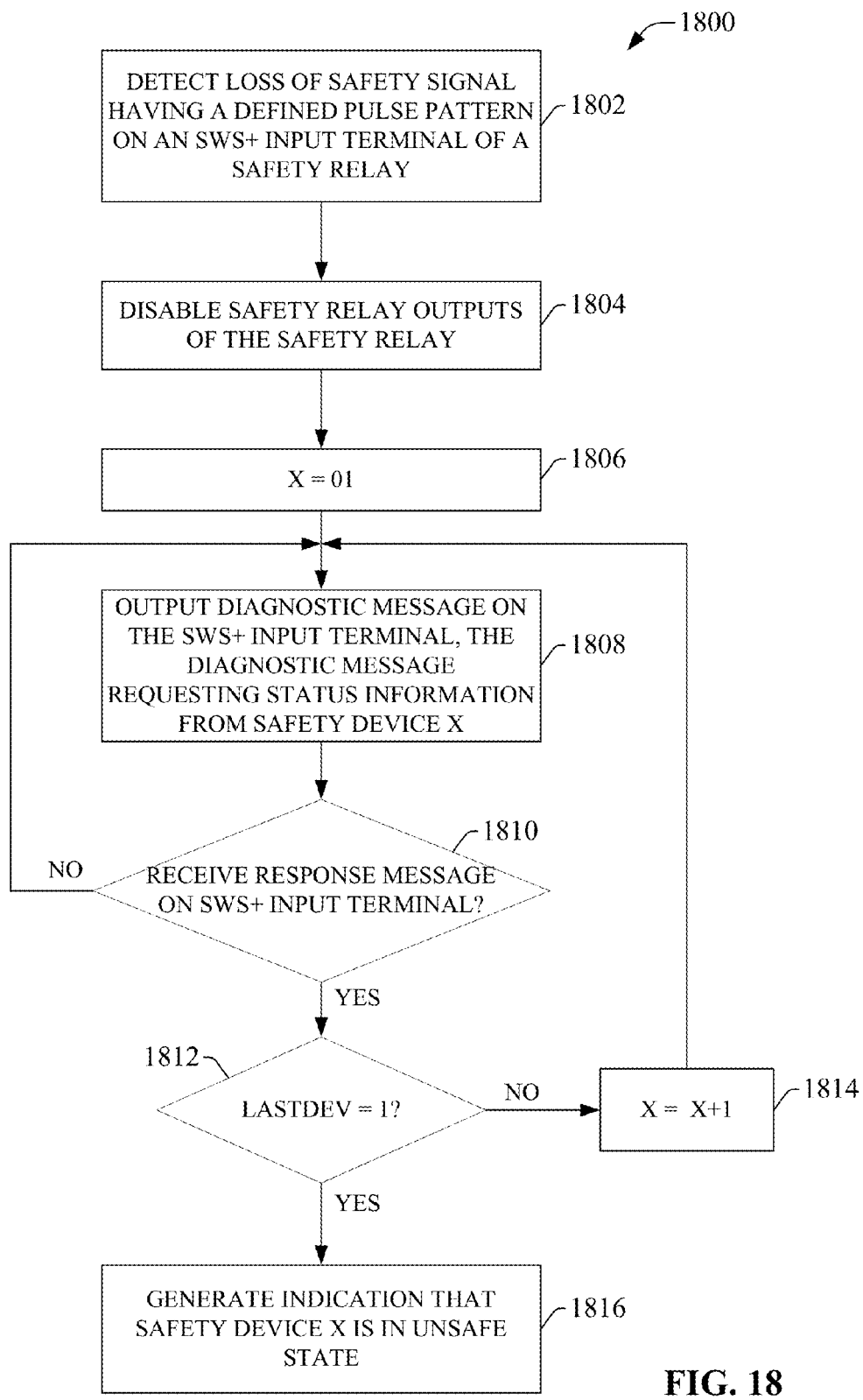
FIG. 18 is a flowchart of an example methodology for obtaining diagnostic information from one or more safety input devices on a single-wire safety circuit in response to a detected loss of a safety signal.

FIG. 18 illustrates an example methodology 1800 for obtaining diagnostic information from one or more safety input devices on a single-wire safety circuit in response to a detected loss of a safety signal. This example shows the comms master polling one device at a time; however, it is to be appreciated that the methodology 1800 may be modified such that the comms master obtains diagnostic information using a broadcast message. Initially, at 1802, the loss of a safety signal having a defined pulse pattern is detected on an SWS+ INPUT terminal of a safety relay. At 1804, the safety relay outputs of the safety relay are disabled in response to the detected loss of the safety signal.

At 1806, a variable X representing an address of a safety input device is set to 01. At 1808, a diagnostic message (e.g., the DIAG message described in connection with FIGS. 15A-15D) is output on the SWS+ INPUT terminal of the safety relay, the diagnostic message requesting status information from the safety device corresponding to address X. At 1810, a determination is made regarding whether a response message is received on the SWS+ INPUT terminal within a defined time period subsequent to outputting the diagnostic message. If no response message is received within a defined period, the methodology returns to step 1808 and the diagnostic message is output again. Alternatively, if the response message is received, the methodology moves to step 1812, where a determination is made regarding whether a LastDev flag contained in the response message is set to 1.

The LastDev indication indicates that the safety device corresponding to address X is the last device on the single-wire safety circuit able to receive the safety signal. If it is determined that the LastDev indication is 0, the methodology moves to step 1814, where X is incremented by one, and another diagnostic message directed to the next address is output at step 1808. Alternatively, if it is determined that LastDev=1, the methodology moves to step 1816, where an indication is generated that safety device X is in its unsafe state (e.g., light curtain broken, emergency stop pushbutton engaged, object detected by laser scanner, etc.).

Figure 19:
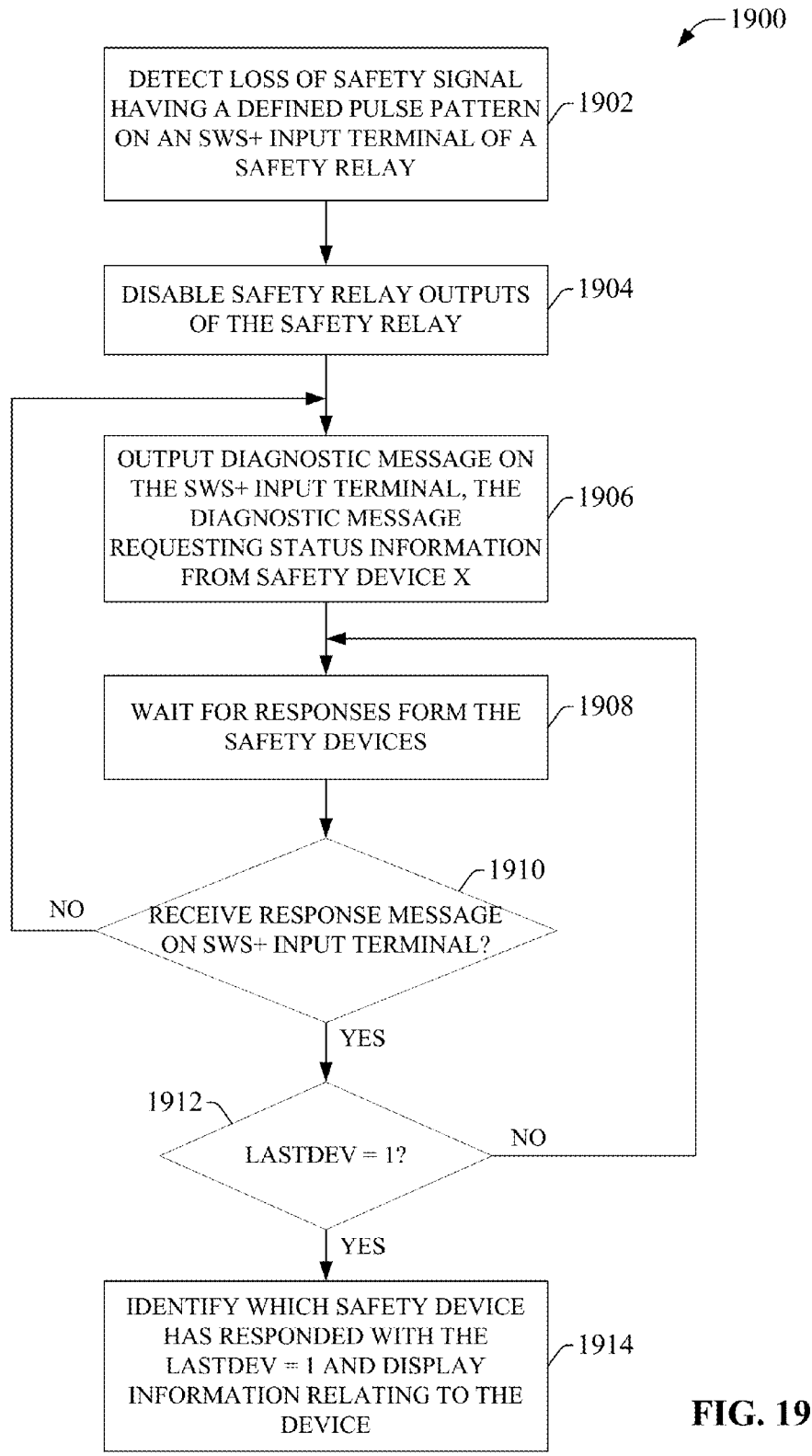
FIG. 19 is a flowchart of an example methodology for obtaining diagnostic information from one or more safety input devices on a single-wire safety circuit in response to a detected loss of a safety signal

FIG. 19 illustrates an example methodology 1900 for obtaining diagnostic information from one or more safety input devices on a single-wire safety circuit in response to a detected loss of a safety signal. This example shows the comms master polling all the devices at once with a broadcast message. Initially, at 1902, the loss of a safety signal having a defined pulse pattern is detected on an SWS+ INPUT terminal of a safety relay. At 1904, the safety relay outputs of the safety relay are disabled in response to the detected loss of the safety signal. At 1906, a broadcast diagnostic message is sent out on the single-wire channel via the SWS+ INPUT terminal of the safety relay.

At 1908, the comms master waits for responses from the safety devices. At 1910, a determination is made regarding whether a response message is received on the SWS+ INPUT terminal within a defined time period subsequent to outputting the diagnostic message. If no response message is received within a defined period, the methodology returns to step 1906 and the diagnostic message is output again. Alternatively, if the response message is received, the methodology moves to step 1912, where a determination is made regarding whether a LastDev flag contained in the response message is set to 1. If the Last Dev flag is set to 1 then the process move onto 1914, where the comms master identifies which safety device responded with the LastDev set to 1 and displays the information to the user. Alternately if the LastDev is not set to 1 then the methodology moves back to 1908 to wait for the next response.

Figure 20:
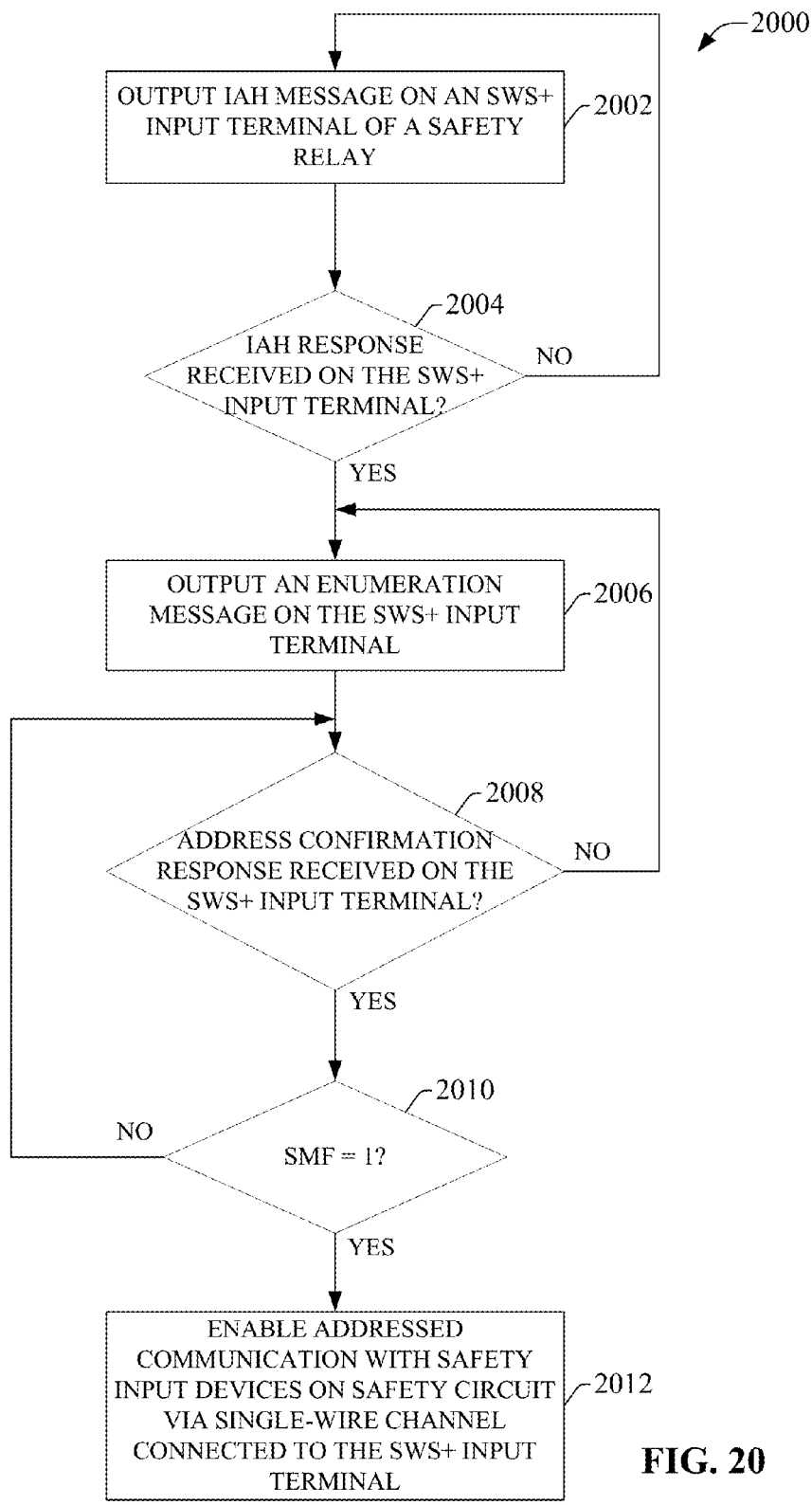
FIG. 20 is a flowchart of an example methodology for enumerating safety input devices on a single-wire safety circuit by a safety relay.

FIG. 20 illustrates an example methodology 2000 for enumerating safety input devices on a single-wire safety circuit by a safety relay. Initially, at 2002, an "I am here" (IAH) message is output on an SWS+ INPUT terminal of the safety relay. At 2004, a determination is made regarding whether an IAH response is received on the SWS+ INPUT terminal within a defined time period after outputting the IAH message. If an IAH response is not receive, the methodology returns to step 2002 and the IAH message is output again. Alternatively, if the IAH response is received, the methodology moves to step 2006, where an enumeration message is output on the SWS+ INPUT terminal of the safety relay.

At 2008, a determination is made regarding whether an address confirmation response message is received on the SWS+ INPUT terminal of the safety relay within a defined time period after outputting the enumeration message. The address confirmation response message indicates that a safety input device on the single-wire safety circuit has been addressed. If the address confirmation message is not received, the methodology returns to step 2006, where the enumeration message is output again. Alternatively, if the address confirmation message is received, the methodology moves to step 2010, where a determination is made regarding whether a Safety Master Found (SMF) flag included in the address confirmation response message is set to 1. The SMF flag indicates that a safety input device designated as the safety master (that is, the device that is to generate the pulsed safety signal for the single-wire safety channel) has been discovered and addressed. If the SMF flag included in the address confirmation message is equal to zero, the methodology returns to step 2008, where the next response is waited for. Steps 2006 through 2010 are repeated until an address confirmation message is received containing an SMF value of 1. In response to determining that SMF=1 at step 2010, the methodology moves to step 2012, where the safety relay enables addressed communication with the safety input devices on the safety circuit via the single-wire safety channel connected to the SWS+ INPUT terminal.

Figure 21:
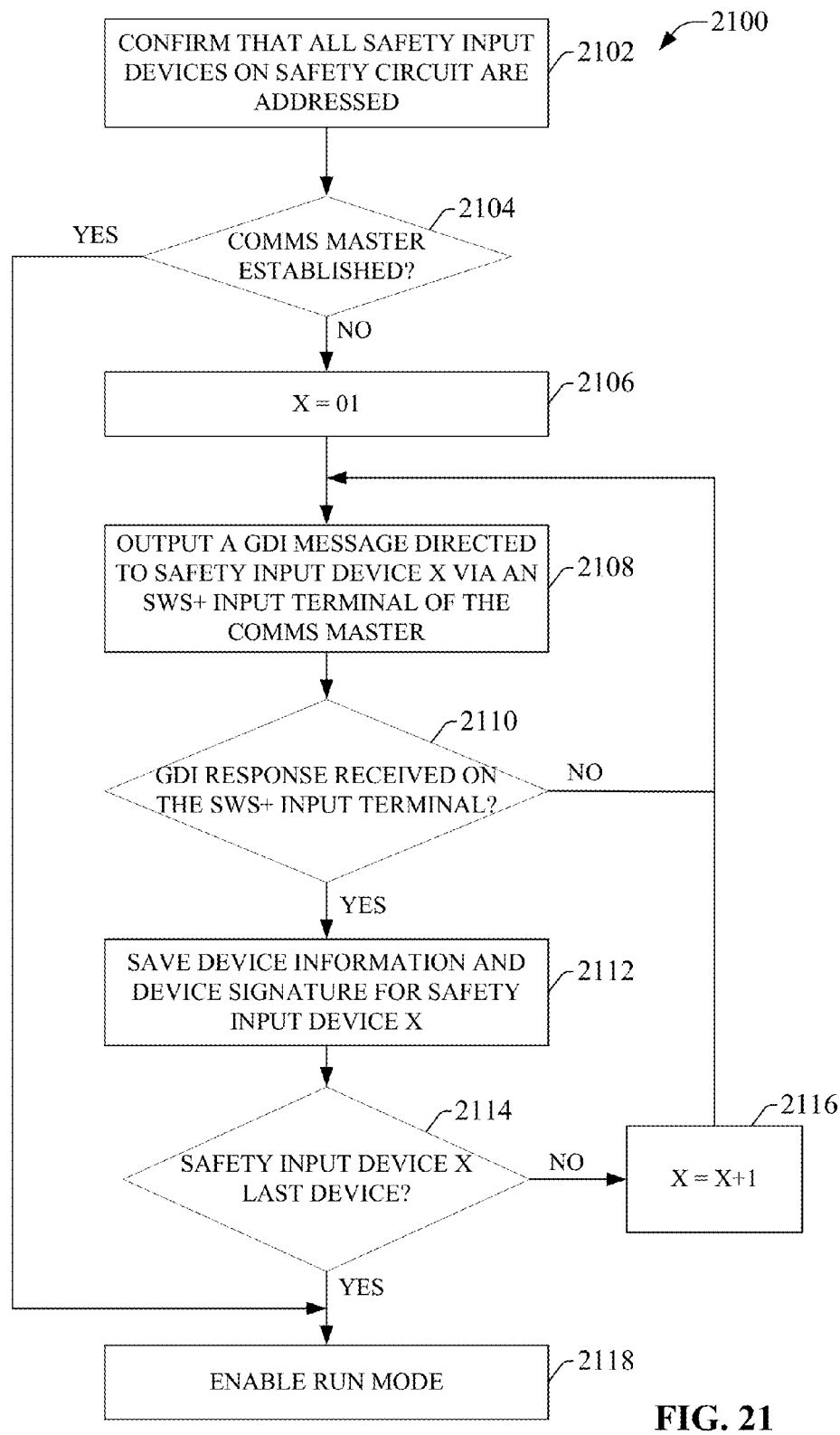
FIG. 21 is a flowchart of an example methodology for establishing a comms master on a single-wire safety circuit.

FIG. 21 illustrates an example methodology 2100 for establishing a comms master on a single-wire safety circuit. In some scenarios, the comms master may be a safety relay that serves as the comms master for the safety circuit. Initially, at 2102, the comms master confirms that all safety input devices on the single-wire safety circuit are addressed (e.g., using methodology 2000 of FIG. 20). At 2104, a determination is made regarding whether the comms master has been established; that is, whether the comms master has collected and stored device information and device signatures for all safety input devices on the safety circuit. If it is determined that the comms master has been established (that is, that the comms master has the device information for all safety input devices stored in local memory), the methodology moves to step 2118, where run mode (diagnostics can begin) is enabled. Alternatively, if it is determined that the comms master has not yet been established, a variable X representing an address of a safety input device for which device information is to be collected is set to 01 at step 2106. At 2108, a "get device identification" (GDI) message directed to safety input device X is output via an SWS+ INPUT terminal of the comms master.

At 2110, a determination is made regarding whether a GDI response is received on the SWS+ INPUT terminal within a defined time period after outputting the GDI message. If no GDI response is received, the methodology returns to step 2108, and the GDI message is output again. Alternatively, if the GDI response message is received, the methodology moves to step 2112, where device information and a device signature for safety input device X contained in the GDI response is saved on the comms master. At 2114, a determination is made regarding whether safety input device X is the last device in the safety circuit. If safety input device X is not the last device, address variable X is incremented at step 2116, and the methodology returns to step 2108, where another GDI message directed to the next safety input device is output by the comms master. Steps 2108-2116 are repeated for all safety input devices on the safety circuit. When it is determined at step 2114 that safety input device X is the last device, the methodology moves to step 2118, where run mode operation (diagnostics can begin) is enabled.

Figure 22:
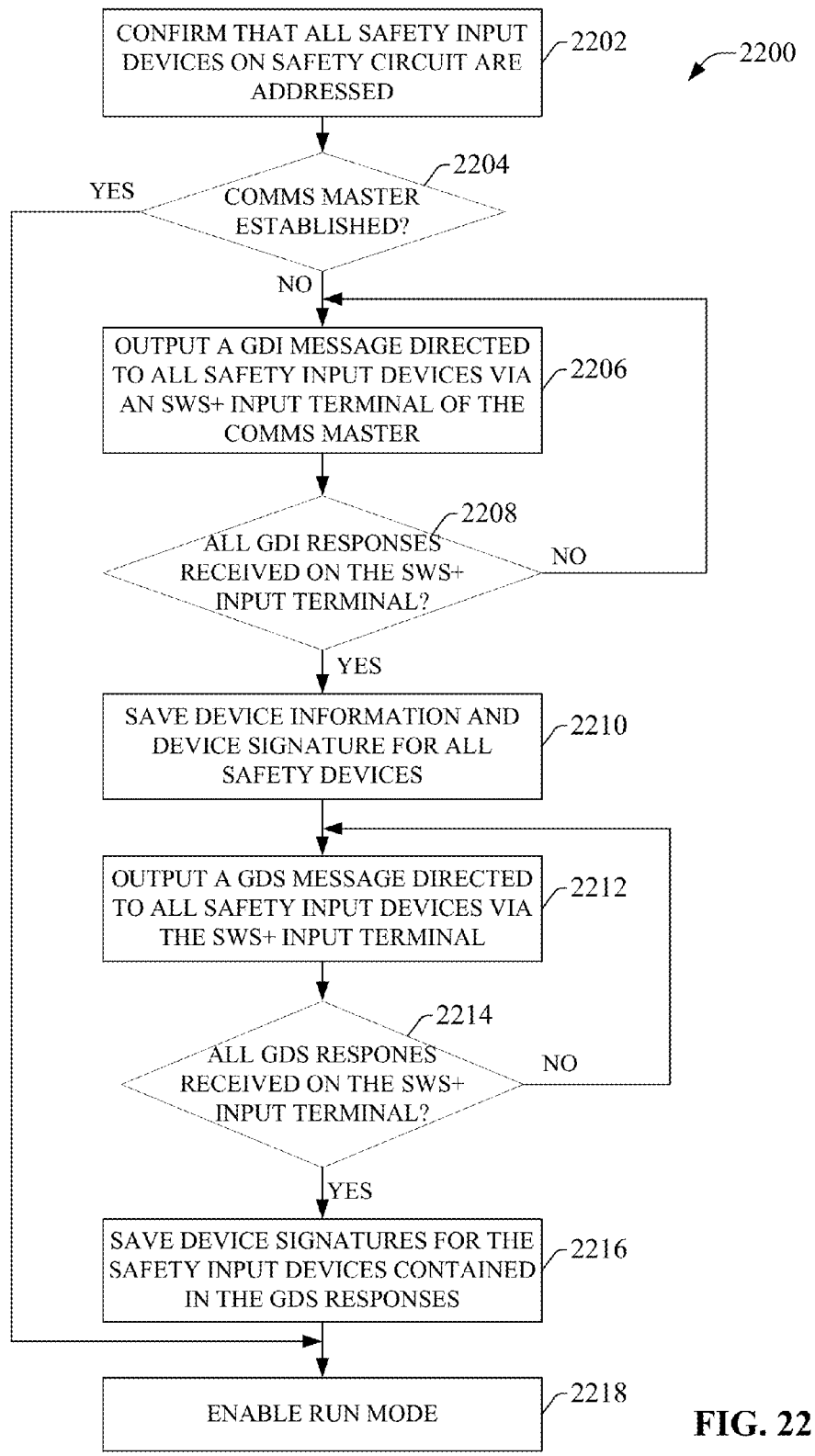
FIG. 22 is a flowchart of an example methodology for establishing a comms master on a single-wire safety circuit.

FIG. 22 illustrates an example methodology 2200 for establishing a comms master on a single-wire safety circuit. In some scenarios, the comms master may be a safety relay that serves as the comms master for the safety circuit. Initially, at 2202, the comms master confirms that all safety input devices on the single-wire safety circuit are addressed (e.g., using methodology 2000 of FIG. 20). At 2204, a determination is made regarding whether the comms master has been established; that is, whether the comms master has collected and stored device information and device signatures for all safety input devices on the safety circuit. If it is determined that the comms master has been established (that is, that the comms master has the device information for all safety input devices stored in local memory), the methodology moves to step 2218, where run mode operation (ready to send diagnostics messages) is enabled. Alternatively, if it is determined that the comms master has not yet been established, the methodology moves to 2206, where a "get device identification" (GDI) message directed to all safety input devices is output via an SWS+ INPUT terminal of the comms master.

At 2208, a determination is made regarding whether all the GDI responses have been received on the SWS+ INPUT terminal within a defined time period after outputting the GDI message. If not all the GDI responses are received, the methodology returns to step 2206, and the GDI message is output again. Alternatively, if the GDI response message is received, the methodology moves to step 2210, where device information for all the safety input devices contained in the GDI response is saved on the comms master.

At 2212, a "get device signature" (GDS) message directed to all safety input devices is output via an SWS+ INPUT terminal of the comms master. At 2214 a determination is made regarding whether all the GDS responses have been received on the SWS+ INPUT terminal within a defined time period after outputting the GDS message. If not all the GDS responses are received, the methodology returns to step 2212, and the GDS message is output again. Alternatively, if all the GDS response messages are received, the methodology moves to step 2216, where device signatures for the safety input devices contained in the GDS response are saved on the comms master. The methodology then moves to 2218, where run mode operation (diagnostics can begin) is enabled.

Figure 23:
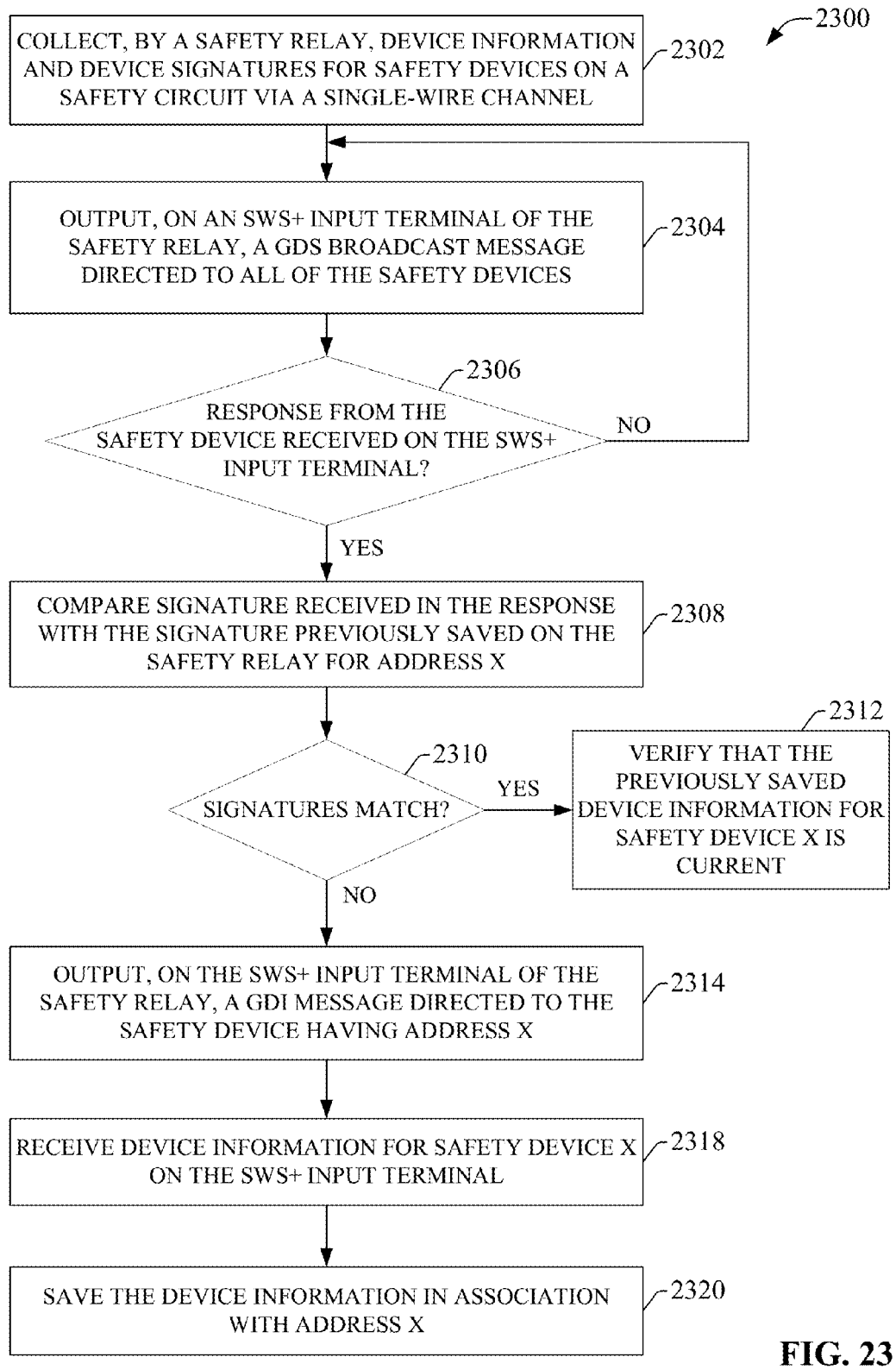
FIG. 23 is a flowchart of an example methodology for detecting and registering replacement safety input devices on a single-wire safety circuit by safety relay acting a comms master.

FIG. 23 illustrates an example methodology 2300 for detecting and registering replacement safety input devices on a single-wire safety circuit by safety relay acting a comms master. Initially, at 2302, device information and device signatures are collected for safety devices on the safety circuit via a single-wire channel (e.g., using methodology 2100 of FIG. 21 or methodology 2200 of FIG. 22). At 2304, a "get device signature" (GDS) broadcast message directed to all of the safety devices is output on an SWS+ INPUT terminal of the safety relay. At 2306, a determination is made regarding whether a response from the safety device is received on the SWS+ INPUT terminal within a defined time period. If no response is receive, the methodology returns to step 2304 and the GDS message is output again. Alternatively, if the response is received, the methodology moves to step 2308, where a device signature received in the response is compared with the device signature previously saved on the safety relay for address X.

At 2310, a determination is made regarding whether the device signature received in the response matches the previously saved device signature. If the signatures match, it is verified at step 2312 that the previously saved device information for safety device X is current (that is, that safety device X is the same device that was previously registered). Alternatively, if the signatures do not match (indicating that safety device X is a replacement device that has not been registered with the safety relay), the methodology moves to step 2314, where a "get device information" (GDI) message directed to the safety device having address X is output on the SWS+ INPUT terminal. At 2318, device information for safety device X is received on the SWS+ INPUT terminal (e.g., via a GDI response message, as described above in connection with methodologies 2100 and 2200). At 2320, the device information received at step 2318 is saved on the safety relay in association with address X.

Figure 24:
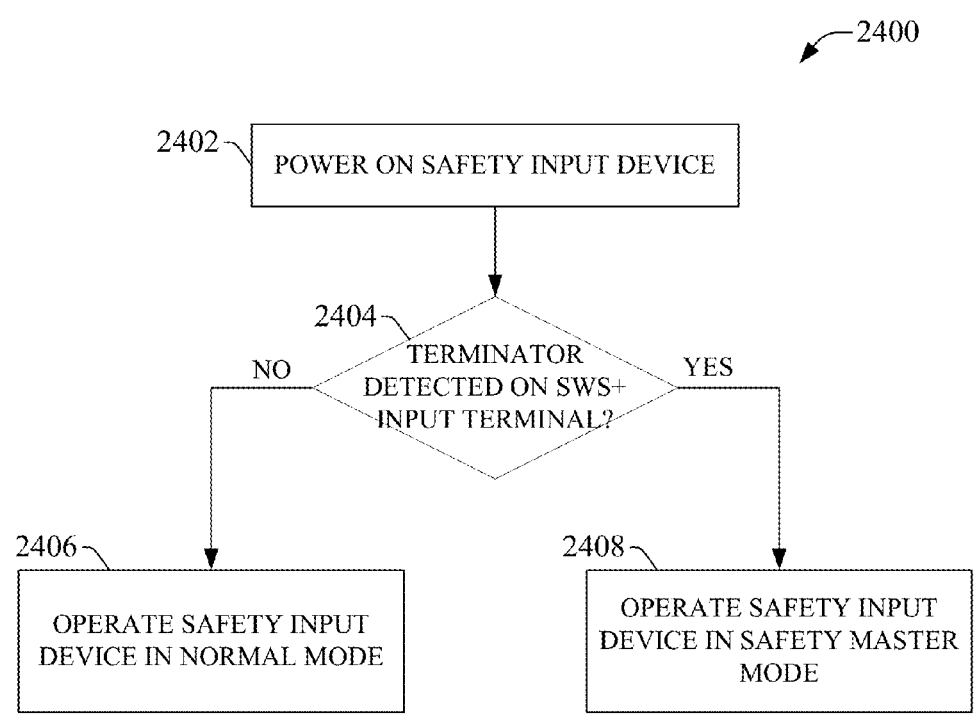
FIG. 24 is a flowchart of an example methodology for configuring a role of a safety input device on a single-wire safety circuit.

FIG. 24 illustrates an example methodology 2400 for configuring a role of a safety input device on a single-wire safety circuit. Initially, at 2402, a safety input device (e.g., an emergency stop button, a light curtain, a door safety switch, an emergency pull cord device, etc.) is powered on. The safety input device is compatible with the single-wire safety protocol described herein, and includes at least an SWS+ INPUT terminal and an SWS+ OUTPUT terminal for receiving and relaying signals on the single-wire safety channel. At 2404, a determination is made regarding whether a terminator is detected on the SWS+ INPUT terminal of the safety input device.

If no terminator is detected, the safety input device operates in normal mode (step 2406). Alternatively, if the terminator is detected, the safety input device operates in safety master mode (step 2408), whereby the safety input device serves as the safety signal source for the single-wire safety circuit on which it is installed. While operating in safety master mode, the safety input device generates a safety signal modulated with a defined pulse pattern and outputs the safety signal on its SWS+ OUTPUT terminal.

Figure 25:
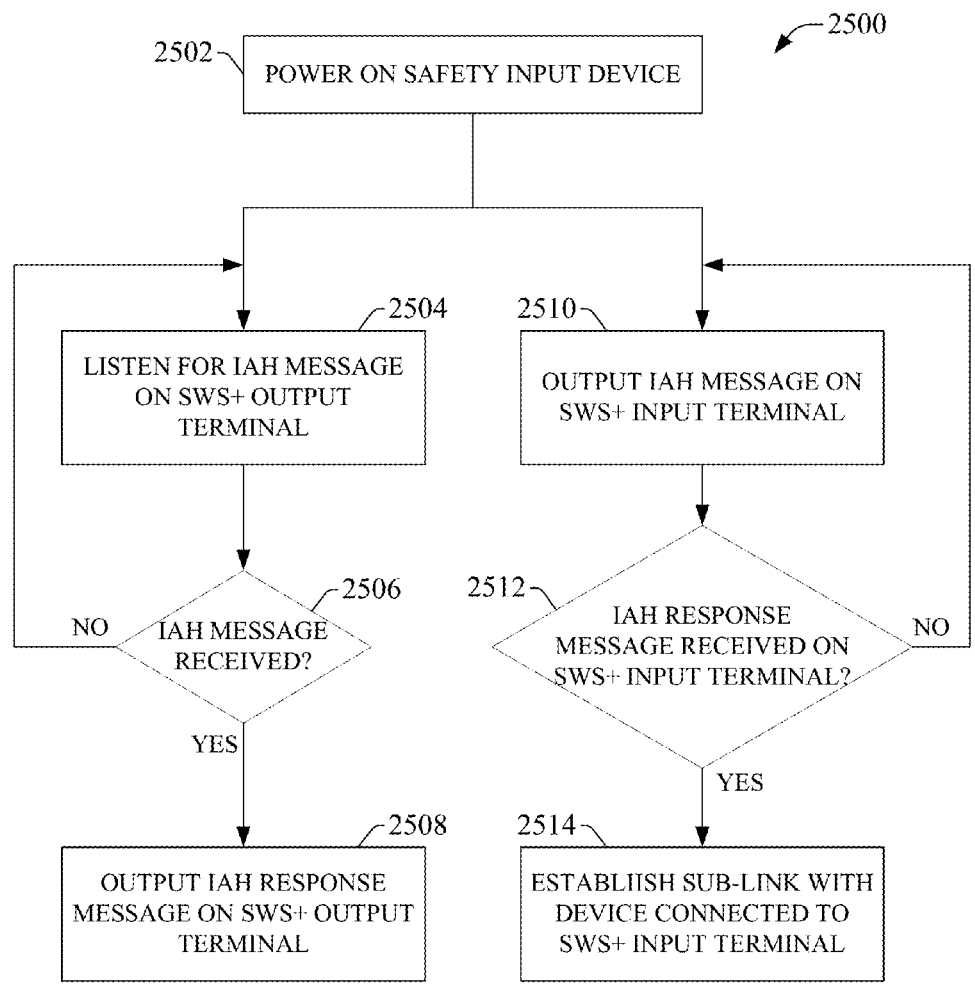
FIG. 25 is a flowchart of an example methodology for establishing sub-links between safety input devices on a single-wire safety circuit.

FIG. 25 illustrates an example methodology 2500 for establishing sub-links between safety input devices on a single-wire safety circuit. Initially, at 2502, a safety input device is powered on for the first time on a single-wire safety circuit. Since the safety input device has not previously communicated with other devices on the safety circuit, the device initially has no address. Upon power-up, the safety input device both listens for an "I am here" (IAH) message on its SWS+ OUTPUT terminal (step 2504) and outputs an IAH message on its SWS+ INPUT terminal (step 2510). At 2506, a determination is made regarding whether an IAH message is received on the SWS+ OUTPUT terminal. If no IAH message is received, the safety input device continues listening for an IAH message at step 2504. Alternatively, if an IAH message is received (indicating that the device on the output side of the safety input device is active and is sending an IAH message via the single-wire channel), the methodology moves to step 2508, where the safety input device outputs an IAH response message on its SWS+ OUTPUT terminal.

Meanwhile, at step 2512, a determination is made regarding whether an IAH response message is received on the SWS+ INPUT terminal of the safety input device within a defined time period after sending the IAH message at step 2510. If the IAH response message is not received, the safety input device outputs the IAH message again at step 2510. Alternatively, if the IAH response message is received, the methodology moves to step 2514, where a sub-link is established between the safety input device and the upstream device connected to the safety input device's SWS+ INPUT terminal.

Figure 26:
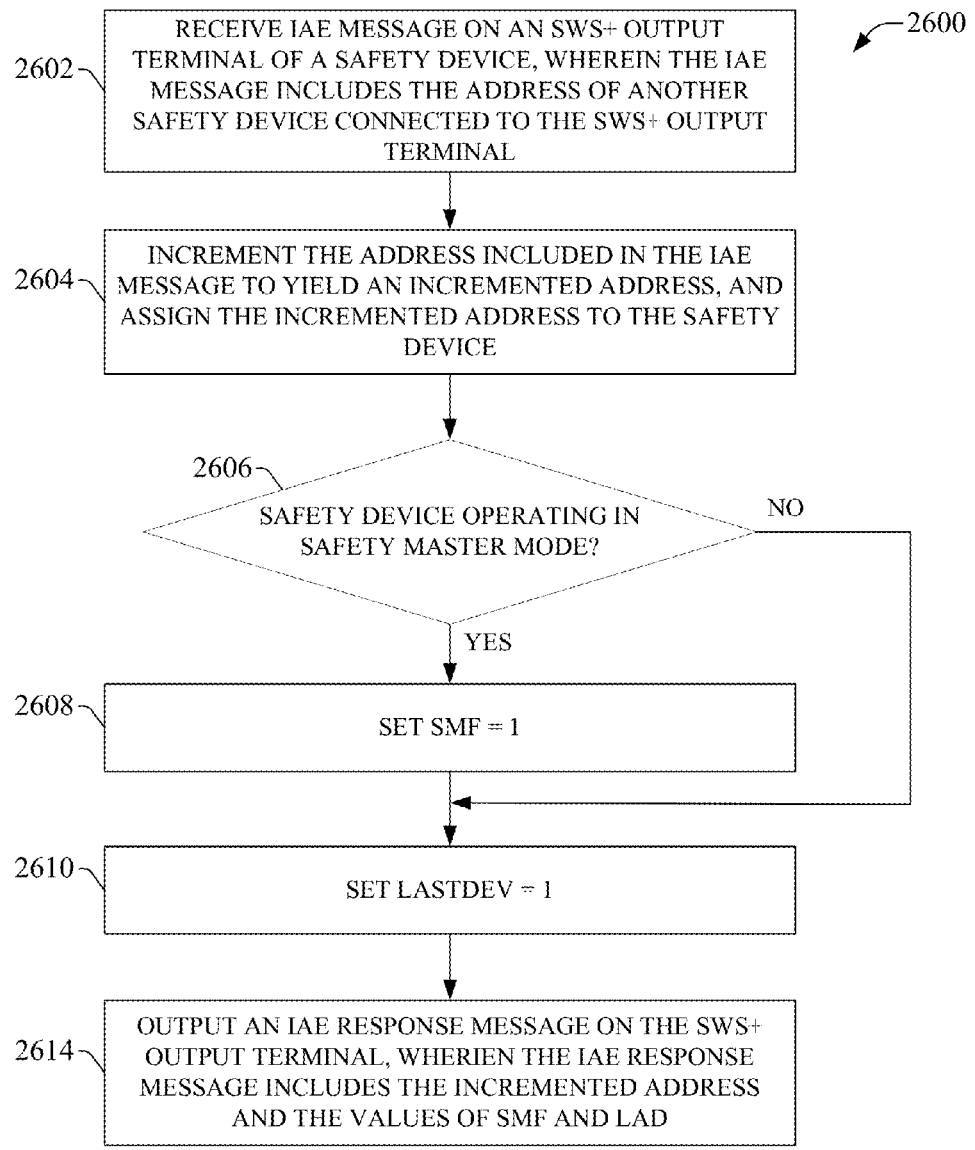
FIG. 26 is a flowchart of an example methodology for enumerating a safety input device on a single-wire input circuit.

FIG. 26 illustrates an example methodology 2600 for enumerating a safety input device on a single-wire safety circuit. Initially, at 2602, an "I am enumerating" (IAE) message is received on an SWS+ OUTPUT terminal of a safety device, wherein the IAE message includes at least the address of another safety device connected to the SWS+ OUTPUT terminal. At 2604, the address included in the IAE message is incremented to yield an incremented address, and the incremented address is assigned to the safety device.

At 2606, a determination is made regarding whether the safety device is operating in safety master mode (e.g., as previously determined using methodology 2400 of FIG. 24). If the safety device is operating in safety master mode, the safety device sets a "safety master found" (SMF) bit to 1 at step 2608. Alternatively, if the safety device is not operating in safety master mode, the methodology moves to step 2610 without setting the SMF bit. At 2610, the LastDev bit is set to 1. At 2612, an IAE response message is output on the SWS+ OUTPUT terminal of the safety device, wherein the IAE response message includes the incremented address (the new address of the safety device) and the values of SMF and LAD.

Figure 27:
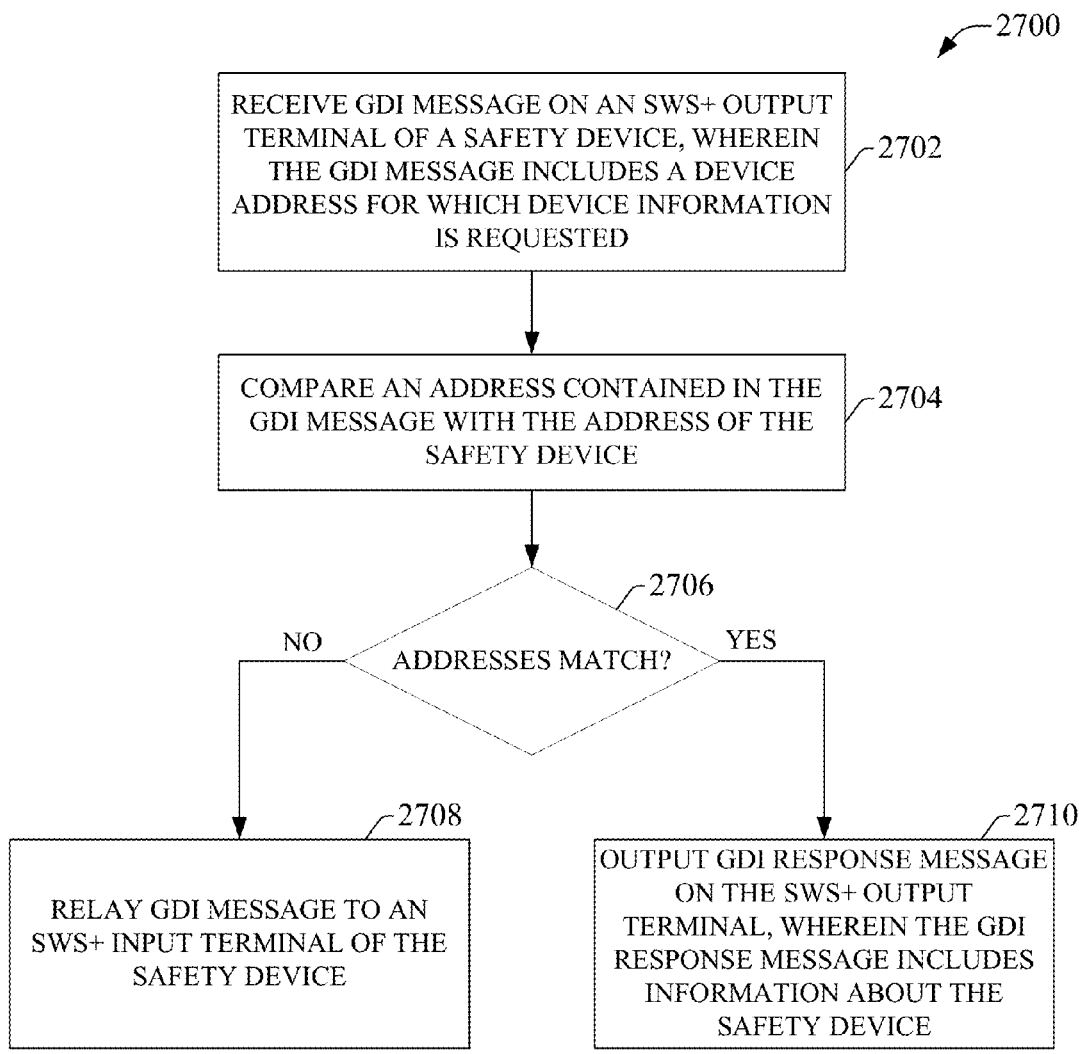
FIG. 27 is a flowchart of an example methodology for processing a request for device information from a comms master by a safety device.

FIG. 27 illustrates an example methodology 2700 for processing a request for device information from a comms master by a safety device. Initially, at 2702, a "get device information" (GDI) message is received on an SWS+ OUTPUT terminal of a safety device, wherein the GDI message includes a device address for which device information is requested. At 2704, the address contained in the GDI message is compared with the address of the safety device. At 2706, a determination is made regarding whether the addresses compared at step 2704 match. If the address contained in the GDI message does not match the address of the safety device, the safety device relays the GDI message to its SWS+ INPUT terminal at step 2708. Alternatively, if the addresses match, or the address is FF, the safety device outputs a GDI response message on its SWS+ OUTPUT terminal, wherein the GDI response message includes information about the safety device, including but not limited to a device type, a product code, vendor information, hardware and/or software revision number, fault information, status information, a device signature, or other such information. If the address of the request was a broadcast (FF) then the device relays the request upstream after responding.

Figure 28:
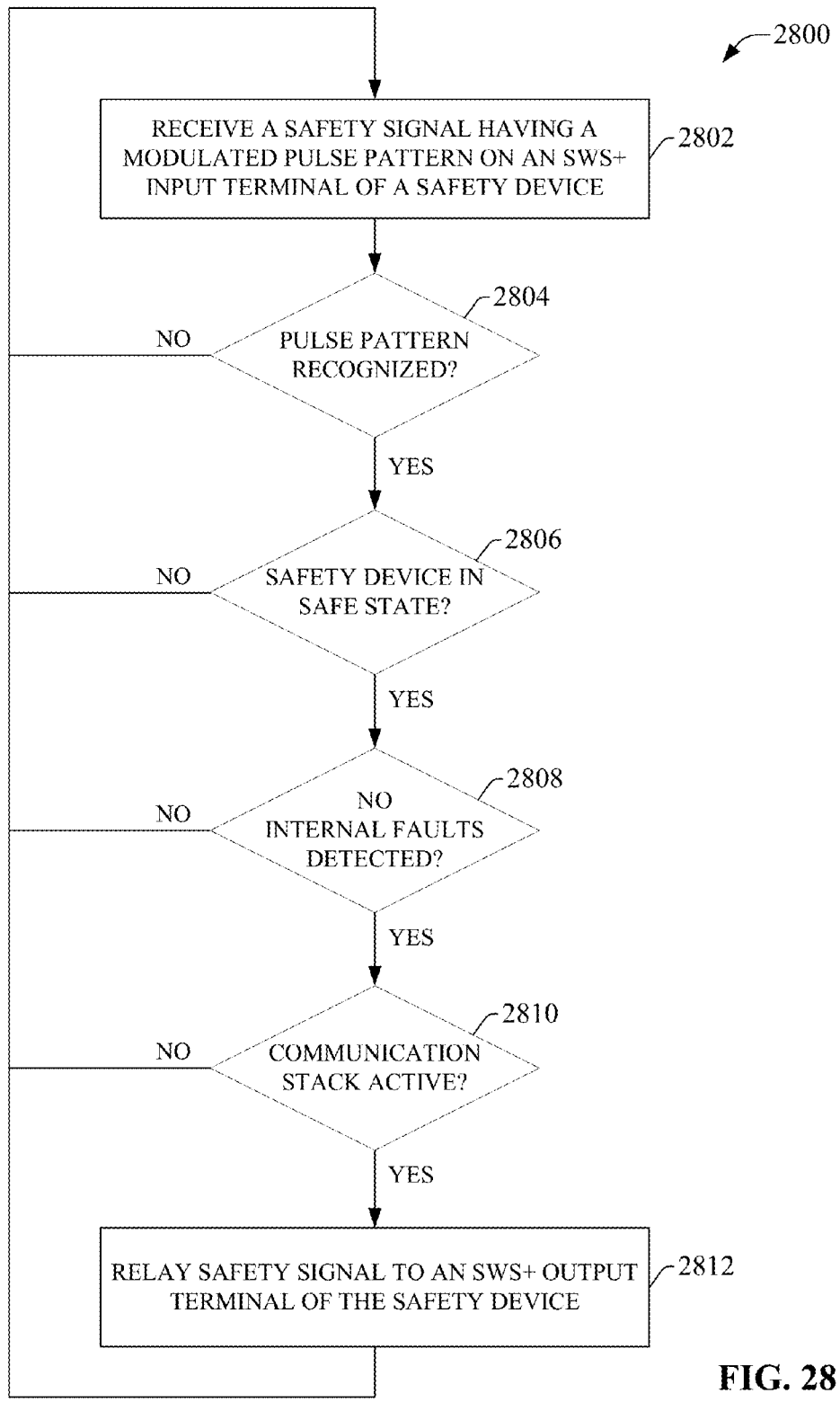
FIG. 28 is a flowchart of an example methodology for processing a pulsed safety signal received at a safety input device via a single-wire safety channel.

FIG. 28 illustrates an example methodology 2800 for processing a pulsed safety signal received at a safety input device via a single-wire safety channel. Initially, at 2802, a safety signal having a modulated pulse pattern is received on an SWS+ INPUT terminal of the safety device. At 2804, a determination is made regarding whether the pulse pattern modulated on the safety signal is recognized as a defined pulse pattern. If the pattern is recognized, a determination is made at step 2806 regarding whether the safety device is in its safe state (e.g., light curtain unbroken, emergency stop pushbutton unengaged, etc.). If the safety device is in its safe state, it is confirmed at step 2808 that no internal faults are detected on the safety device. If no internal faults are detected, a determination is made at step 2810 regarding whether the safety device's communication stack is active. If the communication stack is active, the methodology moves to step 2812, where the safety device relays the pulsed safety signal to its SWS+ OUTPUT terminal, thereby sending the signal to the next device on the safety circuit.

If any of the determination steps 2804-2810 are not satisfied, the safety device continues receiving the pulsed safety signal without relaying the signal to the next device on the safety circuit. It is to be appreciated that determination steps 2804-2810 may be performed in any order, or may be performed simultaneously.

Embodiments, systems, and components described herein, as well as industrial control systems and industrial automation environments in which various aspects set forth in the subject specification can be carried out, can include computer or network components such as servers, clients, programmable logic controllers (PLCs), automation controllers, communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 29:
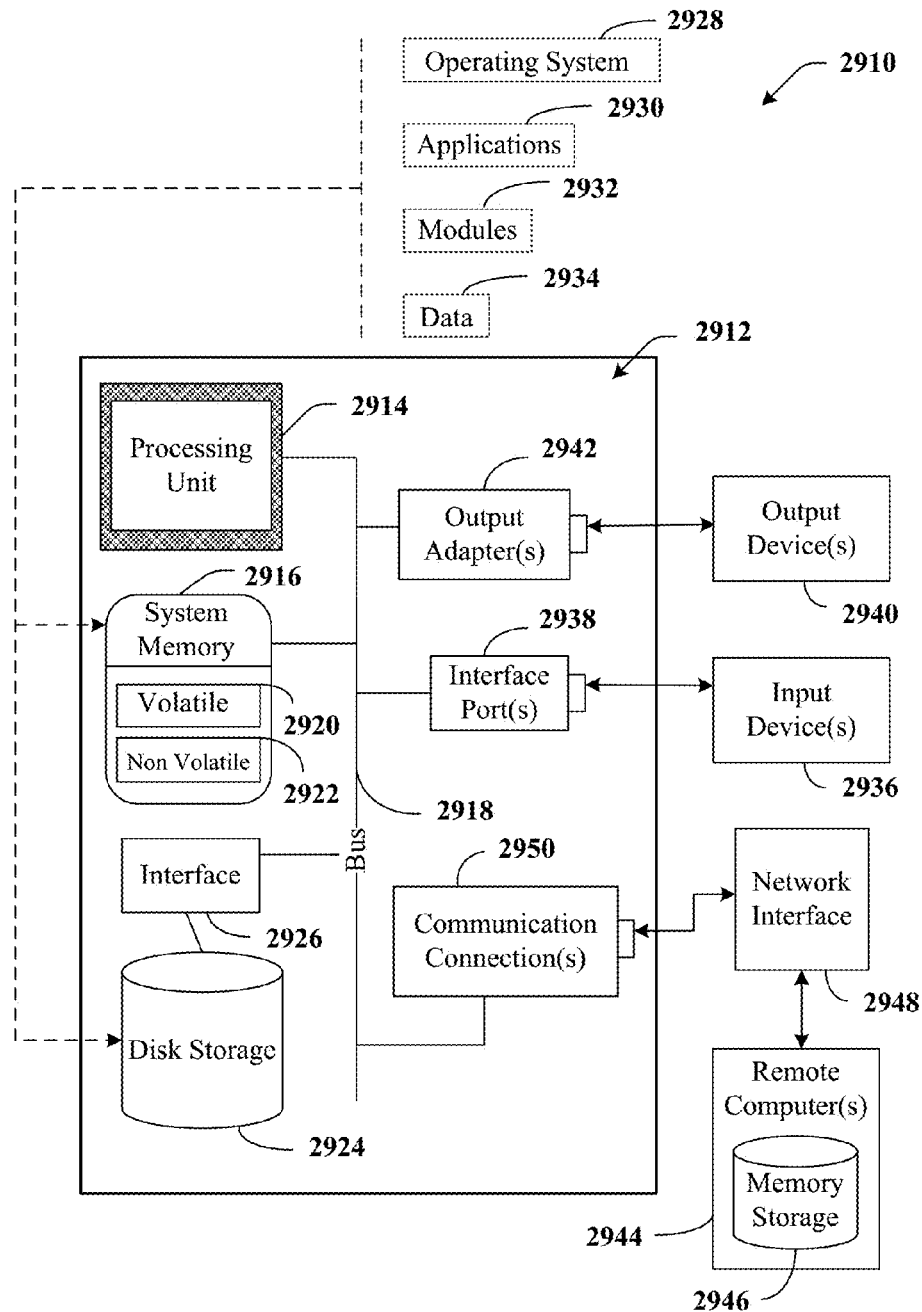
FIG. 29 is an example computing environment.
Figure 30:
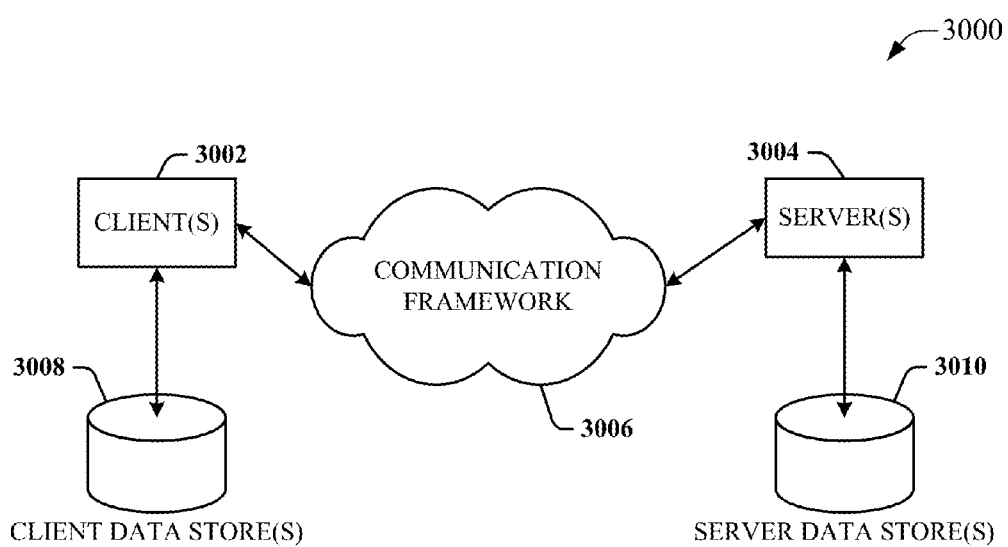
FIG. 30 is an example networking environment.

In order to provide a context for the various aspects of the disclosed subject matter, FIGS. 29 and 30 as well as the following discussion are intended to provide a brief, general description of a suitable environment in which the various aspects of the disclosed subject matter may be implemented.

With reference to FIG. 29, an example environment 2910 for implementing various aspects of the aforementioned subject matter includes a computer 2912. The computer 2912 includes a processing unit 2914, a system memory 2916, and a system bus 2918. The system bus 2918 couples system components including, but not limited to, the system memory 2916 to the processing unit 2914. The processing unit 2914 can be any of various available processors. Multi-core microprocessors and other multiprocessor architectures also can be employed as the processing unit 2914.

The system bus 2918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 2916 includes volatile memory 2920 and nonvolatile memory 2922. The basic input/output system (BIOS), containing the basic routines to transfer information between elements within the computer 2912, such as during start-up, is stored in nonvolatile memory 2922. By way of illustration, and not limitation, nonvolatile memory 2922 can include read only memory (ROM), programmable ROM (PROM), electrically programmable ROM (EPROM), electrically erasable PROM (EEPROM), or flash memory. Volatile memory 2920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 2912 also includes removable/non-removable, volatile/non-volatile computer storage media. FIG. 29 illustrates, for example a disk storage 2924. Disk storage 2924 includes, but is not limited to, devices like a magnetic disk drive, floppy disk drive, tape drive, Jaz drive, Zip drive, LS-100 drive, flash memory card, or memory stick. In addition, disk storage 2924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 2924 to the system bus 2918, a removable or non-removable interface is typically used such as interface 2926.

It is to be appreciated that FIG. 29 describes software that acts as an intermediary between users and the basic computer resources described in suitable operating environment 2910. Such software includes an operating system 2928. Operating system 2928, which can be stored on disk storage 2924, acts to control and allocate resources of the computer 2912. System applications 2930 take advantage of the management of resources by operating system 2928 through program modules 2932 and program data 2834 stored either in system memory 2916 or on disk storage 2924. It is to be appreciated that one or more embodiments of the subject disclosure can be implemented with various operating systems or combinations of operating systems.

A user enters commands or information into the computer 2912 through input device(s) 2936. Input devices 2936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 2914 through the system bus 2918 via interface port(s) 2938. Interface port(s) 2938 include, for example, a serial port, a parallel port, a game port, and a universal serial bus (USB). Output device(s) 2940 use some of the same type of ports as input device(s) 2936. Thus, for example, a USB port may be used to provide input to computer 2912, and to output information from computer 2912 to an output device 2940. Output adapters 2942 are provided to illustrate that there are some output devices 2940 like monitors, speakers, and printers, among other output devices 2940, which require special adapters. The output adapters 2942 include, by way of illustration and not limitation, video and sound cards that provide a means of connection between the output device 2940 and the system bus 2918. It should be noted that other devices and/or systems of devices provide both input and output capabilities such as remote computer(s) 2944.

Computer 2912 can operate in a networked environment using logical connections to one or more remote computers, such as remote computer(s) 2944. The remote computer(s) 2944 can be a personal computer, a server, a router, a network PC, a workstation, a microprocessor based appliance, a peer device or other common network node and the like, and typically includes many or all of the elements described relative to computer 2912. For purposes of brevity, only a memory storage device 2946 is illustrated with remote computer(s) 2944. Remote computer(s) 2944 is logically connected to computer 2912 through a network interface 2948 and then physically connected via communication connection 2950. Network interface 2948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 2950 refers to the hardware/software employed to connect the network interface 2948 to the system bus 2918. While communication connection 2950 is shown for illustrative clarity inside computer 2912, it can also be external to computer 2912. The hardware/software necessary for connection to the network interface 2948 includes, for exemplary purposes only, internal and external technologies such as, modems including regular telephone grade modems, cable modems and DSL modems, ISDN adapters, and Ethernet cards.

FIG. 30 is a schematic block diagram of a sample computing environment 3000 with which the disclosed subject matter can interact. The sample computing environment 3000 includes one or more client(s) 3002. The client(s) 3002 can be hardware and/or software (e.g., threads, processes, computing devices). The sample computing environment 3000 also includes one or more server(s) 3004. The server(s) 3004 can also be hardware and/or software (e.g., threads, processes, computing devices). The servers 3004 can house threads to perform transformations by employing one or more embodiments as described herein, for example. One possible communication between a client 3002 and servers 3004 can be in the form of a data packet adapted to be transmitted between two or more computer processes. The sample computing environment 3000 includes a communication framework 3006 that can be employed to facilitate communications between the client(s) 3002 and the server(s) 3004. The client(s) 3002 are operably connected to one or more client data store(s) 3008 that can be employed to store information local to the client(s) 3002. Similarly, the server(s) 3004 are operably connected to one or more server data store(s) 3010 that can be employed to store information local to the servers 3004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:
1. A safety input device, comprising:
a memory that stores executable components;
a processor, operatively coupled to the memory, that executes the executable components, the executable components comprising:
a safe state detection component configured to determine whether the safety input device is in a safe state;
a pulse detection component configured to verify that a modulated pulse pattern of a safety signal received on an input terminal of the safety input device corresponds to a defined pulse pattern;

a safety signal relaying component configured to output the safety signal on an output terminal of the safety input device in response to verification that the modulated pulse pattern corresponds to the defined pulse pattern and a determination that a safety function of the safety input device is valid; and a message processing component configured to process an input message received via the output terminal, the input message comprising a request for device information, wherein the message processing component is further configured to, in response to determining that a target address contained in the input message matches an address of the safety input device, send an output message via the output terminal, wherein the output message contains device information retrieved from the memory, and in response to determining that the target address contained in the input message does not match the address of the safety input device, output the input message via the input terminal.

2. The safety input device of claim 1, wherein the safety input device is at least one of an emergency stop pushbutton, a light curtain device, a safety door switch, a safety mat device, an emergency pull-cord device, a laser scanner, or a photoelectric sensor.

3. The safety input device of claim 1, wherein the executable components further comprise:

a pulse generating component configured to generate the modulated pulse pattern in response to a determination that the safety input device is configured to operate in a safety master mode; and a safety master mode component configured to enable the safety master mode in response to detection of a terminator connected to the input terminal and to disable the safety master mode in response to determining that the terminator is not connected to the input terminal.

4. The safety input device of claim 1, wherein the input message is a first input message and the output message is a first output message, and the message processing component is further configured to, in response to receiving a second input message via the output terminal indicating that a downstream safety device is active, send a second output message via the output terminal indicating that the safety input device is active.

5. The safety input device of claim 1, wherein the input message is a first input message and the output message is a first output message, and the executable components further comprises a single-wire communication component configured to, in response to receipt of a second input message via the input terminal indicating that an upstream safety device connected to the input terminal is active, establish a safety channel sub-link between the safety input device and the upstream safety input device.

6. The safety input device of claim 3, wherein the executable components further comprise a device addressing component configured to, in response to receipt of an enumeration message via the output terminal containing an address of a downstream safety device, increment the address to yield an incremented address and assign the address to the safety input device.

7. The safety input device of claim 6, wherein the message processing component is further configured to send an enumeration response message via the output terminal, the enumeration response message containing at least the incremented address, an indication of whether the safety input device is a last addressable device on a safety circuit, and an indication of whether the safety input device is operating in the safety master mode.

8. The safety input device of claim 6, wherein the message processing component is further configured to send another enumeration message, via the input terminal, containing the incremented address.

9. The safety input device of claim 8, wherein the message processing component is further configured to, in response to receipt of a response message received via the input terminal as a response to the other enumeration message, output the response message via the output terminal, and the response message contains at least an address of an upstream safety input device, an indication of whether the upstream safety input device is operating in the safety master mode, and an indication of whether the upstream safety input device is the last addressable device on a safety circuit.

10. The safety input device of claim 1, wherein the device information comprises at least one of a type of the safety input device, a product code of the safety input device, a vendor of the safety input device, a hardware revision number of the safety input device, a software revision number of the safety input device, an indication of whether the safety function of the safety input device is valid, or a device signature associated with the safety input device.

11. The safety input device of claim 1, wherein the message processing component is further configured to in response to determining that a target address contained in a device information request message received via the output terminal is a special address indicating a broadcast message, send a response message containing device information retrieved from the memory via the output terminal and send a relayed version of the device information request message via the input terminal, and in response to determining that the target address contained in the device information request message matches an address of the safety input device, output the device information request message via the input terminal.

12. A method, comprising:

determining, by a safety input device comprising a processor, whether the safety input device detects a safe status;

comparing, by the safety input device, a pulse pattern carried by a safety signal received on an input terminal of the safety input device with a defined pulse pattern;

in response to determining that the pulse pattern matches the defined pulse pattern based on the comparing and that the safety input device detects the safe status, outputting the safety signal via an output terminal of the safety input device;

processing an input message received via the output terminal, the input message comprising a request for device information, wherein the processing comprises:

in response to determining that a target address contained in the input message matches an address of the safety input device, sending, by the safety input device, an output message via the output terminal, wherein the output message contains device information retrieved from a memory of the safety input device; and in response to determining that the target address contained in the input message does not match the address of the safety input device, output the input message via the input terminal.

13. The method of claim 12, wherein the input message is a first input message and the output message is a first output message, and the method further comprises:

in response to receiving, via the output terminal, a second input message indicating that a downstream safety device connected to the output terminal is active, configuring a second output message to indicate that the safety input device is active and sending the second output message via the output terminal.

14. The method of claim 12, further comprising:

in response to receiving, by the safety input device via the output terminal, an enumeration message comprising an address of a downstream safety device, incrementing, by the safety input device, the address to obtain an incremented Address, and configuring, by the safety input device, the safety input device with the incremented address.

15. The method of claim 14, wherein the output message is a first output message, and the method further comprises:

generating, by the safety input device, a second output message that includes at least the incremented address, a first indication of whether the safety input device is a last addressable device on a safety circuit, and a second indication of whether the safety input device is operating as a safety master device that generates the safety signal; and sending, by the safety input device, the second output message via the output terminal.

16. The method of claim 14, wherein the enumeration message is a first enumeration message, and the method further comprises:

generating, by the safety input device, a second enumeration message directed to an upstream safety input device, wherein the second enumeration message contains at least the incremented address; and sending, by the safety input device, the second enumeration message via the input terminal.

17. The method of claim 16, further comprising, in response to determining that a message received via the input terminal is a response to the second enumeration message, outputting the message via the output terminal, wherein the message comprises at least an address of the upstream safety input device, an indication of whether the upstream safety input device is operating as a safety master device that generates the safety signal, and an indication of whether the upstream safety input device is the last addressable device on a safety circuit.

18. A non-transitory computer-readable medium having stored thereon instructions that, in response to execution, cause a safety input device comprising a processor to perform operations, the operations comprising:

confirming that a safety signal received on an input terminal of the safety input device carries a pulse pattern corresponding to a defined pulse pattern;

in response to the confirming and a determination that a safety function of the safety input device is valid, outputting the safety signal via an output terminal of the safety input device;

receiving an input message via the output terminal, the input message comprising a request for device information;

in response to determining that a target address contained in the input message corresponds to an address of the safety input device, sending an output message via the output terminal, wherein the output message comprises device information retrieved from a memory of the safety input device; and in response to determining that the target address contained in the input message does not correspond to the address of the safety input device, output the input message via the input terminal.

19. The non-transitory computer-readable medium of claim 18, wherein the operations further comprise, in response to detecting presence of a terminator connected to the input terminal, configuring the safety input device to operate as a safety master device that generates the pulse pattern and outputs the safety signal on the output terminal.

20. The non-transitory computer-readable medium of claim 18, wherein the operations further comprise:

in response to receiving, via the output terminal, an enumeration message comprising an address of a downstream safety device, incrementing the address to obtain an incremented address, and assigning the incremented address to the safety input device.

21. A safety input device, comprising:

a memory that stores executable components;

a processor, operatively coupled to the memory, that executes the executable components, the executable components comprising:

a safe state detection component configured to determine whether the safety input device is in a safe state;

a pulse detection component configured to verify that a modulated pulse pattern of a safety signal received on an input terminal of the safety input device corresponds to a defined pulse pattern;

a safety signal relaying component configured to output the safety signal on an output terminal of the safety input device in response to verification that the modulated pulse pattern corresponds to the defined pulse pattern and a determination that a safety function of the safety input device is valid;

a device addressing component configured to, in response to receipt, via the output terminal, of an enumeration message containing an address of a downstream safety device, increment the address to yield an incremented address and assign the address to the safety input device; and a message processing component configured to send an output message via the input terminal, the first output message containing the incremented address.

22. The safety input device of claim 21 wherein the message processing component is further configured to, in response to receipt of an input message received via the input terminal as a response to the output message, output the input message via the output terminal, wherein the input message contains at least an address of an upstream safety input device, an indication of whether the upstream safety input device is operating as a safety master device that generates the pulse pattern, and an indication of whether the upstream safety device is a last addressable device on a safety circuit.

23. A safety input device, comprising:

a memory that stores computer-executable components;

a processor, operatively coupled to the memory, that executes the computer-executable components, the computer-executable components comprising:

a safe state detection component configured to determine whether the safety input device is in a safe state;

a pulse detection component configured to verify that a modulated pulse pattern of a safety signal received on an input terminal of the safety input device corresponds to a defined pulse pattern;

a safety signal relaying component configured to output the safety signal on an output terminal of the safety input device in response to verification that the modulated pulse pattern corresponds to the defined pulse pattern and a determination that a safety function of the safety input device is valid;

a message processing component configured to process a first input message received via the input terminal, to process a second input message received via the output terminal, to send a first output message via the input terminal, and to send a second output message via the output terminal;

a pulse generating component configured to generate the modulated pulse pattern; and a safety master mode component configured to enable the pulse generating component in response to detection of a terminator connected to the input terminal and to disable the pulse generating component in response to determining that the terminator is not connected to the input terminal.

* * * * *